United States Patent [19]
Dillard et al.

[11] 3,896,300
[45] July 22, 1975

[54] AUTOMATIC ARTICLE SORTING AND PUNCHING MACHINE

[75] Inventors: John W. Dillard; Dominick Tringali; Richard L. Swartz; Ernest M. Hinson, Jr., all of Columbia, S.C.

[73] Assignee: Universal Business Machines, Inc., Columbia, S.C.

[22] Filed: June 15, 1973

[21] Appl. No.: 370,530

Related U.S. Application Data

[62] Division of Ser. No. 135,656, April 20, 1971, Pat. No. 3,767,113.

[52] U.S. Cl. .......................... 235/153 R; 235/61.6 B
[51] Int. Cl. ........................ G06f 11/00; G06k 5/00
[58] Field of Search.... 235/153 R, 153 AP, 153 BB, 235/61.6 R, 61.6 B, 61.6 J, 61.7 R; 340/146.1 AG, 146.1 R

[56] References Cited
UNITED STATES PATENTS

| | | | |
|---|---|---|---|
| 2,975,402 | 3/1961 | Miller | 235/153 R |
| 2,979,257 | 4/1961 | Jancin | 235/153 R |
| 3,150,350 | 9/1964 | Goldman | 235/153 R |
| 3,400,367 | 9/1968 | Epstein et al. | 235/153 AP |

Primary Examiner—Charles E. Atkinson
Attorney, Agent, or Firm—Kemon, Palmer and Estabrook

[57] ABSTRACT

An automatic sorting machine for automatically sorting record receivers according to the elapsed time data printed thereon and for automatically punching the record receivers in accordance with printed time of day data appearing on the receivers. The machine includes apparatus for serially feeding record receivers to a scanning station having three scanning heads mounted to scan and convert printed data into radiant energy pulses that are representations of the data. The pulses are sensed and converted to elapsed time and time of day BCD (Binary Coded Decimal) representations. The elapsed time BCD representations are applied as inputs to elapsed time error checking and correction logic which automatically corrects for error appearing in the printed data on the record receiver to generate elapsed time signals. The elapsed time signals are applied by electronics to selectively operate gate solenoids related to specific record receiver storage bins in the sorting machine. The time of day BCD representations are applied as inputs to time of day error checking and correction logic which provides time of day signals corrected as stated above to selectively energize punch solenoids. The punch solenoids are energized by the signals while the record receivers are at the scanning station after which the record receivers are released to be automatically transported by the machine and stored in the bins selected by the elapsed time data. All logic is automatically restored in timed sequence with machines' rate capability for storing documents.

9 Claims, 41 Drawing Figures

PATENTED JUL 22 1975 3,896,300

SHEET 2

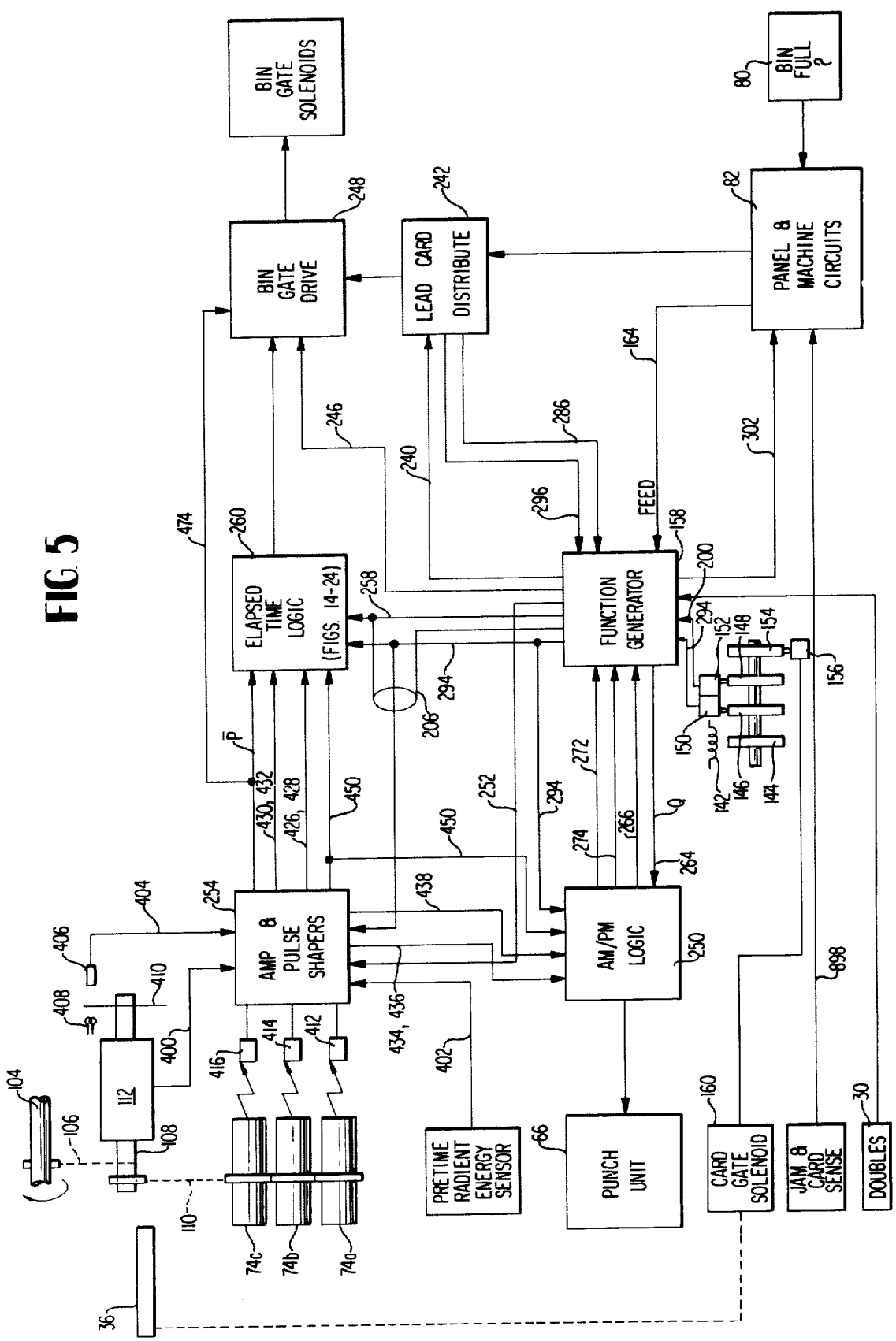

PATENTED JUL 22 1975　　　　　　　　　　3,896,300

SHEET　　　4

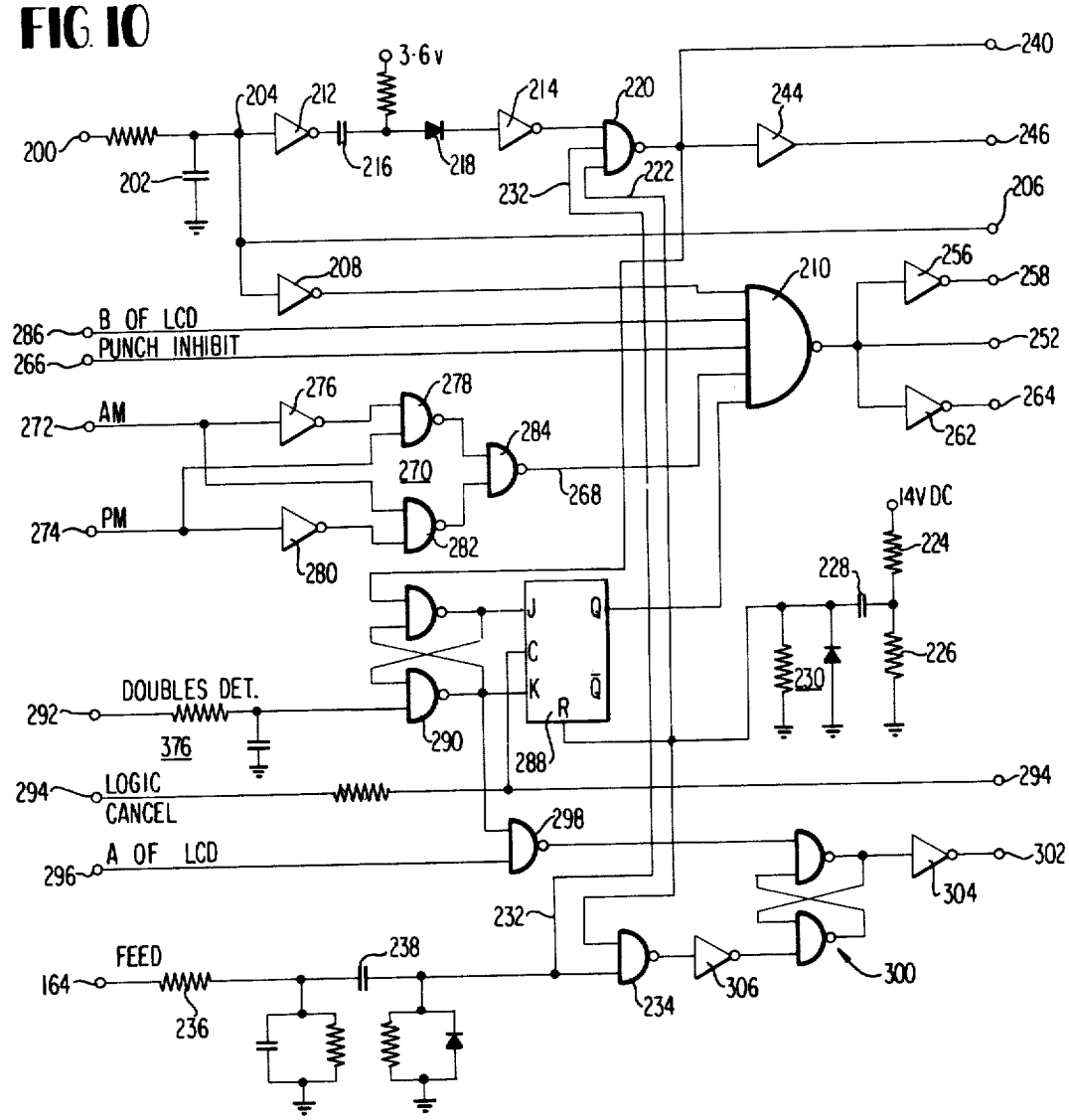
FIG. 10
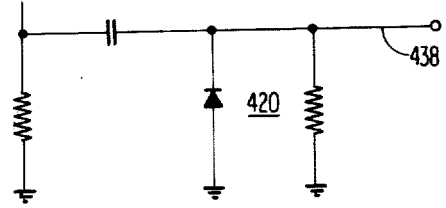
FIG. IIb

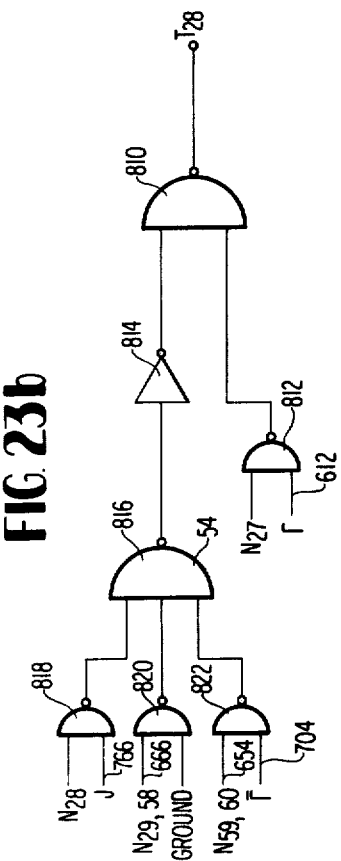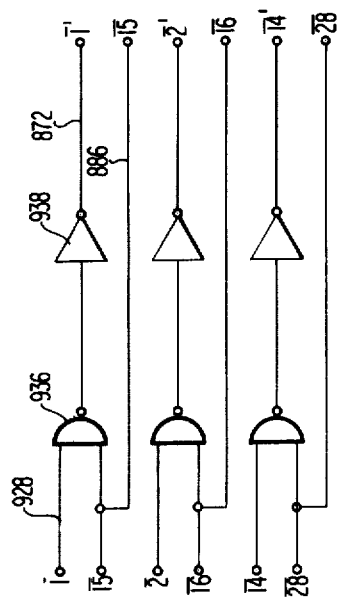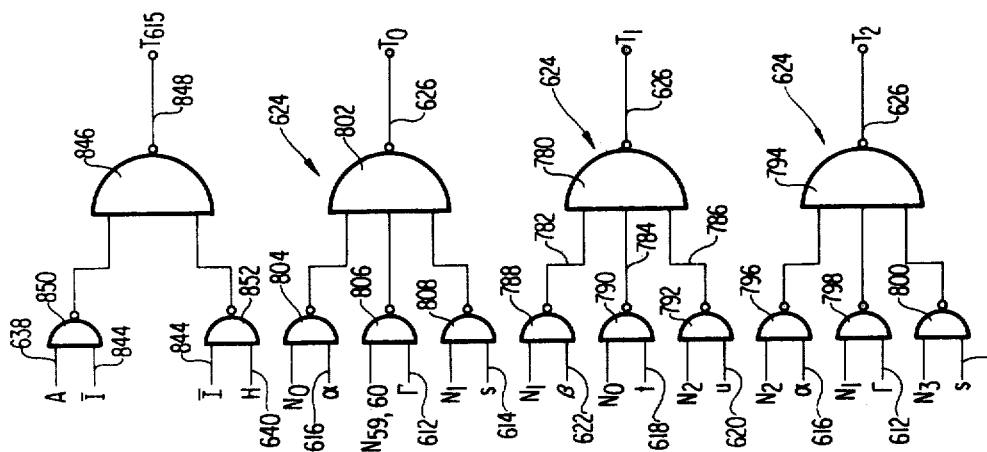
FIG. 23b
FIG. 28
FIG. 23a

PATENTED JUL 22 1975

3,896,300

SHEET 15

PATENTED JUL 22 1975

3,896,300

SHEET 16

AUTOMATIC ARTICLE SORTING AND PUNCHING MACHINE

This is a Divisional Application of Ser. No. 135,656 filed Apr. 20, 1971 and now U.S. Pat. No. 3,767,113.

FIELD OF THE INVENTION

This invention relates to automatic document sorting machines having the capability of retrieving data from a record receiver and automatically transporting the record receiver to a document storage bin or location assigned to the data in the machine. The invention also relates to machines of the aforementioned type that have the additional capability for automatically punching a record receiver in accordance with data recorded on the receiver.

BACKGROUND OF THE INVENTION

1. The Problem

For many years telephone operating companies have used record receivers in card form for the purpose of providing records of the time of day that toll calls are commenced and records of the elapsed time for each such call. The record is usually made with a "Calculagraph" (registered trademark of the Calculagraph Company, Harrison, N.J.) by a telephone operator. Telephone company personnel thereafter visually read the printed data to determine the time of each call and its duration. The toll cards are thereafter marked to show total elapsed time of a call. The cards are then manually sorted into groups where a group differs from the preceding elapsed time group by a factor of 1 minute, e.g., all cards showing an elapsed time in the range 6 seconds through 1 minute 15 seconds are collected as a first group; those cards showing elapsed time in a range of 1 minute 16 seconds to 2 minutes 15 seconds are collected in a second group, etc. Thereafter, a lead card, i.e., a card that is prepunched with a specific elapsed time, is made the first card in each group. For example, a card prepunched with an elapsed time of 1 minute may be placed as the first card of the group of cards for the range 6 seconds – 1 minute, 15 seconds, and a card prepunched for 2 minutes may be placed as the first card of the second group and so forth.

It should be noted that each card was provided with data at the placing of the call indicating the calling and called numbers and such other individual identification data as was appropriate.

The groups of sorted cards are thereafter used by automatic accounting machinery for at least the purpose of computing customers' statements.

From the preceding discussion, it should be apparent that much saving in the way of labor and operating costs can be realized if the toll cards are sorted automatically. Further savings can be realized if they are automatically perforated in accordance with the time of day.

2. Prior Art

The known prior art comprises machines capable of responding to machine language for the purpose of automatically sorting documents such as cards to storage bins or locations. The sorting machines are usually provided with a document conveying trackway or guideway along which are disposed a number of document storage bins. Movable gates are usually positioned along the trackway adjacent to the storage bins, and usually effective when opened to deflect a document from the trackway into a bin. It is also common practice to associate a gate operating solenoid with each gate such that the gate is opened when the solenoid is energized.

Known prior art machines usually provide some form of reader and associated circuitry for detecting data carried by the document and for processing the data so as to selectively energize a gate solenoid. In the general case, magnetically coded data in binary form carried by the documents is read and inputted to a buffer storage. Logic is employed to respond to the storage's outputs so as to energize a gate solenoid. Usually timing means are employed to relate machine sorting speed to circuit speed. An example of this art is represented by the teaching of U.S. Pat. No. 3,246,751. It has also been taught that character recognition apparatus may be employed to read numeric data appearing on documents, see U.S. Pat. No. 3,052,350. These machines are said to be employed to sort bank checks or mail.

In addition, it is known to associate a keyboard, operated punch to a sorting machine, see U.S. Pat. No. 2,745,493.

Finally, there is a suggestion in U.S. Pat. No. 3,031,135 that a flying spot scanner and associated circuitry may be employed to retrieve elapsed time data from a telephone toll card and be used by a utilization circuit. It is therein stated that the utilization circuit may be "a card punch device for punching an information card in the manner known in the art."

It is the principal object of this invention to provide new and useful apparatus that automatically controls the operation of a sorting machine and punch in response to data represented by the angular relationship of marks on record receivers.

It is an object of this invention to provide new and useful control apparatus for a document punch which apparatus is automatically responsive to data relating to time and represented by the angular separation of scanning marks on documents presented to the punch. These and other objects will be apparent from the following detailed description when read in conjunction with the attached drawings in which:

FIG. 5 is a block diagram of the complete electronics of the invention;

FIG. 10 is a schematic diagram of the function generator;

FIGS. 11a and 11b are schematic diagrams of the photocell detector amplifiers and control pulse formers;

FIGS. 16–24 show circuits of FIG. 15 shown as on cards used in the machine;

FIGS. 27 and 28 are schematic diagrams of lead card distribute circuits;

DESCRIPTION OF THE PREFERRED EMBODIMENT

General

Figure 1:
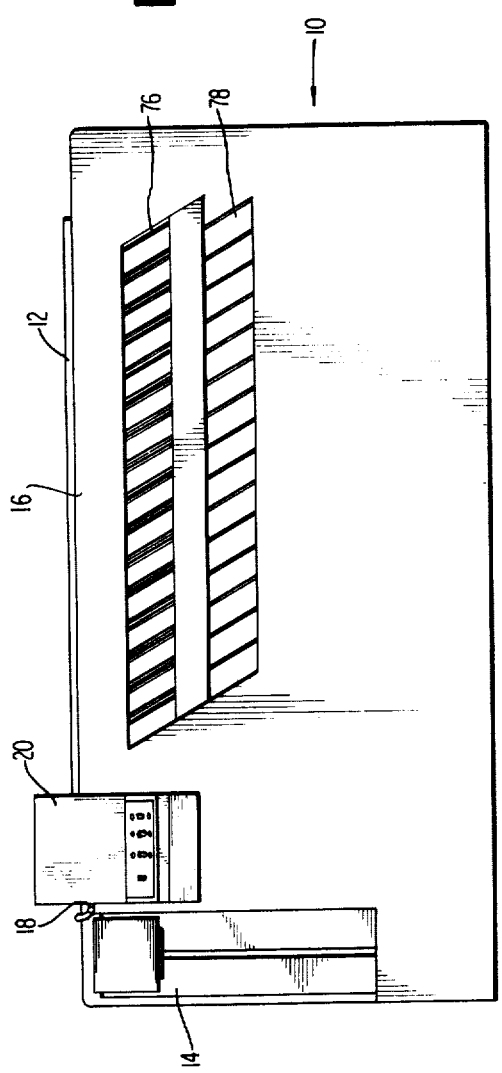
FIG. 1 is a side elevation of the overall machine.
Figure 2:
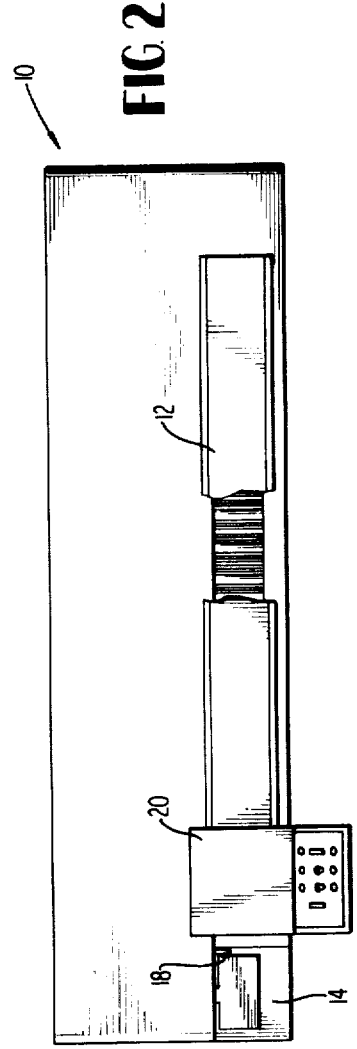
FIG. 2 is a top plan view of the machine of FIG. 1.
Figure 3:
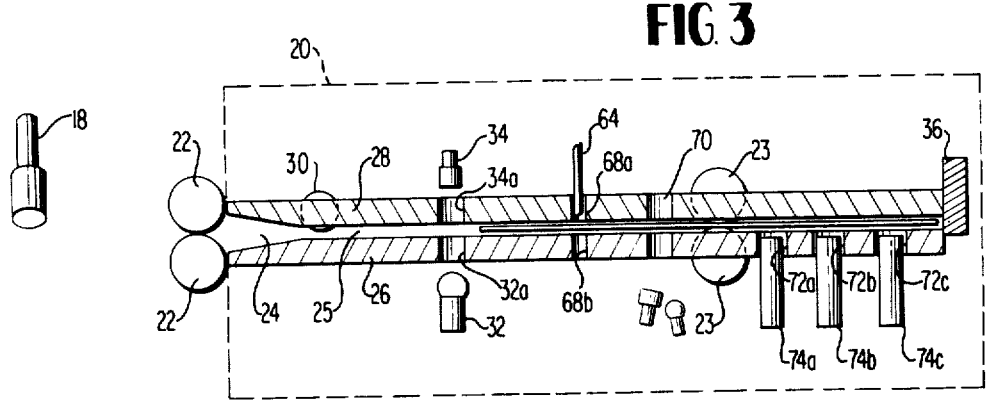
FIG. 3 is a schematic of the scanning station.

Referring to FIGS. 1, 2 and 3 of the drawings, the automatic machine of the invention includes a sorting machine 10 having a horizontally disposed conveying trackway or guideway 12. The trackway is provided with the usual powered rollers and idlers for conveying documents such as cards from a document or card delivery station 14 located at the input to the trackway, to a card discharge section 16 of the trackway. A document feed apparatus 18 is positioned adjacent an input end of the guideway and disposed above the delivery station. The said feed apparatus may conveniently be of the vacuum suction type as disclosed in U.S. Pat. No. 3,201,114, assigned to the assignee of this invention, and it is effective in the manner taught in said patent to deliver cards individually and sequentially to the guideway input.

The trackway rollers are thereafter effective to transport the cards serially to a card scanning station 20 which is shown schematically in FIG. 3. A pair of feed rollers 22 are positioned at an opening 24 for a card conveying cavity 25 formed between a lower card guide plate 26 and an upper guide plate 28. The plates are provided with a number of slots and notches for various card sensing apparatus and for other apparatus used to perform mechanical operations on the cards. Thus a doubles detector 30 is located at the entrance to the cavity 25 such that it will be effective to operate a switch in the event that the feed device 18 provides more than one document to the trackway in a single card feeding operation. The doubles detector may include a pivotal roller positioned in a notched corner of the plate 28, and it may have the structure and operate in the manner taught in U.S. Pat. No. 3,527,456 dated Sept. 8, 1970. Jam sensing photoelectric apparatus comprising a lamp 32 and a photocell 34 may be positioned in ports 32a and 34a, respectively, formed in the plates 26 and 28, downstream, i.e., down the trackway, from the doubles detector. Both the doubles detector and the jam sensing apparatus are preferably located in the station at a distance that is greater than one card length from a card gate 36. As will be described hereinafter, the switch associated with the doubles detector and circuitry associated with the photocell 34 are connected in an electronic control circuit for operating the sorting machine and punch. In the preferred embodiment, both named sensors are designed to be responsive to card movement.

The card gate 36 is located at the downstream end of the plates 26 and 28, and the gate should be constructed and mounted so as to normally block the discharge end of the cavity. In the preferred embodiment, the gate is pivotally mounted and it is provided with an operating arm attached to a solenoid armature. In operation the gate is normally closed such that a card moving in the trackway is stopped by it and held against the propulsion power provided by rollers 23 for a specific period of time. At the end of the period the solenoid is energized as described below to raise the gate such that the card is ejected from the cavity by the rollers 23.

Figure 4:
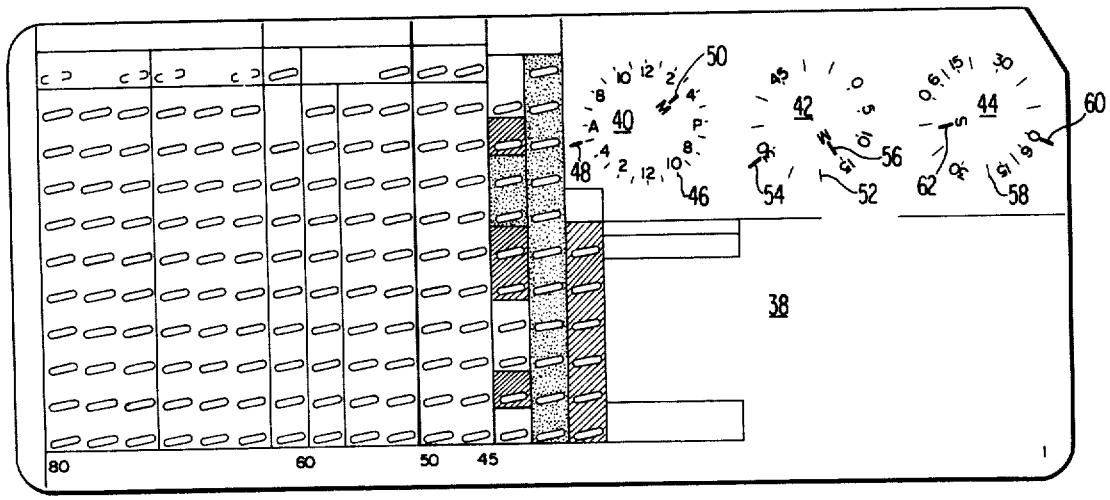
FIGS. 4 and 4a show a card of the type used in the present invention.
Figure 4A:
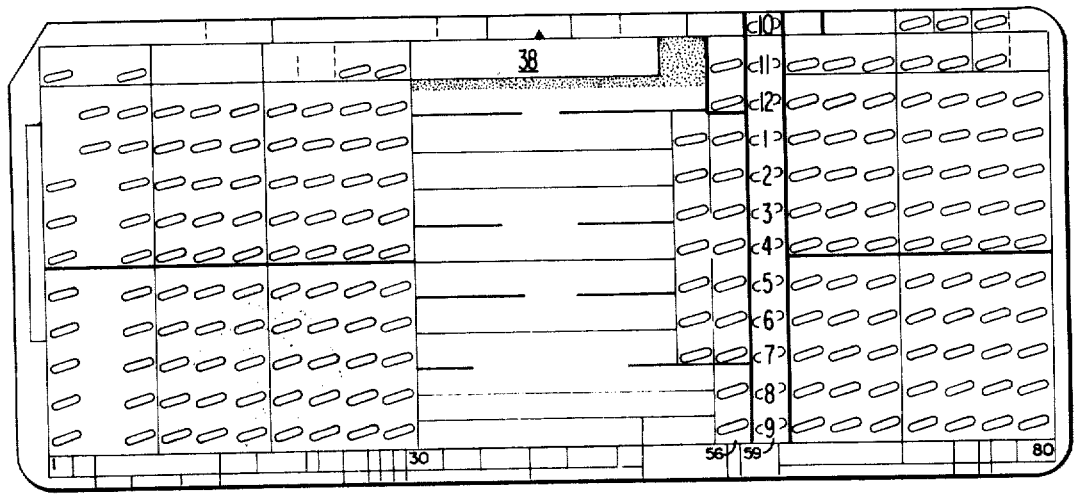

In the preferred embodiment, the scanning station is provided with apparatus to sense information contained on a telephone toll card and it is also provided with punching means for selectively perforating such a card. A card 38 of the specified kind in shown in FIGS. 4 and 4a of the drawings. In the typical card of this type, column 59, FIG. 4a, is provided with 12 columnar positions representing the hours 10, 11, 12 1 ... 9 from top to bottom. Column 56 is provided with two displaced positions for indicating whether the hour marked in column 59 is A.M. or P.M. These columns are hand marked by the operator. Those portions of the card that would, on the face side of an I.B.M. card, normally be provided with columns 1–38 are stamped or printed in the upper half of the toll card with human readable recordings of the time of day 40, elapsed time in minutes 42 and elapsed time in seconds 44. Each of the said recordings includes a clock dial; thus a 24 hour dial 46 is shown for the recording 40, and the time of day is indicated by an hours mark 48 and a minutes mark 50. As will be described below, this information is used by the control system of the invention to selectively actuate an hours punch and either an A.M. or P.M. punch such that columns 74 and 75 of the card 38 are perforated with the pertinent information contained in the recording 40.

The elapsed minutes recording includes a 60 minutes dial having a reference indicator 54 located at the 30 minutes calibration line of the dial and having an elapsed minutes indicator or mark 56. The elapsed seconds recording in the preferred embodiment includes a 120 second dial 58 having a reference mark 60 located at the zero calibration line for the second 60 seconds, i.e., at the 60 seconds position of the 120 seconds dial. An elapsed seconds indicator 62 is provided within the dial 58. The elapsed time recordings are used as hereinafter described to effect the selective storage of the cards within storage bins located in the card discharge section 16 of the sorting machine.

Referring again to FIGS. 1 and 3, it will be noted that the plate 28 is slotted to receive a number of selectively operable punches 64 which punches are supported for reciprocating motion by a punch unit 66 of FIG. 5, the latter named unit being supported by the plate 28. The unit may be of any two column commercially available types. As stated, the plate 28 is slotted as at a location 68a, and the lower plate 26 is provided with a matching slot 68b. The slots are located at a distance from the card stop gate 36 that corresponds to the columns 74 through 75 location on the card 38 and, of course, the slots extend laterally of the plates. The punches are supported by the unit 66 so as to be perpendicular to the respective hours and A.M., P.M. locations in the columns 74 and 75.

A second laterally extending slot 70 is provided in the lower card guide plate 26 downstream of the slot 68b at a position corresponding to columns 48 through 50 on the card when it is held by the gate. A source and photocell or phototransistor is supported so as to extend in the slot 70 such that the photocell may scan the said columns. In the case of the telephone toll card an operator who has calculated the elapsed time of a toll call is required to mark the cards in these columns with the elapsed time in minutes. As was stated above, the present invention obviates the necessity for such markings. However, in certain cases, e.g., the case where a customer requests a call back on the charges for a call, the operator may have marked the card. A card so marked is defined as having been pretimed for the purpose of this invention, and the photocells and sources extending into the slot 70 are associated with pretime control circuitry to be described below. For the moment it will suffice to state that the pretime control circuitry is effective to selectively store a pretimed card in a special storage location in the discharge section of the machine.

Finally, the plate 26 is provided with three spaced clearance holes 72a, 72b and 72c receiving therein time of day 74a, elapsed minutes 74b and elapsed seconds 74c scanning heads, respectively. Each of the said scanning heads may be of the type disclosed in the copending application of Dominick Tringali, Ser. No. 44,741 filed June 9, 1970, and assigned to the assignee of the present invention. The heads may be rotatably supported by a mounting plate located beneath the card guide plate such that their photoelectric scanning elements are located within the holes 72a, 72b and 72c. These holes are preferably made in the plate 26 at locations corresponding to the recordings 40, 42 and 44 on the card 38. As is explained in the above-noted application of Dominick Tringali, each of the scanning heads is effective when rotated to generate a pulse of radiant energy as determined by the positions of the marks relative to the dials. Thus the head 74a will commence the generation of a radiant energy pulse when its photoelectric scanning elements see the hours mark 48 and terminate the pulse when the said elements see the minutes mark 50. Similarly the head 74b will generate a pulse as a function of the angular separation of the elapsed minutes reference indicator 54 with the elapsed minutes mark 56, and the head 74c will generate a pulse in dependence on the angular separation of the marks 60 and 62. The pulses so produced constitute machine generated signals representative of the human readable recordings from which they were obtained.

Referring again to FIG. 1, it will be noted that the discharge section of the trackway 12 is positioned vertically above two vertically displaced rows 76 and 78 of storage bins. The preferred embodiment of the present invention includes thirty such bins, there being fifteen such bins in each of the rows. There is associated with each bin a document deflection gate located in the discharge section of the trackway. Each gate is effective when raised or operated to deflect a document out of the trackway into its associated storage bin. Each of the gates includes actuator means connected to be operated by the movable armature of a solenoid. The bins, gates, and the mechanical solenoid linkages do not constitute a part of the present invention, and suitable arrangements of such means are disclosed in U.S. Pat. No. 3,527,456 dated Sept. 8, 1970.

Each storage bin may be provided with a bin full mechanical detector to provide an electrical output signal in response to the filling of any bin. All of the said detectors for each row of bins may be mechanically linked together to an operating bar for a fuller microswitch located at one end of the row. As will be explained below, pressure of a bin full signal is effective to terminate the operation of the feed device 18. The bin full detection mechanism may be any of the similar suitable types known in the art.

The control circuits and their mechanical interrelation with the various parts of the sorting machine and punch are shown in block form in FIG. 5 of the drawings. Each of the circuits and other components represented by blocks in FIG. 5 will be described in detail below. In general, the operation of the machine is controlled, as to turn on and for a special situation to be described, from a panel control 82 that includes push button, solenoids, and control relays for initiating the feed of documents by the feed cup 18 to the trackway. The circuitry of the front panel controls are shown in detail in FIGS. 6 through 8 of the drawings.

Figure 6:
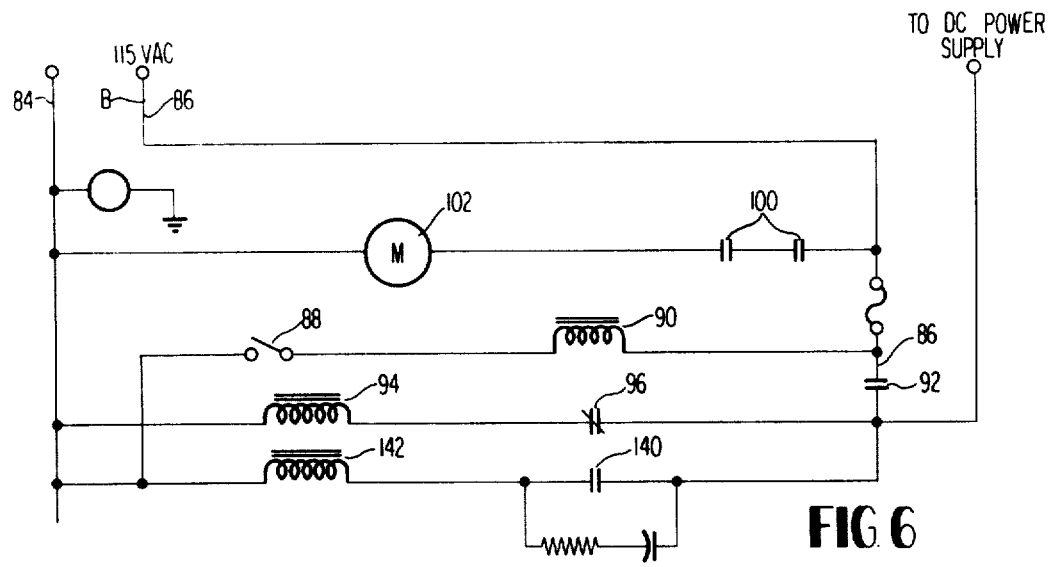
FIGS. 6–8 are wiring diagrams of the machine panel controls.

Referring to FIG. 6, 115 VAC may be applied to a pair of machine power lines 84 and 86 across which are connected a number of relays and solenoids. The line 84 extends to the relay control panel 82 to connect a start switch 88 located at the panel to a start relay 90 which relay is connected on its other side to the power line 86. The switch 88 is normally open and it is effective when closed to energize the relay 90 such that a pair of start relay contacts 92 located in series with the line 86 close. A motor relay 94 is connected to the line 84 and to the line 86 through a set of normally closed contacts 96 (FIG. 6) of a jam relay 130 (FIG. 7) and through the contacts 92 of the start relay. Accordingly, energization of the start relay 90 is effective to energize the motor relay 94. Upon energization of the motor relay, its normally open contacts 100 close such that power is applied from the line 84 through a motor 102 to the line 86. The motor 102 is used in the preferred embodiment of the invention to provide driving power to the driven rollers 22 of the conveying trackway and it is also used to rotatingly drive the scanner heads 74a, 74b and 74c.

Referring again to FIG. 5, it will be noticed that a rotating drive shaft 104 is connected by a drive belt 106 to turn a transponder shaft 108. The shaft 108 is in turn linked by a pulley and gear belt 110 to turn each of the scanner heads 74a, 74b and 74c in synchronism with each other and at the same rotational rate as the transponder shaft 108. In the preferred embodiment, the transponder shaft forms the drive arrangement for a photoelectric transponder 112. The transponder is a commercially available pulse generator that employs a slotted disc for the purpose of generating a fixed number of electrical pulses, e.g., 480 pulses, for each complete revolution of the shaft 108. It will therefore be seen that with the described drive arrangement, the number of pulses generated by the transponder during operation are automatically synchronized to the turning rate of the scanning heads. Accordingly, any variation in the turing rate of the drive shaft 104 has no effect on the operation of the sorting machine and punch.

Figure 7:
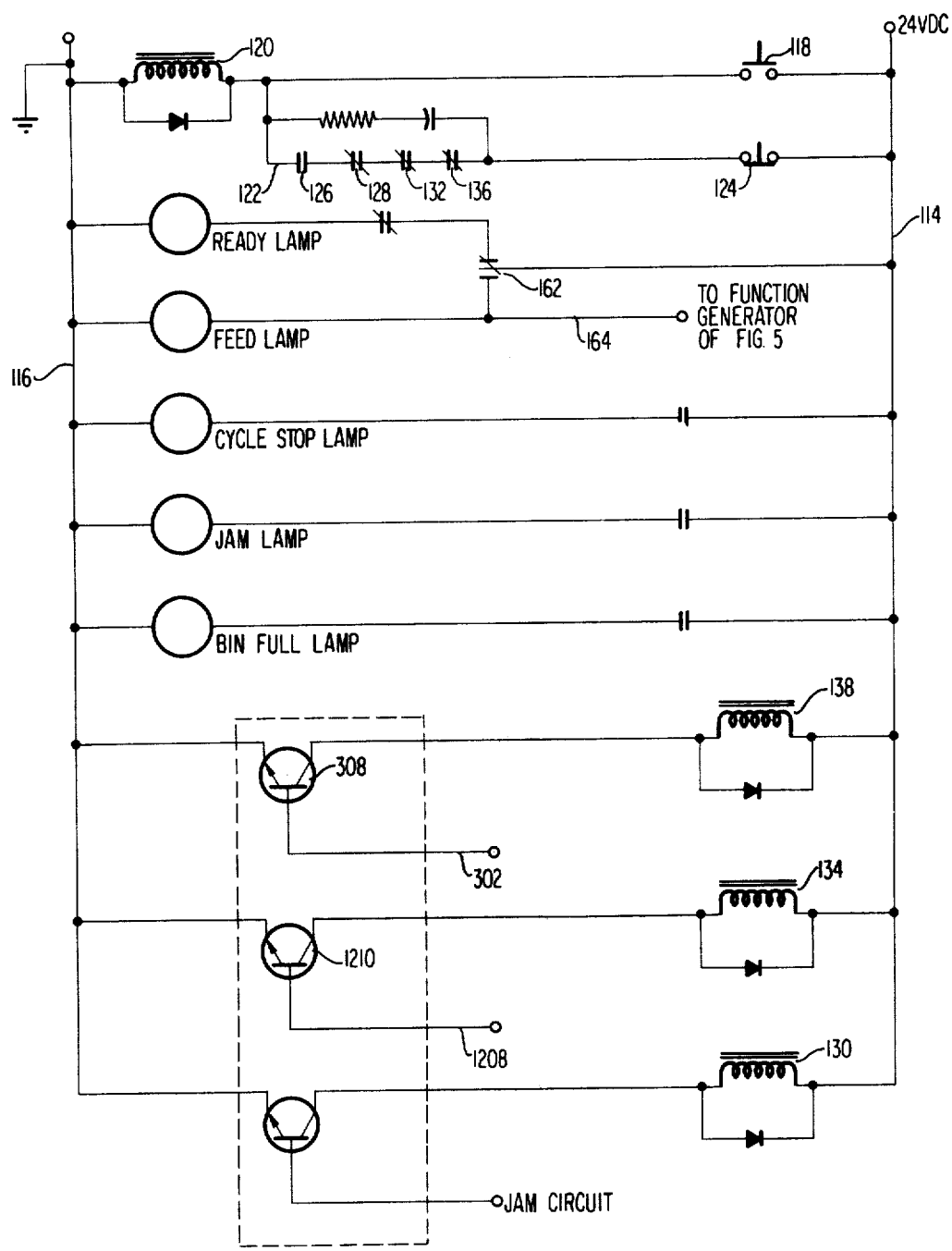
Figure 9:
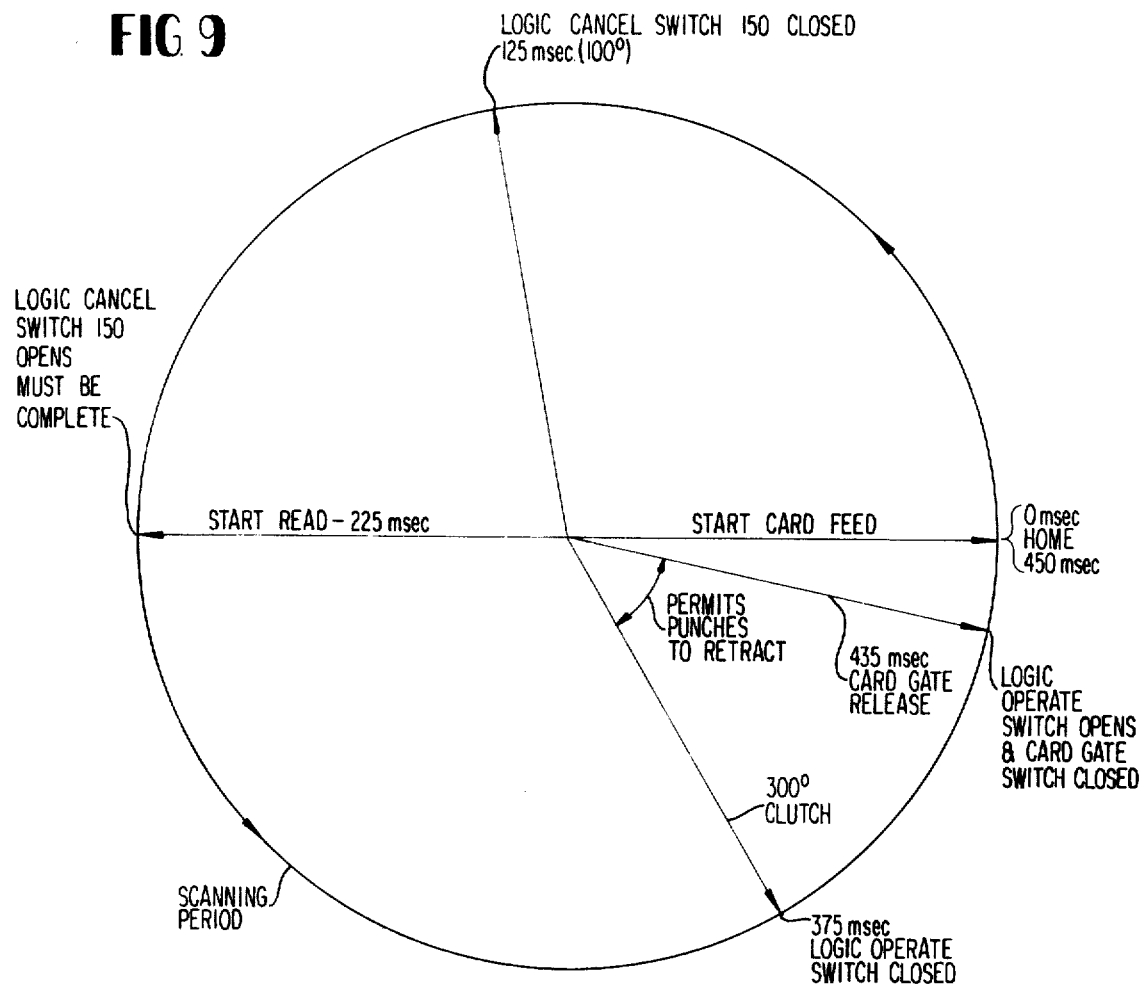
FIG. 9 is a timing diagram of the machine operation.

Referring now to FIGS. 6 and 7, a bus line 114 is provided to supply 24 VDC to a number of control elements when the control elements are preferably connected on their other sides to a ground bus 116. A feed-start push-button switch 118 located on the control panel 82 is connected directly to the line 114 on one side and to one end of a feed relay 120, the other side of which is connected to the ground bus 116. The feed start switch 118 is normally in an open condition, i.e., it is pushed to energize the feed relay 120 and upon release automatically opens. A holding circuit 122 for the relay 120 is connected between the push button side of the relay and the hot line 114, through a normally closed feed stop push button 124. The holding circuit includes a pair of normally open contacts 126 of the feed relay 120 connected in series with three serially connected sets of normally closed contacts; the said normally closed contacts constitute the contacts 128 of the jam relay 130, the contacts 132 of a bin full relay 134, and the contacts 136 of a cycle stop relay 138. In operation, pressing of the feed start switch 118 effects energization of the feed relay 120, thereby causing its contacts 126 in the holding circuit to close such that the relay is held energized until such time as the holding circuit might be opened either manually or by automatic opening of contacts 128, 132 or 136. The feed relay closes a pair of contacts 140 (FIG. 6) that are connected in series with a clutch solenoid 142 connected between the previously described bus lines 84 and 86. The clutch solenoid is not physically located at the relay panel but is located to operate a clutch 144 (shown schematically in FIG. 5) such that when the solenoid is energized, the clutch engages a driving arrangement for a pair of cams 146 and 148. The cams in turn cyclically operate a logic cancel switch 150 and a logic operate switch 152, respectively, at a rate that is synchronous with the sorting machines capability for sorting cards. In addition, a card gate cam 154 is driven when the clutch 144 is engaged such that switch operator carried by the cam is effective to operate a card gate switch 156 for each rotation of the clutch. A timing diagram for the operation of the named switches is shown in FIG. 9 relative to a single complete revolution of the clutch 144. At zero degrees of revolution the feed device 18 commences delivery of a card to the trackway. In the preferred embodiment, the clutch requires 450 milliseconds to make a complete revolution. The cam 146 is designed to operate the logic cancel switch at 125 milliseconds to generate a logic cancel voltage pulse, having a duration of 100 milliseconds. The logic operate switch is designed to be operated by the cam 148 at 375 milliseconds of clutch rotation to generate a voltage pulse having a duration of 60 milliseconds. The said pulses are coupled over connectors to a function generator 158 where they are used for a variety of control purposes as hereinafter described. The card gate cam operates the switch 156 at 435 milliseconds of clutch rotation so as to energize a card gate 160 solenoid for about 15 milliseconds. It will be recalled that the card gate 36 normally closes the scanning station cavity and it was described as being solenoid actuated to release a card such that it might be driven to the discharge section of the trackway. The rates referred to are consistent with the sorting rate of the machine which is approximately 8,000 cards per hour. Obviously other known means such as slotted discs and photocells could be used in place of the cam arrangement just described.

Referring again to FIG. 7, the feed relay 120 is also provided with a pair of double pole contacts 162 which contacts put a line 164 at the DC potential of the line 114 when the relay is operated. The line 164 connects as an input to the function generator 158.

Figure 8:
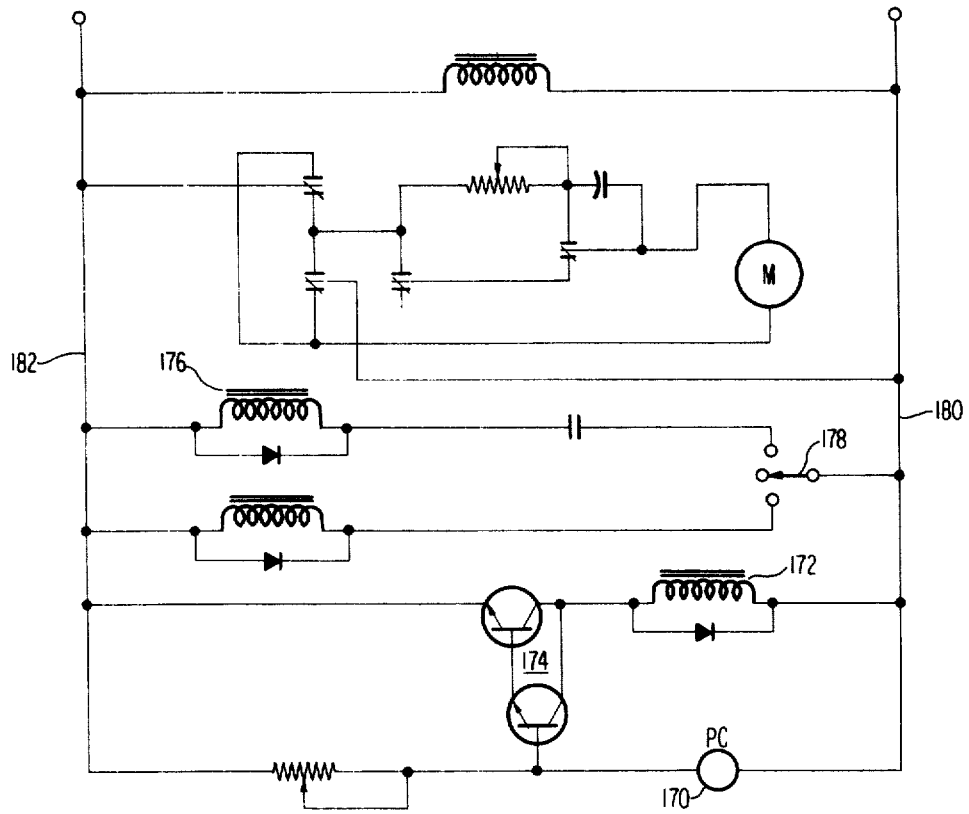

The final machine control is shown in FIG. 8 which is a schematic representation of a card elevator circuit for automatically supplying cards to the feed device 18. The circuit is essentially that shown in the Swartz U.S. Pat. No. 3,527,456 dated Sept. 8, 1970, except that the circuit has been modified in one detail. A photocell 170 is positioned to sense the height of cards on an elevator as is explained in the patent. When the photocell sees "white" it causes a relay 172 to be energized through a Darlington amplifier 174. With energization the relay 172 closes contacts for an up elevator relay 176 through a switch 178 and a pair of supply lines 180, 182. With energization the up elevator relay supplies power to the armature of a DC elevator drive motor such that a platform is raised at the feed station. The platform is lowered through a reverse operation of the switch 178, as explained in the patent.

The Function Generator

The function generator 158 is shown in greater detail in FIG. 10 of the drawings. The generator serves the purpose of providing a plurality of signal outputs which are utilized for the purpose of controlling the timing of the operation of the controls for the sorting machine and for the punch. It also provides signal outputs for the purpose of operating the cycle stop relay 136 under a specific set of circumstances, as will be described. The generator receives a number of inputs, some of which are provided by other portions of logic employed in the machine and others of which are provided by the switches previously described. The circuits employed in the function generator use negative NAND-INVERSION logic to generate the control signals, and of course those skilled in the art will recognize that other known suitable logic could be used instead.

For the purpose of the remainder of this specification the following definitions will apply:

1. A letter representing a signal, e.g., A is normally at a high potential level, e.g., 3.6 VDC, in the absence of the signal and is at a low potential level, e.g., 0 volts, whenever the signal is present; and 2. A letter representing a DOT signal, e.g., $\overline{A}$ is normally at a low potential level, e.g., 0 volts, in the absence of the signal and is at a high potential level, e.g., 3.6 VDC whenever the signal is present.

Referring to FIG. 10, the logic operate switch 152 is connected over a line 200 to charge a capacitor 202 for the 60 millisecond duration of the logic operate pulse. The capacitor is connected to a junction 204 which junction is connected directly to an output terminal or line 206; accordingly, the terminal 206 goes high with the closing of the logic operate switch and remains high so long as the switch is closed. The line 206 is connected directly to pretime logic responsive to pretimed cards as will be described below under a separate heading.

The junction 204 is also connected to the input of an inverter 208, the output of which is connected to one input of a five input NAND gate 210. The function and operation of the gate 210 will be described below, but from what has been said, it will be seen that the output of the inverter 208 is normally high such that it constitutes an inhibit for the gate 210, meaning that the normal output of the gate 210 is a low potential. The inverter 208 will provide a low level output so long as the junction 204 is at a high potential, thus during the operation of the logic operate switch the said inhibit for the gate 210 is removed.

Finally, the junction 204 is connected as an input to an inverter-timing network comprising a pair of inverters 212 and 214 interconnected by an RC network. This circuit is utilized to divide the period of the pulse created by the logic operate switch to produce a cancel pulse that commences with the closing of the switch and terminates before the switch is again opened. In the preferred embodiment the pulse has a duration of 10 mils. To generate the shortened cancel pulse the output of the inverter 212 is connected to a capacitor 216 having a value of 4 microfarads, and the capacitor is connected through a diode 218 to the input of the inverter 214. The junction between the capacitor and the diode is connected through a resistor to a 3.6 VDC source. In the absence of a positive voltage on the line 200, the output of the inverter 212 is at 3.6 VDC in that the inverter is non-conducting at this time. Accordingly, the capacitor 216 is uncharged and, in view of the fact that the junction between the capacitor and the diode is connected to a 3.6 VDC, current is injected into the base of the inverter 214. Under these conditions, the output of the inverter 214 is at a low level. With the occurrence of a pulse on the line 200, the inverter 212 conducts such that a charge path is created through the inverter for the capacitor, and during the charging of the capacitor, current cannot flow into the base of the inverter 214. During this period the output of the inverter 214 will go to a high potential, and at the termination of the charging interval for the capacitor 216, current is again injected into the inverter 214 to thereby cut it off and send its output high. The output of inverter 214 is connected to an input of a three input NAND gate 220. The gate 220 is connected over a line 222 to the output of a pulse forming network which network is effective to generate a pulse of specific duration upon initial energization of circuitry. After energization or start up, the line 222 goes low and remains low. The pulse forming network will be described in that essentially similar start up networks are used with other control circuits for the machine of the invention. It comprises a pair of resistors 224 and 226 connected between a source of 14 VDC and ground such that upon the application of power to the circuitry at turn-on, a voltage drop is obtained across the resistor 226. The junction of the two resistors is tied to one side of a capacitor 228 which is tied on its other side to a resistor diode combination 230 and directly to the line 222. Upon start up, the capacitor 228 is uncharged; thus a voltage appears across the resistor of the combination 230 as a voltage spike. As the capacitor charges up, the line 222 degenerates to ground potential and remains there until turn-off of the machinery. Accordingly, the line 222 is pulsed at start up and goes to ground with the charging of the capacitor 228.

The third input to the NAND 220 is obtained from a line 232 connected directly to one input of a two input NAND 234 and through a resistor 236 and capacitor 238, respectively, to the feed relay hot line 164 (FIG. 7). It will be recalled that the line 164 is at the DC potential of the line 114 after energization of the feed relay. A resistor-diode combination is connected to the line 232 and to the capacitor 238 such that energization of the line 164 causes the capacitor 238 to charge to a value less than the potential of the line 164 in view of the series resistor 236. Accordingly, energization of the feed relay is effective to send the third input of the NAND 220 high in that the line 232 is pulsed during the charging of the capacitor 238. Upon completion of the charge, the line 232 goes to ground.

From the preceding, it will be seen that after start-up and after energization of the feed relay, all three inputs to the NAND gate 220 are normally at a low potential such that the output of the gate is normally at a high potential level. The output of the NAND 200 is connected directly over a line 240 to an input of a lead card distribute circuit 242 (FIG. 5) which circuit will be described below. The gate 220 is also connected on its output through an inverter 244 to a second output line 246. The line 246 is connected to a logic reset input for a bin gate drive circuit 248 (FIG. 5) which circuit will be described below.

From the foregoing, it should be apparent that the output of the NAND gate 220 is normally at a high potential level and it remains high until the logic operate switch 152 is operated during a revolution of the clutch 144. The gate's output goes low with such operation to send the line 240 low and the line 246 high for a period as determined by the timing network interposed between the inverters 212 and 214.

The five input NAND gate 210 previously mentioned as receiving the output of the inverter 208 and, accordingly, the inverse of the voltage appearing on the line 200 also receives four other input voltages as determined by: (1) conditions on outputs of the A.M.-P.M. circuit 250 (FIG. 5); (2) conditions on an output of the lead card distribute circuit 242; and (3) by the condition of the doubles detector 30. Since the output of the inverter is normally at a high potential, it will be seen that the output of the gate 210 is normally at a low level. The gate 210 is connected on its output directly to a line 252 which line is accordingly normally at a low voltage potential.

The output of the gate 210 is connected through an inverter 256 to a line 258 which line constitutes a normally high input to elapsed time logic circuits 260. The elapsed time circuits are used as hereinafter described to select a document deflection gate in the discharge section of the trackway for operation.

Finally, the gate 210 is connected on its output through another inverter 262 to a third output line 264. The line 264 is connected as an input to the A.M.-P.M. logic circuits 250. The line 264 is normally at a high potential level and provides a punch enable potential to the A.M.-P.M. circuits when the output of the gate 210 is at a high potential.

The gate 210 is controlled on two of its inputs by signals obtained from the A.M.-P.M. logic 250. A first line 266 from the said logic is normally at a high potential level and goes low only after the A.M.-P.M. scanner head 74a puts out a radiant energy pulse representing an analogue of a time of day recording. The second input to the gate 210 obtained from the A.M.-P.M. logic is applied over a line 268 connected to the output of an EXCLUSIVE OR arrangement of NANDs and inverters in the function generator identified by reference numeral 270.

The EXCLUSIVE OR circuit 270 receives an A.M. signal output from the logic 250 over a line 272 and it receives a PM output signal from the said logic over a second line 274. The lines 272 and 274 are normally at a high potential level, and if a valid signal is received by the A.M.-P.M. logic 250, one of the lines 272 or 274 will go low level. The gating network 270 comprises an inverter 276 connected to receive the A.M. signal on the line 272, and the inverter is connected on its output to one input of a two input NAND 278. The NAND 278 is also connected on its other input to the P.M. signal line 274. The P.M. line 274 is connected through an inverter 280 to one input of a second two input NAND gate 282, which second gate is connected through its other input directly to the A.M. line 272. The output terminals of the gates 278 and 282 are connected as inputs to a third NAND gate 284. From what has previously been said then, it will be seen that the outputs of the inverters 276 and 280 are normally at low levels while the outputs of the A.M.-P.M. lines are normally at high levels, i.e., in the absence of either an A.M. or P.M. signal. Accordingly, both the outputs of the gates 278 and 282 are normally low, and the output of the gate 284 is normally high. This last named output is connected through the line 268 to form one input of the NAND 210. In the event that either the A.M. line 272 or the P.M. line 274 goes low, then both inputs of one of the gates 278 or 282 will go high to cause the output of the gate 284 to go low. For example, assuming that the A.M. line goes low and assuming that the P.M. line remains high, both inputs to the gate 282 will go low such that its output goes high. As in the usual case, when the output of the gate 282 goes high, the output of the gate 284 must go low. However, in the event of error, i.e., signals appear simultaneously on both the A.M. and P.M. lines 272 and 274, then the inverters 276 and 280 operate to drive the inputs of the gates 278 and 282 to which they are connected respectively, high such that the outputs of the gates 278 and 282 remain low, and such that the output of the gate 284 remains high.

From what has been said so far, it is apparent that the normal conditions at the inputs of the gate 210 provided by the inverter 208, punch inhibit line 266 and the A.M.-P.M. EXCLUSIVE OR 270 are such as to maintain the output of the gate 210 low until such time as all three said inputs go low. In the normal operation of the sorting machine and punch, the scanner heads operate to read data appearing on the record receiver at 225 mils. into a card feed cycle or, that is, at 180° of clutch rotation. The said reading cycle is completed by 375 mils of clutch rotation or, that is, 300° of rotation. During this period of time, the A.M.-P.M. logic 250 will respond to the data appearing in the A.M.-P.M. recording and if such data is valid, will cause both the punch inhibit and A.M.-P.M. EXCLUSIVE OR inputs to the gate 210 to go low. If the data is invalid, for example, an A.M. or P.M. signal is not obtained, or both are obtained, or if a valid signal is not obtained from the output of the A.M.-P.M. scanner head, then the said inputs to the gate 210 will remain to inhibit the operation of the gate during the feed cycle in which the invalid data was obtained. If the gate is inhibited for a document that has been scanned by the heads, both the A.M.-P.M. circuits and the elapsed time circuits are, as will be described below, inhibited to prevent the operation of the punch 66, and the card is automatically distributed to a reject storage bin located at the end of the trackway. If, on the other hand, both inputs to the gate 210 had gone low as the result of the receipt of valid A.M.-P.M. data, then under normal operation the occurrence of a logic operate pulse on the line 200 is effective to send all inputs to the gate 210 low, such that the lines 252, 258 and 264 are signalled. In the preferred embodiment, these lines are normally signalled as the result of the operation of the logic operate switch 152, and the pulse generated on the lines has a duration of 60 milliseconds, i.e., a duration equal to the period of operation of the switch.

The gate 210 receives two other inputs which inputs are normally at low potential levels unless special circumstances are met which will drive one or the other of the two inputs high. The first of the said inputs is applied over a line 286 obtained from the lead card distribute circuits 242. This line is normally prevented from going high until a switch is operated at the control panel 82 for the purpose of placing the sorting machine into a lead card distribute mode, as will be described below. When the line does go high, it will remain high so long as the machine is in the lead card distribute mode such that the normal signals obtained at the terminals 252, 258 and 264 are inhibited, i.e., the normal sorting and punching operations are inhibited when the machine is placed in the lead card distribute mode of operation.

The final input obtained at the gate 210 is taken from the set or Q output of a JK flip-flop 288. The flip-flop 288 is connected on both its J and K inputs to respectively receive the set and reset outputs of a NAND latch 290. The latch 290 is connected to receive the output of the gate 220 on its set input and it will be recalled that this output is normally high and goes low for the period obtained as a result of the timing operation effected on a logic operate pulse appearing at the junction 204 previously described. The latch 290 is also connected on its reset input to the doubles detector 30 over a line 292. The reset input of the latch 290 will, therefore, be at the potential of the line 292, and this potential is determined by a microswitch operated by the doubles detector 30 located at the input end of the document sorting machine. It is the function of the doubles detector to determine whether more than one record receiver or card has been fed to the document conveying trackway in a single feed operation, and if such fact is detected, the microswitch is closed to apply a high potential to the line 292.

The logic cancel switch 150 (FIG. 5) is connected by a line 294 to pulse the clock input of the JK 288 for each operation or cycling of the clutch 144. The line 294 is also connected through the function generator 158 via line 240 to the lead card distribute circuits 242, the A.M.-P.M. circuits 250 and the elapsed time logic circuits 260.

From what has been said, it will be seen that the doubles detector line 292 is at a low potential in the absence of detection by the doubles detector of the faulty feed situation described. Since the set input to the latch 290 is normally at a high level, the set output of the latch and, accordingly, the J input to the flip-flop 280 will be at low potentials. Consequently, both inputs to the reset NAND gate employed in the latch 290 will be at low levels and the K input to the flip-flop will be at a high level. During a normal feeding operation, normalcy being defined as a document being fed one at a time to the input end of the conveying trackway, the J and K inputs to the flip-flop 288 will remain as stated and logic cancel pulses applied to the line 294 are ineffective to change the Q output of the said flip-flop; the Q output normally being at a low level such that it does not inhibit the operation of the gate 210.

In the event that a doubles situation is detected such that the doubles detector microswitch is operated, the voltage on the line 292 will go up shortly after the feeding of the document to the read station, FIG. 3, to thereby cause the reset output of the latch 290 to go low, i.e., the K input to the flip-flop 288 at low levels. Thereafter, the line 292 will return low in accordance with passage of the doubly fed documents into the read station, thus allowing the reset output of the NAND latch to return high, and the set output returns low. This condition is timed in the preferred embodiment to be persisting at the commence of a logic cancel pulse on the line 294 and hence at the clock input to the JK flip-flop 288. The bias levels for the JK are set so that with these input conditions the Q output of the JK goes high to inhibit the gate 210. Latch 290 is reset through gate 220 when the next logic operator signal occurs resetting the bias levels on the JK flip-flop 288. With the levels set on the JK, the next pulse on the line 294 is effective to return the Q output of the JK low before the next operation of the logic operate switch 152. From the foregoing, it will be seen that a doubles detection situation is effective to inhibit the output of the gate 210 during the clutch cycle (feed cycle) for which the doubles detection operation occurred. Thus this operation, just as with those previously described regarding this gate, is effective to inhibit the punch and to inhibit the normal sorting of the card; the doubly fed cards are conveyed to a reject bin.

As was stated above, a normally low output level is obtained from the lead card distribute logic 242 and it is applied by the line 286 of the microswitch function generator. A second output line 296 is normally held at a high voltage level by the lead card distribute logic, and it is applied on an input to the function generator 158. The line 296 remains high so long as the sorting machine is not in its lead card distribute mode, and when the machine is placed in such mode, the voltage level on the line 296 goes low in a manner to be hereinafter described with respect to the lead card distribute circuits 242. The line 296 is connected over to one input of a two input NAND gate 298 where the gate 298 receives on its second input the reset output of the latch 290. Accordingly, both inputs to the gate 298 are at high potential levels when the machine is operating in a normal sorting mode and in the absence of a doubles detection such that the output of the gate 298 is normally at a low potential level. The gate 298 is connected on its output to the set input of a NAND latch 300 having its set output coupled to an output line 302 through inverter 304. The reset input to the latch 300 is obtained through the two input NAND gate 234 previously described. It will be recalled that the NAND gate is connected to receive inputs from the line 222 (the automatic start-up reset line) and to the line 232 (the feed relay energization reset input). Accordingly, after start-up and after energization of the feed solenoid, both inputs to the gate 234 are low such that its output is at a high level. The output terminal of the gate 234 is connected to the reset input of the latch 300 through an inverter 306 such that under these described conditions the reset input of the latch is at a low level. The reset output of the latch 300 is under the described conditions at a low level in that it was so set at start-up through the operation of the gate 234 and it is held at such level by the high set output of the latch 300. The line 302 is normally at a low potential.

The line 302 is connected as an input to a base electrode of a transistor switch 308 (FIG. 7) and under the described conditions the switch 308 is non-conducting. The cycle stop relay 138 is connected between the line 114 and the collector of the transistor switch 308; the relay 138 is, consequently, normally unenergized.

Returning to FIG. 10, when the sorting machine is placed in its lead card distribute mode, the line 296 goes low such that one of the inputs to the gate 298 also goes low. The gate 298 will not change state on its output unless the reset output of the doubles detector NAND latch 290 goes low as the result of a pulse on the line 292. In the event of a doubles detection while the machine is in its lead card distribute mode, the reset output of the latch 290 will go low as previously described, thus sending both inputs to the gate 298 low. With both inputs low, the output of the gate 298 will go high to send the set output of the latch 300 low and the line 302 high. Accordingly, the transistor switch 308 is energized to thereby energize the cycle stop relay 138. Upon energization, the relay's contacts 136 reverse to break the holding circuit 122 for the feed relay 120 to thereby deenergize the feed relay. Upon deenergization, the feed relay's contacts 140 located in series with the clutch solenoid open to thereby deenergize the solenoid such that the feeding of documents to the conveying trackway and the cycling of the machine obtained through the operation of the camming switches is terminated. This result is necessary when the machine is in the lead card distribute mode for the reason that the lead cards are pre-punched with predetermined amount of elapsed time and are fed in sequence to each of the storage bins in the document sorting machine for a purpose that will be described with respect to the operation of the machine when it is in such mode.

As should be clear from the foregoing description relative to the control panel functions, solenoids and relays, the latch 300 cannot be reset until the feed relay is thereafter energized by operation of the feed relay start push button. In the event that the trouble resulting from the fact of doubles detection has been cleared up, operation of the push button is effective to apply a pulse to the line 164 to thereby pulse the reset input of the latch 300.

Amplifier and Pulse Forming Circuits

Figure 11A:
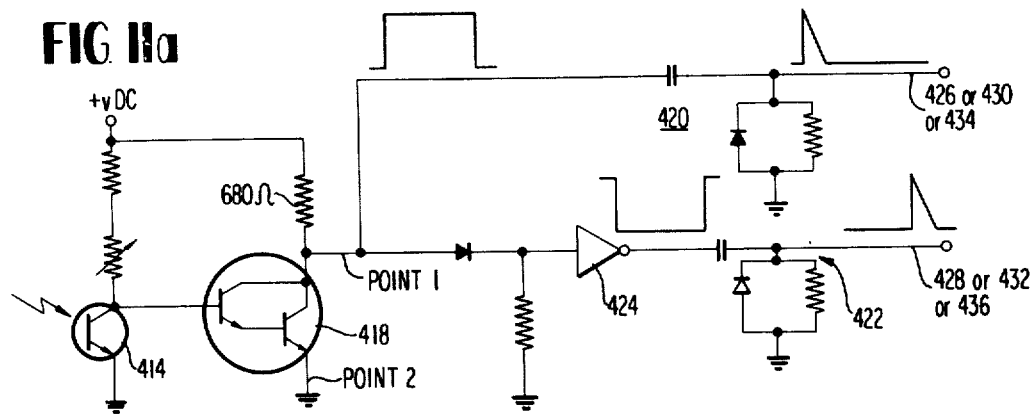
Figure 12:
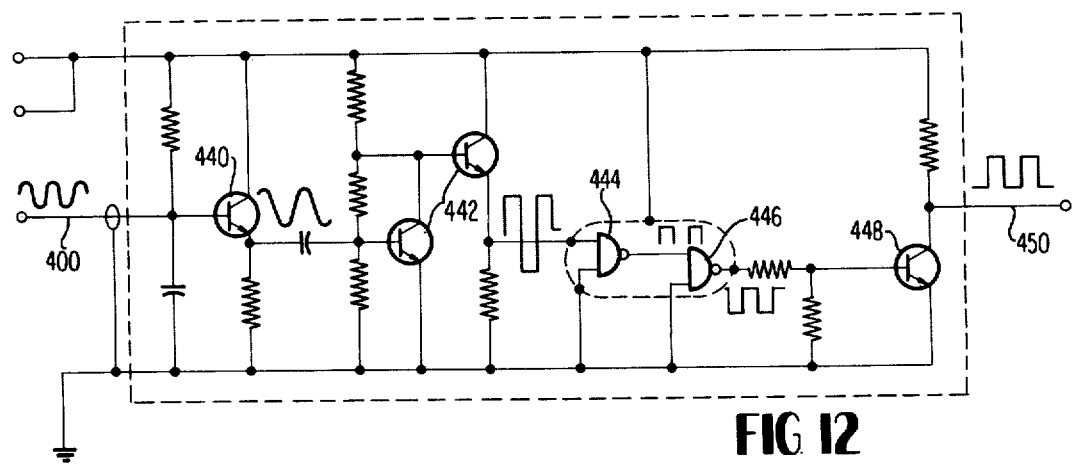
FIG. 12 is a schematic diagram of a transponder pulse amplifier.
Figure 13:
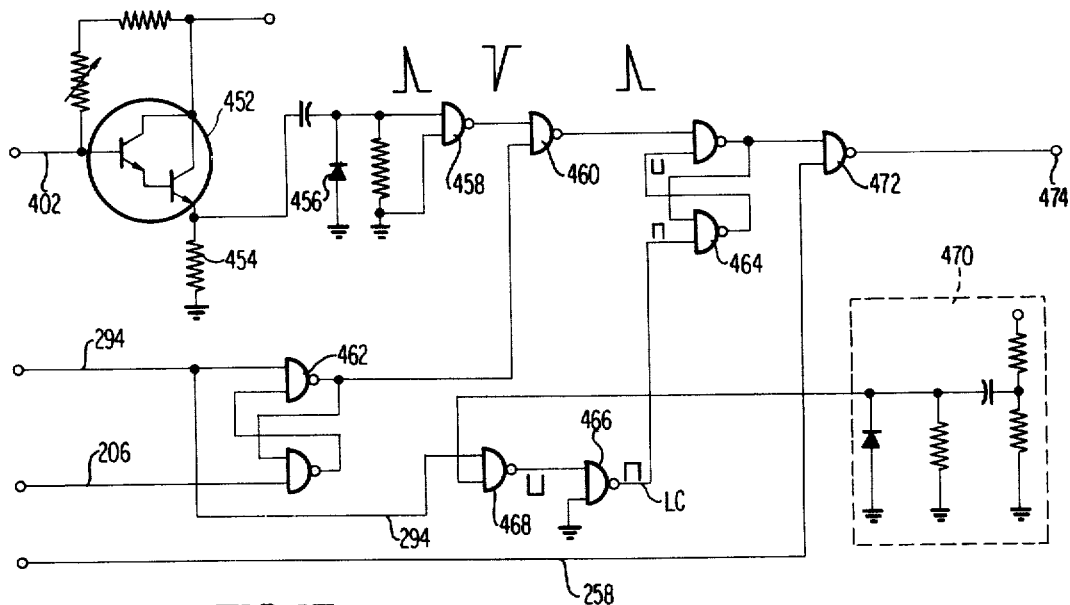
FIG. 13 is a schematic diagram of a pretime pulse generator.

The circuits referred to are represented as the block 254, and they are shown in greater detail in FIGS. 11 through 13 of the drawings. It is the general function of the said circuits to detect radiant energy signals and to convert such signals into pulses that are effective to control the application of pulses generated by the transponder 112 on a line 400 (FIG. 5) to a plurality of binary up counters. The said circuits include an amplifier (FIG. 12) for transponder pulses, and they include logic circuits (FIG. 13) responsive to a pretime radiant energy signal on a line 402 generated in phototransistors located in the pretime slot 70 to generate a pretime control signal $\overline{P}$. Finally, a circuit is provided to generate an A.M.-P.M. start control pulse in response to an electrical pulse provided on a line 404 (FIG. 5). This last-named pulse is generated by a photocell or phototransistor 406 positioned to receive light from a source 408 through a disc 410 mounted for rotation on the transponder shaft 108. The disc 410 is provided with a radially extending slot such that the transistor 406 is pulsed once for each revolution of the shaft 108. When the scanning heads 74 are initially installed, the disc 410 should be aligned with regard to the photocells in the A.M.-P.M. head 74a such that the transistor 406 is pulsed as the photocells scan the 12 o'clock calibration lines on the 24 hour dial 46 located on a card 38. Once alignment has been achieved, the transistor 406 will pulse at the proper moment for all scanning operations.

It will be noticed in FIG. 5 that each of the heads 74a, 74b and 74c transmits a radiant energy representation signal to a respective radiant energy detector 412, 414 and 416 where the detector 412 is responsive to the representation of the A.M.-P.M. dial, the detector 414 is responsive to the representation of the elapsed minutes dial, and the detector 416 is responsive to the representation of the elapsed seconds dial. Each of the detectors 414 and 416 is connected to operate an amplifier-pulse former circuit where the circuits are essentially duplicates of each other; one such circuit is shown in FIG. 11a and a discussion of it will suffice to describe the other such circuit.

Referring now to FIG. 11a, a radiant energy representation of the elapsed minutes recording generated by the head 74b is detected by a photo transistor 414. The said transistor is connected by its collector to the base electrode of a Darlington amplifier 418, and its collector is also connected to a positive DC source through the usual voltage dropping resistors; the transistor 414's emitter may be connected directly to ground. In the elapsed minutes and elapsed seconds and in the A.M.-P.M. sensing situation, the radiant energy detectors do not sense light until such time as the scanner head signal generator comes on. For this reason, the base electrode of the Darlington amplifier 418 in each such case is at the DC source potential and the Darlington is therefore conducting. Under such circumstances, the collector electrode of the Darlington amplifier is at ground potential.

In the elapsed minutes (and in the elapsed seconds) situation, a differentiator circuit 420 is connected directly to the collector of the Darlington amplifier 418, and a second differentiator 422 is connected to the collector of the Darlington through an inverter 424. Accordingly, when the photoelectric element in the base circuit of the Darlington sees light, therefore, causing the base of the Darlington to go to ground, the Darlington ceases to conduct such that its collector voltage goes to the positive DC source value. At such time, the differentiator 420 will produce an output pulse on a line 426 where the length of the pulse will be dependent upon the RC time constant of the differentiator circuit. No action takes place at the differentiator 422 for the reason that the polarities at the instants of time mentioned above are such as to prevent a voltage change. However, when the output signal generator of the scanner head 74b goes off, the collector of the Darlington 418 will go to ground in view of the fact that its base is brought back to the DC source level. With this change, the output of the inverter 424 will go up such that the capacitor element in the differentiator 422 will charge and produce a voltage pulse on a second output line 428.

The lines 426 and 428 are shown as a single line in FIG. 5. A pair of seconds lines 430, 432 are also marked as a single line in FIG. 5 where the said lines represent the output conductors for the elapsed seconds detector 416's pulse forming circuits. Finally, the precise type of circuit described with regard to FIG. 11a is employed to produce a pair of pulses on lines 434 and 436 as a response to a radiant energy pulse generated by the A.M.-P.M. head 74a.

The circuit shown in FIG. 11a is modified in order that it may be used to generate a control pulse as the result of a start pulse on the line 404. The detector 406 connected to the base of the Darlington circuit 418 normally sees black, and, accordingly, the Darlington is normally non-conducting. Accordingly, when the A.M.-P.M. start signal occurs on the line, the Darlington is rendered conductive for the duration of the light pulse. The circuits described above may be modified for use in the A.M.-P.M. start pulse case by connecting the Darlington 418 to operate as an emitter follower, and by connecting a differentiation circuit 420 to the emitter electrode for the Darlington. A start control pulse produced by such a circuit is applied over a line 438 to the input of the A.M.-P.M. logic circuits 250 in FIG. 5.

Transducer Amplifier

The input signal obtained on the line 400 from the transponder constitutes a sinusoid and the signal may be amplified and converted to a pulse train by a circuit of the type shown in FIG. 12. As a practical matter, this amplifier is conveniently housed within the transducer itself. As shown, the sinusoid is applied to emitter follower 440. The output from the follower 440 may be applied to the base of a transistor amplifier pair 442 connected so as to produce one phase reversal. The said pair may be overdriven so as to square up and clip the sinusoid. The output of the amplifier may be applied to the input of a NAND-INV 444 which inverter may be connected on its output to drive a second NAND-INV 446. The said NAND-INVs operate to square and clip the output of the amplifier pair 442 or, that is, to convert the original sinusoid into a pulse train of negative going excursions on the output of the NAND-INV 446. The output of the second NAND may be connected to the base electrode of an output transistor amplifier 448 operating as inverter to produce transducer pulses on an output line 450.

Pretime Signal Generation

It will be recalled that for some situations the operator will pretime a card 38, i.e., she will mark it in the appropriate columns with a value of elapsed time as calculated from the elapsed time recordings. Usually she will also mark the cards with the charges for the call and, accordingly, such cards do not require the usual processing done by the machine of this invention. Accordingly, they are automatically sent to a pretime storage location in the discharge section of the machine. For this purpose, a special pretime pulse signal is generated by a pretime logic circuit, shown in FIG. 13. It should be noted that it may be desired to perforate the pretime card with the time of day in which case the pretime signal generated by the circuit of FIG. 13 is not employed to inhibit the punch unit. However, if punching is not desired, then the pretime signal could be used as a sixth input to the inhibit NAND 210 in the function generator and, as will be apparent from the description of the Bin Gate Drive circuits 248, it will still be effective to select the pretime bin.

Referring to FIG. 13, the line 402 connected to the pretime radiant energy sensor in FIG. 5 is normally low level in that in the absence of a pretime signal the detector "sees white" and is conducting. The line 402 is connected, as in the previously discussed sensor amplifier cases, to the base electrode of a Darlington amplifier 452. The amplifier is normally nonconducting, and in the event that a pretime marking on the card is sensed, i.e., the photodetector connected to the line 402 senses black, the base of the amplifier 452 will go up to thereby cause it to conduct such that a voltage is developed across an emitter load resistor 454. A differentiator 456 is connected to the emitter load resistor such that a voltage at the emitter is effective to generate a pulse at the output of the differentiator. The differentiator in turn is connected on its output to an inverter 458 with the output of the inverter being connected to one input of a two input NAND gate 460. In the absence of a pulse on the base of the amplifier 452, the output of the inverter 458 is at a high level and the said output will only go low in the event of the generation of a pulse by the differentiator 456.

The gate 460 is connected on its other input to the set output of a NAND latch 462 where the latch receives its set input from the logic cancel signal line 294. The latch 462 is coupled by its reset input to the line 206 which it will be recalled is connected directly to the junction 204 in the function generator and is responsive to a logic operate pulse produced by the switch 152. Accordingly, a logic cancel signal on the line 294 is effective to drive the set output of the latch 462 low, and operation of the switch 152 is effective to return the set output of the latch to a normal high potential level. It will be recalled that the logic cancel switch is operated at 125 mils. of clutch rotation and that the logic operate switch is operated at 375 mils. of clutch rotation and that the logic operate switch is operated at 375 mils. of such rotation. Thus the set output of the latch 462 goes low with the commencement of a logic cancel pulse and remains low throughout until operation of the switch 152; this period includes the time interval within which the heads 74a–74c make a scanning operation. From the foregoing, it will be seen that if during the interval that the set output of the latch 462 is at a low level, a signal is generated by the differentiator 456, both inputs to the gate 460 will go low to send its output high. The gate is connected on its output to the set input of a pretime signal generator NAND latch 464 such that a pulse produced by the gate 460 is effective to set the latch 464. The latch 464 is coupled on its reset input to receive the output of an inverter 466 where the inverter is connected to the output of a two input NAND gate 468. One of the inputs of the NAND gate 468 is connected to receive an equipment turn on pulse from a generator 470 of the kind previously described with respect to such circuits in the function generator. The other input of the gate 468 is connected to receive the logic cancel pulse on the line 294. Accordingly, a logic cancel pulse (or a "power on" pulse) is effective to drive the output of the gate 468 low to thereby cause a reset pulse to be applied to the reset input of the signal latch 464. Such pulse will be applied so long as the logic cancel pulse is applied to the line 294. The logic cancel pulse is, therefore, effective to reset the latch to insure that the set output of the latch is at a high level by the time a scanning operation commences. After the expiration of the logic cancel pulse, the output of the inverter 466 returns to a low level and, therefore, the reset input obtained from the inverter is also at a low level. The reset output of the latch is maintained at a low level by virtue of the high level output of the set portion of the latch 464. If the output of the gate 460 is now pulsed high as the result of a pulse generated by the differentiator 456, the set output of the latch will go low, such action as in the usual course drives the reset output of the latch high to thereby maintain the set output low. A pretime signal output NAND gate 472 is coupled to receive on one input the set output of the latch 464, and it is also coupled to receive on a second input the inverted value of the output of the NAND 210 in the microswitch function generator as generated on the line 258. Accordingly, since the inverted output of the NAND 210 is at a high potential level until and during the operation of the logic operate switch (with the other simultaneous factors involved on the input of the NAND 210 also being met), the gate 472 will respond to a signal present on the set output of the pretime signal generator latch 464 for the duration of operation of the logic operate switch 152. The gate 472 is connected to pretime signal line 474 such that the line will be pulsed high with a $\overline{P}$ signal during the period of operation of the logic operate switch if the set output of the latch 464 has gone low level as the result of a signal on the line 402.

Document Deflection Gate Selection Circuits

Figure 14:
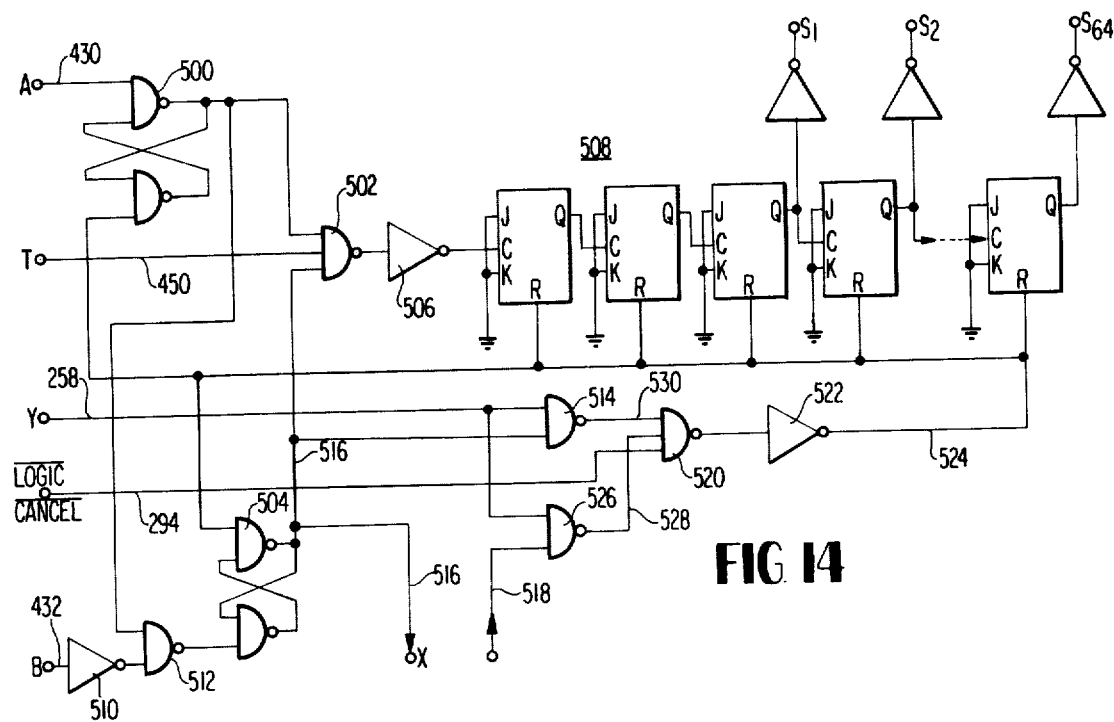
FIG. 14 is a schematic diagram of the elapsed time gates and counters.

The circuits employed for the purpose of responding to elapsed time recordings carried by cards 38 to automatically effect storage of the documents within bins designated for the various values of elapsed time were represented by the elapsed time logic block 260 in FIG. 5. Preferred embodiments of the said circuits are shown in FIGS. 14 through 24 of the drawings. The differentiators 420 and 422 of FIG. 11a are connected by their output lines 426 and 428 for elapsed minutes (or 430 and 432 for elapsed seconds) to inputs of a gating network for a binary up counter, as shown in FIG. 14 of the drawings. The elapsed time logic 260 employs, in the preferred embodiment, two networks of the kind shown in FIG 14 and it requires two up counters. One such network and counter is employed to respond to the pulses on the lines 426 and 428 to produce a binary coded decimal signal output that is a raw electrical analogue of the elapsed minutes recording on a card 38, and the other such network and counter is employed to respond to the pulses on the lines 430 and 432 to produce a second binary coded decimal signal output that is an electrical analogue of the elapsed seconds recording on the same card. An explanation of one such network and counter will suffice to describe both. It will be recalled that the control pulses produced on the lines 430 and 432 and similarly on the lines 426 and 428 are generated from the leading and trailing edges of the radiant energy pulses detected by the phototransistors 416 and 414, respectively. Accordingly, the said control pulses on each pair of lines are separated by a period that corresponds to the angular separation of the reference and elapsed time marks on the recordings. It will also be recalled that the transponder is turned with the scanner heads. Accordingly, the transponder generates a unique set of pulses for the period of separation of each pair of control pulses.

Elapsed Time Gating Networks and Counters

Referring to FIG. 14, and specifically to the elapsed seconds situation, the pulse produced on the line 430 is coupled to the set input of a NAND latch 500. Assuming that the latch had been placed in its reset condition in a manner to be described hereinafter, the set output of the latch 500 would have been found at a high potential level and, accordingly, the pulse applied on the line 430 is effective in the usual NAND operation to drive the set output of the latch low.

The set output of the latch is connected as one input to a three input NAND gate 502, and the gate is connected to receive the set output of a second NAND latch 504 on a second input. The named output of the latch 504 is in a low condition when both latches are reset, i.e., the pulse on the line 430 will find the set output of the latch 504 in a low potential condition.

The third input to the NAND gate 502 is connected to the output line 450 of the transponder or transducer amplifier such that this input goes high with every pulse outputted by the said amplifier. The gate 502 is connected to the input of an inverter 506 such that the output of the inverter goes high with every pulse generated on the line 450. The inverter 506 is connected to the clock input of the first stage of a binary up counter 508. In the preferred embodiment, two circuit boards having five JK flip-flops are employed for the seconds counter 508 where each Q output of a stage is connected to the clock input of the next succeeding stage, and where each of the J and K inputs are grounded. From this, it will be seen that the first two stages of the counter may be employed as a modulo 4 divider such that the Q outputs of the third through seventh stages are available to provide a b.c.d. analogue representing elapsed seconds.

The second control pulse generated on the line 432 as a result of a termination of the radiant energy sensed by the pulse detector 416 may be inverted by an amplifier 510 and applied to one input of a 2 input NAND gate 512 where the NAND 512 receives the set output of the latch 500 on its second input. From this, it will be seen that when the set output of the latch 500 goes low, the input thus applied to the NAND 512 also goes low. Accordingly, an inverted pulse obtained from the inverter 510 is sufficient to drive the other input to the NAND gate 512 low such that its output (which is normally low) goes high. The output of the NAND 512 may be connected to the reset input of the latch 504, and it is effective to reset the said latch so that its set output will be driven high. Accordingly, a pulse on the signal line 432 effective to drive one of the inputs to the gate 502 high and thereby inhibit the gate such that pulses from the transducer amplifier on the line 450 are no longer capable of being passed by the gate.

From the foregoing, it will be seen that transducer pulses are permitted to pass to the seconds counter 508 as the result of the first control pulse applied on the line 430, and the said transducer pulses are inhibited from passage to the elapsed seconds counter as the result of the appearance of the second control pulse on the line 432. Accordingly, the number of pulses applied to the counter from the line 450 during the period between the first and second control pulses provides a b.c.d. representation of the elapsed time in seconds read by the scanner 74c on the outputs of the elapsed seconds counter 508 until such time as the counter is reset. The counter's outputs are designated as $S_1$ through $S_{64}$ in FIG. 14, and they constitute the inverted Q outputs of the third through seventh J-K stages.

The elapsed minutes circuitry involves a gating network of precisely the same type as that explained above with respect to the latches 500, 504, the gates 502, 512, and the input lines. In addition, two circuit cards having five J-K stages each are connected through an inverter such as the inverter 506 to an output gate of the same type as the gate 502 such that transponder pulses will be passed to the counter during the period existing between control pulses produced on the lines 426 and 428. The first four stages of the minutes counter may be used as a modulo 8 divider, and the minutes outputs may be taken as $M_1$ through $M_{32}$ from the inverted Q outputs of the third through sixth J-K stages. The inverted Q outputs are used for the reason that in the preferred embodiment the circuits are low level, i.e., of negative logic.

Each of the gating networks and counters for both the seconds and minutes circuits are provided with reset logic for the purpose of resetting each of the latches 500 and 504 and for zeroing the counters. As with the gating networks and the counters, the circuitry employed is duplicated, thus an explanation of one set of circuits is all that is deemed necessary. The explanation will be made using the lapsed seconds circuit. Referring to FIG. 14, it will be noted that the counter reset line 524 is driven through inverter 522 from a three-input NAND gate 520. The inputs to gate 520 are normally low in the no-signal condition. A high signal on any one of the three input leads causes the output to go low. One input to gate 520 is the logic cancel signal on line 294. This signal is at a high potential level when present. A second input is on line 530 from NAND gate 514. One input of gate 514 is from the low reset output of latch 504 over line 516. The second input for the gate 514 is connected to the output line 258 of the inhibit gate 210 in the function generator and this line is normally at a high potential to inhibit the gate 514 such that the output of the gate is normally at a low level. It will be recalled that this line will go low only when the output of the gate 210 goes high, i.e., the switch 152 is operated and the punch inhibit is removed and a valid A.M. or P.M. signal has been received and the machine is not in the lead card mode and a doubles has not been detected. Thus it is seen that line 530 goes high only if latch 504 has not been set and line 258 goes low. The third input to gate 520 is on line 528 from gate 526. One input to gate 526 is on line 518 from the equivalent latch 504 reset output in the lapsed minutes circuit. The second input to gate 526 is from line 258.

From the preceding, it will be seen that under the normal conditions of operation assuming that the latch 504 and its corresponding latch in the elapsed minutes gating network have their set outputs at a low level, and absent a signal on the lines 258 and 294, the output of the NAND gate 520 will be at a high level voltage. The output terminal of the NAND 520 may be connected through an inverter 522 to a reset line 524. The reset line 524 is connected to the reset inputs of all JK stages in the elapsed seconds counter 508, and it is also connected to the reset input of the latch 500 and to set input of the latch 504.

In the event that neither of the latches 504 and its corresponding latch in the elapsed minutes gating network have been set as a result of control pulses on the lines 428 and 432, then a signal on the line 258 is in itself sufficient to pulse the reset line 524. This follows for the reason that a low going signal on the line 258 is effective to drive the output of the gate 514 high and thereby drive the output of the gate 520 low such that the output of the inverter and hence the line 524 goes high. It will also be seen that the occurrence of a positive going pulse on the logic cancel line 294 is effective to drive the output of the gate 520 low such that the line 524 goes high to thereby reset the counters and latches. From the preceding discussion, it should also be apparent that in the event that a pulse is applied to either the line 428 or to the line 432, both such pulse or pulses is effective to inhibit the gate 514 such that a logic operate signal on the line 258 cannot thereafter cause the reset lines 524 to be pulsed. In operation, the effect is that the elapsed seconds and elapsed minutes counters will retain the data inputted to them until such time as a logic cancel pulse is applied to the gate 520 at 125 milliseconds into the feed cycle for the next record receiver inputted to the scanning station. The logic cancel pulse at that time is effective to pulse the line 524 such that all counters are zeroed and the latches in both gating networks are reset such that the circuits are readied to respond to the next scanning operation. The said subsequent scanning operation commences with the termination of operation of the logic cancel switch and is terminated by the time the logic operate switch 152 is operated, i.e., the scanning of the time and elapsed time recordings on a card takes place during the interval 225 milliseconds and 375 milliseconds of a feed cycle, as shown in FIG. 9. In the preferred embodiment, the heads 74a through 74c are turned at the rate of one revolution per 50 milliseconds, thus the 150 milliseconds interval permits three complete scans of each recording. This period is sufficient to obtain valid data.

Figure 15:
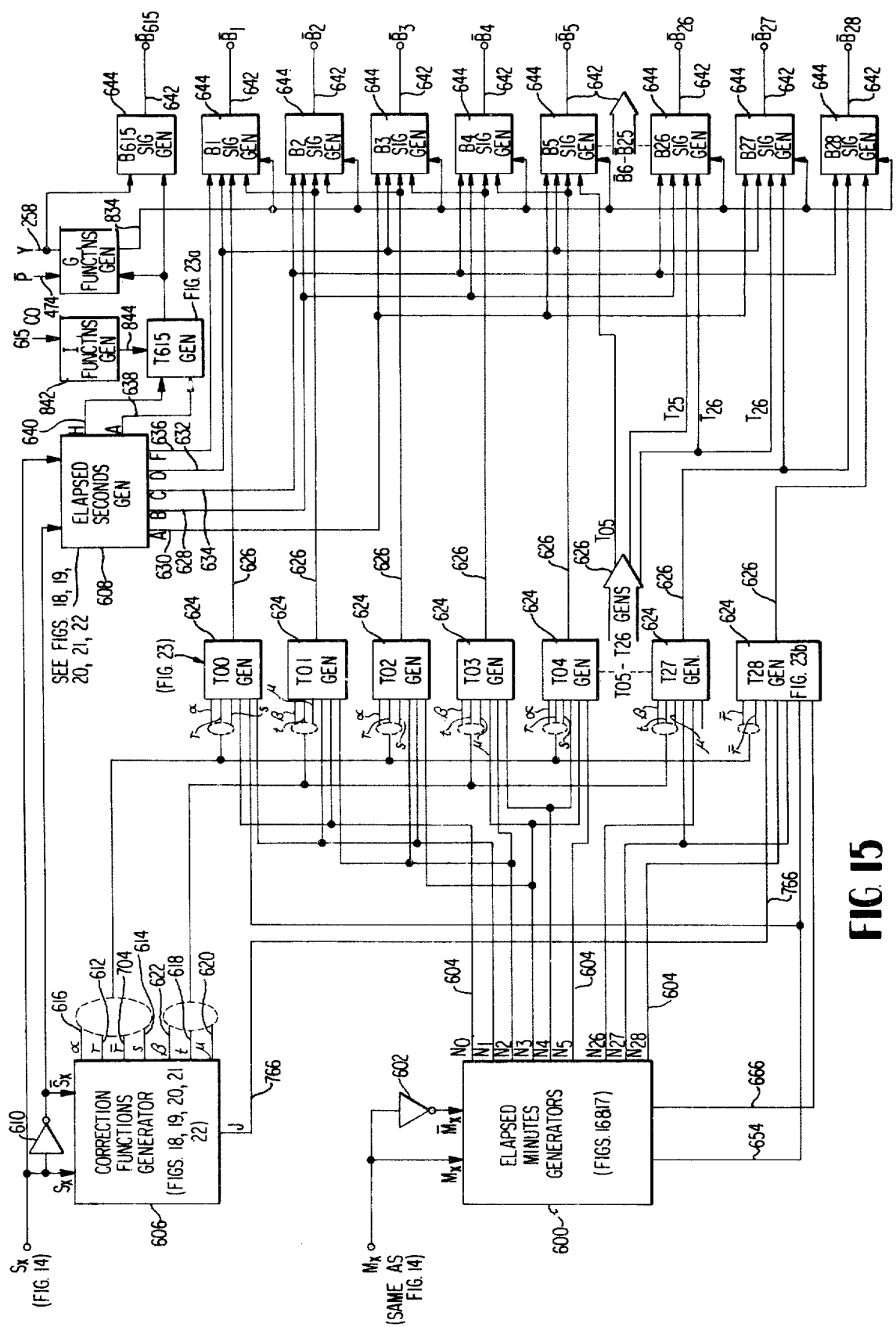
FIG. 15 is a composite block diagram of the elapsed time logic of FIG. 5.

The elapsed time logic of FIGS. 16–24 is shown in the reduced block schematic diagrams of FIG. 15. The outputs $M_1$ through $M_{32}$ are represented by the symbol Mx and are shown applied directly to the input of an elapsed minutes generator 600. The inverted values of $M_1 - M_{32}$ are obtained through six inverters represented by the inverter 602 and are applied as $\overline{M}x$ to a second input for the generator 600. It is the function of the elapsed minutes generator to produce by logically combining the $M_1$ through $M_{32}$ and $\overline{M}_1$ through $\overline{M}_{32}$ inputs raw elapsed time signal outputs of from 0 elapsed minutes through 28 elapsed minutes on output terminals 604. The said outputs are hereby defined as $N_0, N_1, N_2 \ldots N_{27}, N_{28}$ and represent equivalent values. The generator 600 is also designed to provide two special outputs $N_{29, 58}$ and $N_{59, 60}$ where the former of the two special outputs represents all elapsed minutes values from 29 minutes through 58 minutes and the latter signal represents elapsed minutes values of 59 and 60 minutes, respectively.

Similarly, the seven outputs of the seconds counter 508 are shown connected in FIG. 15 through a line $S_x$ directly to inputs of a correction function generator 606 and an elapsed seconds time generator 608. The inverted outputs of the seconds counter are obtained by passing the said outputs through inverters, represented as a single inverter 610 in FIG. 15, and the said inverted outputs are also applied as inputs to the correction function generator 606 and the elapsed seconds generator 608.

In this preferred embodiment, the correction function generator uses logic to generate signals representative of specific ranges of elapsed seconds, where the range signals represent specific portions of the 120 second elapsed second dial on the card. To this end a first logic circuit is employed to produce an output signal $\Gamma$ on an output 612 whenever the elapsed seconds indicator is found in the first 30 seconds of the first 60 seconds on the dial, and a second logic circuit is employed to produce an output signal S on a line 614 whenever the indicator is found in the second 30 second (31–60) range of the first 60 seconds on the dial. A third circuit is used to produce an output signal $\alpha$ on a line 616 whenever $\Gamma$ ORS appears showing that the inputs Sx and $\overline{S}_x$ to the generator indicate a B.C.D. value of from 0–60 elapsed seconds.

A second set of logic circuits are provided to generate two of three signals $u$, $t$ and $\beta$ for the range 61 through 120 seconds. Thus the $t$ signal is generated on an output 618 whenever the elapsed seconds indicator indicates a value in the range 61–90 seconds, and the $\mu$ signal is generated on an output 620 whenever the B.C.D. representation for the elapsed seconds indicator indicates a value in the range 91–120 seconds. The $\beta$ signal is provided on an output line 622 to indicate $t$ OR $\mu$.

The N signals obtained from the elapsed minutes generator 600 and the range signals obtained from the correction function generator 606 are applied to a series of time signal generators 624 according to a logical sequence designed to automatically correct for error appearing in the elapsed minutes recording made on the card 28. Each of the time generators 624 comprises a network of logic circuits for the purpose of generating a time signal T on an output line in the event that certain input conditions are simultaneously fulfilled on the inputs to these timing generators. For any given set of elapsed time data appearing upon a record receiver, only one generator 624 will produce an output signal.

In the preferred embodiment 28 time generators are used to generate the signals $T_{00}, T_{01}, \ldots T_{27}, T_{28}$ on 28 elapsed minute time signals lines 626. The signals obtained from the generators 600 and 606 are used to provide corrected elapsed minutes signals on the lines 626. The circuits 624 constitute error checking and correction comparators and are deemed desirable for the reason that due to mechanical reasons or the like, the elapsed minutes recording on the card 38 may be erroneous by a factor of one minute. Such error can, with automatic accounting machine processing for telephone toll cards, result in both losses for the telephone company and in over-billing to the customer. It is considered undesirable for both reasons. Referring again to FIG. 9, it will be noted that all even value minutes, i.e., 0, 2, 4, 6, etc., should occur when the elapsed seconds indicator 62 is in the range 0–60 seconds, and all odd value minutes should occur when the elapsed seconds indicator is in the range 61–120 seconds. Accordingly, the generator 600 in an error free situation should generate a value $N_0, N_2, N_4 \ldots N_{26}, N_{28}$ whenever the function generator produces a signal $\alpha$ on the line 616. Similarly, an error free value $N_1, N_3, N_5 \ldots N_{25}, N_{27}$ should occur simultaneously with a signal $\beta$ on the line 622. In the preferred embodiment when an even value N signal occurs with a $\beta$ signal or when an odd value N signal occurs with an $\alpha$ signal, the raw N signal is taken as erroneous and as being either high or low by one N signal value. For example, if the signal $N_4$ representing 4 minutes occurs with $\beta$, then the correct elapsed time is either 3 or 5 minutes. Similarly, if the raw signal $N_3$ occurs with $\alpha$, the correct elapsed time is either 2 or 4 minutes.

Error correction for an erroneous elapsed minutes recording can be achieved simply by comparing all even minutes with the $\alpha$ signal and all odd minutes with the $\beta$ signal in the time generators 624. Whenever the two preceding are produced on inputs to a generator 624, it can be assumed that the elapsed minutes signal $N_r$ is correct and an output signal $T_r$ is generated by the timing generator.

To provide error correction, each timing generator for producing the even value T signals is provided with inputs having the odd value elapsed minutes signals N that bracket the even value minutes signal for which the generator is to generate an output signal. Taking $T_2$ as an example, then the raw signal inputs to the generator are $N_1$, $N_2$, and $N_3$. The logic employed in the $T_2$ timing generator 624 is designed to produce the $T_2$ signal on the line 626 for the generator if any of the following conditions are met: $N_2$ AND $\alpha$ on an input or $N_1$ AND $r$ on a second input OR $N_3$ AND $S$ on a third input. The odd value generators 624 make similar comparisons. Taking the $T_3$ generator as an example, the $T_3$ signal is produced on a line 626 whenever the inputs to the generator are $N_3$ AND $\beta$ on an input or $N_2$ AND $t$ on a second input or $N_4$ AND $u$ on a third input. Since only one N value is generated for any combination of $M_r$ and $\overline{M}_r$ and $S_r$ AND $\overline{S}_r$ only one generator 624 will produce a T signal on a line 626 for a scanning operation.

Referring to FIG. 15, the elapsed seconds generator 608 utilizes logic circuits to produce a plurality of output signals representing specific range values of elapsed seconds that may be used in combination with the T signals on the lines 626 produced by the time generators 624 for the purpose of selecting a specific storage bin to receive the document from which the data was obtained to provide the BCD signals of elapsed time. The elapsed seconds generator 608 includes logical circuits designed to produce signal outputs on lines 628 through 640 having the values and designations given in the following table:

| Signal | Elapsed Seconds Range | Output lines of 608 |
|---|---|---|
| B = 0 | through 15 seconds | 628 |
| C = 16 | through 60 seconds | 630 |
| D = 61 | through 75 seconds | 632 |
| E = 76 | through 120 seconds | 634 |
| F = 0 | through 60 seconds | 636 |
| A = 0 | through 15 seconds | 638 |
| H = 66 | through 75 seconds | 640 |

In the telephone toil card situation the time designated as one elapsed minute is considered to be from 6 seconds through 1 minute 15 seconds. The elapsed time for a call is considered to be 2 minutes if the elapsed time recordings show a total elapsed time in the range of 1 minute 16 seconds through 2 minutes 15 seconds and the elapsed time is assumed to be three minutes if recordings are in the range 2 minutes 16 seconds through 3 minutes 15 seconds. The said one minute intervals are maintained for higher values. In the preferred embodiment the T signals on the lines 626 are combined with the signals B through F produced by the elapsed seconds generator 608 to generate storage bin selection signals $\overline{B}_1$ through $\overline{B}_{2N}$ on a plurality of output lines 642 in a plurality of bin selection signal generators 644. Each generator 644 is connected to receive on two inputs two T signal values as is implicit in the statements made above. Thus the generator used to produce the $\overline{B}_1$ selection signal has the $T_0$ and $T_1$ signal lines connected to two inputs, and it is connected to receive the D and F signal outputs of the generator 608. The logic employed responds to the situation $T_0$ AND F OR $T_1$ AND D. It should be noted that the $B_1$ signal constitutes a special case indicative of an elapsed time of 6 seconds through 1 minute 15 seconds. A second special case is provided by the logic employed to generate the $\overline{B}_{2N}$ signal. The said last named signal is produced by circuits responsive to $T_{27}$ AND E OR $T_{2N}$ where the cards stored in the said bin have elapsed time recordings indicating an elapsed time value in excess of 27 minutes 16 seconds.

The generators 644 are provided in the $\overline{B}_2$ through $\overline{B}_{27}$ cases with a repeating sequence of elapsed seconds inputs and with a progression of elapsed minutes inputs, as follows:

| | | | | |
|---|---|---|---|---|
| $\overline{B}_2$ | = ($T_1$ | AND E) OR | ($T_2$ | AND B) |
| $\overline{B}_3$ | = ($T_2$ | AND C) OR | ($T_3$ | AND D) |
| $\overline{B}_4$ | = ($T_3$ | AND E) OR | ($T_4$ | AND B) |
| $\overline{B}_5$ | = ($T_4$ | AND C) OR | ($T_5$ | AND D) |
| | | through | | |
| $\overline{B}_{26}$ | = ($T_{25}$ | AND E) OR | ($T_{26}$ | AND B) |
| $\overline{B}_{27}$ | = ($T_{26}$ | AND C) OR | ($T_{27}$ | AND D) |

Special function generator and control means will be described below with respect to the various logic circuits employed in the preferred embodiment to perform the functions described above with respect to FIG. 15.

The Elapsed Minutes Generator

Figure 16:
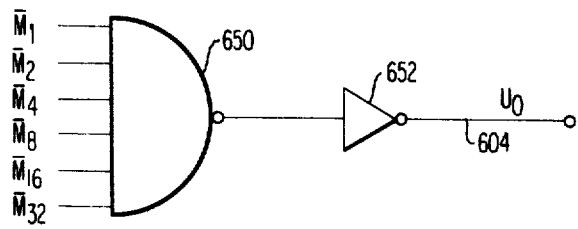

As was indicated above, the elapsed minutes generator provides on outputs 604 the raw elapsed time values in minutes $N_0$ through $N_{28}$ and the outputs $N_{29, 58}$ and $N_{59, 60}$. Referring to FIG. 16, a typical generator for producing any of the values $N_0$ through $N_{28}$ may comprise a six input NAND gate 650 having an inverter amplifier 652 connected between the output of the gate and the line 604. As will be recognized by those skilled in the art, the gate 650 may comprise three two input NANDs having their outputs connected in parallel, and the inverter 652 may be a two input NAND having one input grounded. From the foregoing, it should be apparent that the $N_0$ signal (zero elapsed minutes) is generated by a gate 650 having as inputs the minutes counter $M_r$ outputs $\overline{M}_1$, $\overline{M}_2$, $\overline{M}_4$, $\overline{M}_8$, $\overline{M}_{16}$, and $\overline{M}_{32}$. The $N_1$ signal is generated by a second gate 650 having as inputs the values $M_1$, $\overline{M}_2$, $\overline{M}_4$, $\overline{M}_8$, $\overline{M}_{16}$, $\overline{M}_{32}$. Similarly, $N_2$ is obtained with $\overline{M}_1$, $M_2$, $\overline{M}_4$, $\overline{M}_8$, $\overline{M}_{16}$, $\overline{M}_{32}$. The remaining N signal outputs through $N_{28}$ may be obtained simply by applying the appropriate binary grouping of counter outputs to the inputs of an equal number of gates 650. It will be recalled that a line designated A is normally high in the preferred embodiment and is signalled low. However, the counters react positively and accordingly all inputs to any gate 650 must be low in order to signal a line 604 low in the preferred embodiment. The inverter 652 is used to create the proper negative logic voltage levels.

Figure 17:
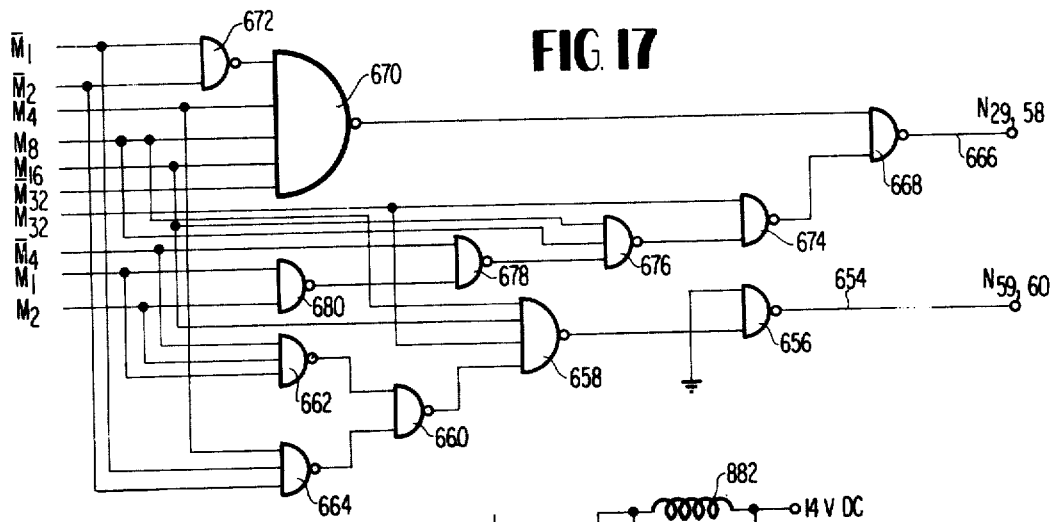

Referring now to FIG. 17, the generators employed to produce the signals $N_{59,60}$ and $N_{29,58}$ require a number of NAND gates to logically combine the minutes counter outputs so as to indicate elapsed minute values of 29 minutes through 60 minutes. The signal $N_{59,60}$ is obtained on an output line taken from the output of an inverter 656. The inverter is connected to the output of a four input NAND gate 658 having three inputs connected directly to the counter outputs $M_8$, $M_{16}$, and $M_{32}$. From this combination, it will be seen that no output can be obtained on the line 654 unless there is the simultaneous presence of $M_{32}$, $M_{16}$, and $M_8$ which converted to their decimal equivalents, constitute the number 56 arrived at by adding the values 32, 16 and 8. The fourth input to the output NAND gate 658 is obtained from the output of a two input NAND gate 660 where one of the inputs of the said gate is connected to receive the output of a three input NAND gate 662 receiving on its inputs the values $M_1$, $M_2$, and $\overline{M}_4$. The other input to the two input NAND gate 660 may be obtained from the output of a second three input NAND gate 664 having the values $\overline{M}_1$, $\overline{M}_2$, and $M_4$ applied to its inputs. Accordingly, the NAND gate 660 cannot go low unless the outputs of either of the two three input NAND gates 662 or 664 goes high. This operation constitutes an OR operation in view of the fact that the outputs of the NAND gates 662 and 664 cannot go high unless all three of the inputs on either one of the two gates go low simultaneously. The gates 660, 662 and 664 in combination then provide either a 3 or 4 minute decimal value that is effectively added to the value 56 to signal the line 654 in the event of an elapsed time value of 59 or 60 minutes.

The signal $N_{29, 58}$ is representative of all elapsed minutes values of 29 minutes through 58 minutes and is generated on a line 666 in the event of a recording indicating any such value. In the preferred embodiment of the sorting machine, these values along with the 59 and 60 minute elapsed time values are specially treated and in the usual case are automatically sorted to a bin not reserved for cards having a normal recording. The circuitry employed, for generating a signal on the line 666, includes a two input NAND gate 668 having its output connected to the line. In the absence of an $N_{29,58}$ signal, the line 666 is at a high level and both inputs to the NAND 668 are low level. The gate 668 is connected on one input to the output terminal of a five input NAND gate 670. The five input NAND gate is connected directly on four of its inputs to the counter outputs $M_4$, $M_8$, $M_{16}$ and $\overline{M}_{32}$, and it is connected through a two input NAND gate 672 to the counter outputs $\overline{M}_1$ and $\overline{M}_2$. In operation, whenever the output of the gate 670 goes high, the line 666 must go slow, i.e., generate an $N_{29, 58}$ signal. The gate 670 will go high on its output if $\overline{M}_{32}$ (NOT decimal 32) AND $M_{16}.M_8.M_4$ (decimal 28) AND ($\overline{M}$. OR $M_2$ OR $\overline{M}.\overline{M}_2$) (decimals 1, 2, or 3) i.e., whenever the minutes counter outputs represent the decimal numbers 29 through 31.

The remaining logic circuits operating into the other input of the NAND gate 668 are designed to send the line 666 low whenever the outputs on the minutes counter represent a decimal value in the range 32–58.

To this end, a two input NAND gate 674 is connected to the other input of the output NAND gate 668. The gate 674 is connected on one input to the counter output $M_{32}$ and thus this input will be low for all decimal numbers 32 through 58, inclusive. The other input of the NAND gate 674 is connected to the output of a three input NAND gate 676. The gate 676 receives the counter outputs $M_8$ and $M_{16}$ on two of its respective inputs and on its third input it is connected to receive the output of a NAND gate 678. In operation, for the output of the NAND gate 674 to go high, it is necessary that the input $M_{32}$ on the said gate be low and that the input obtained from the gate 676 be simultaneously low. For this latter noted condition to occur, it means that $M_8$ or $M_{16}$ is high or the output of gate 678 is high. With respect to $M_8$ and $M_{16}$ being high, this means that the decimal values 8 or 16 or both are not present. The gate 678 constitutes a two input NAND gate having $\overline{M}_4$ connected as one of its inputs and the output of a gate 680 connected to the other of its inputs where the gate 680 receives on its inputs the counter outputs $M_1$, $M_2$. Accordingly, the conditions for the output 678 to be high are that $\overline{M}_4$ is low meaning that $M_4$ is not present and $M_1$ and $M_2$ are not simultaneously present, i.e., counter output $M_1$ is high or the counter output $M_2$ is high or both said outputs are high to thereby drive the output of the gate 680 low.

From the preceding discussion, it is believed that it is apparent that the output of the gate 676 will go low whenever the decimal numbers on the output of the counters are $\overline{M}_{16}$ or $\overline{M}_8$ or $\overline{M}_4$ and $\overline{M}_1$ or $\overline{M}_2$. Accordingly, the output of the gate 674 is high to drive the line 666 low under the following conditions: $M_{32}$, $\overline{M}_{16}$ or $M_{32}$ $\overline{M}_8$ or $M_{32}$ $\overline{M}_4$ $\overline{M}_1$ or $M_{32}$ $\overline{M}_4$ $\overline{M}_2$. From the foregoing, it should be recognized that the decimal numbers 32 through 47 are obtained from the combination $M_{32}$ $\overline{M}_{16}$; that the decimals 48 through 55 are obtained from the combination $M_{32}$ $\overline{M}_8$; that the decimals 56 AND 58 are obtained from the combination $M_{32}$ $\overline{M}_4$ $\overline{M}_1$; and that the decimal 57 is obtained from the combination $M_{32}$ $\overline{M}_4$ $\overline{M}_2$.

Elapsed Seconds Range Signal Generators

As will be appreciated by those skilled in the art, in practice, the circuits used to produce the range signals are in fact arranged on circuit boards. In fact, all of the logic circuits described so far are arranged on such boards in the preferred embodiment of the invention. The circuits used to produce the range signals previously discussed with respect to the generators 606 and 608 are shown in FIGS. 18 through 22 of the drawings. The said circuits like the $N_{59,60}$ and $N_{29,58}$ generator circuits are designed to perform the specific logic signal generation operations described with respect to FIG. 15.

Figure 18:
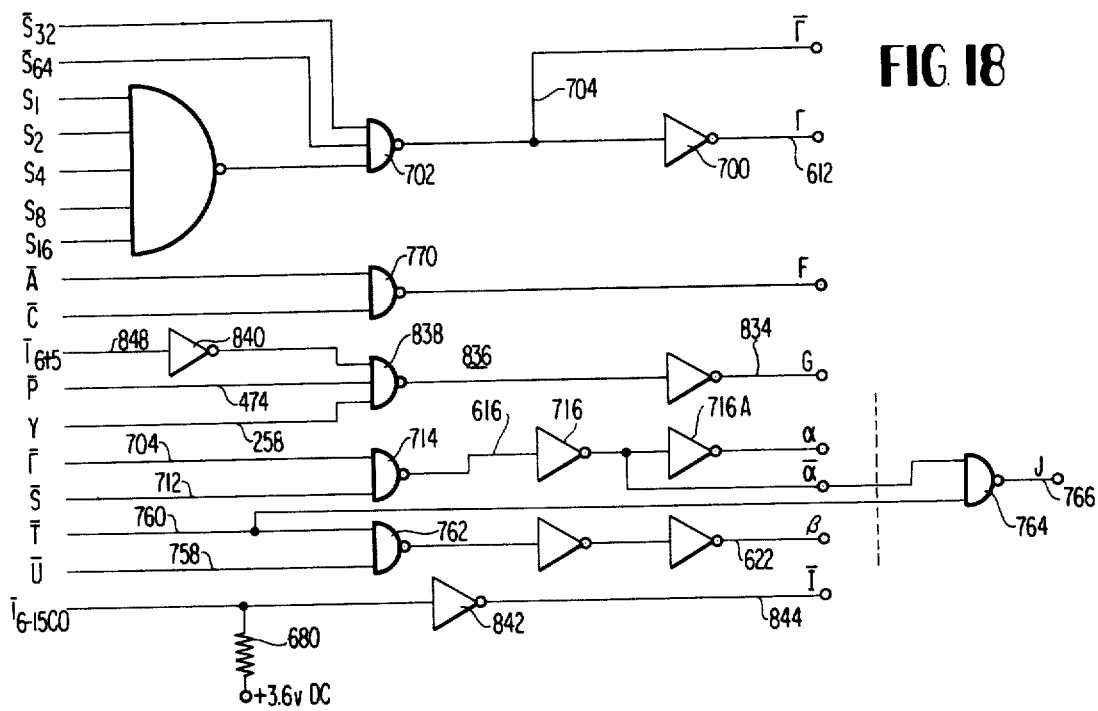

Referring now to FIG. 18, the $\Gamma$ value produced on the line 612 is taken from the output of an inverter 700 connected to receive the output of a three input NAND 702. The NANDs output is also connected to an output line 704 to provide the value $\overline{\Gamma}$. The gate 702 is connected on two inputs to receive the seconds counter outputs $\overline{S}_{32}$ and $\overline{S}_{64}$ and these inputs will be low for all decimal values lower than 32 seconds. The gate 702 is connected through its third input to the output of a five input NAND gate 706 where the gate 706 is connected to receive the seconds counter outputs $S_1$ through $S_{16}$. Accordingly, the gate 706 will be low on its output whenever any of the $S_1$ through $S_{16}$ counter outputs are high. A signal on the line 612 is then obtained whenever all three inputs to the gate 702 are simultaneously low.

Figure 19:
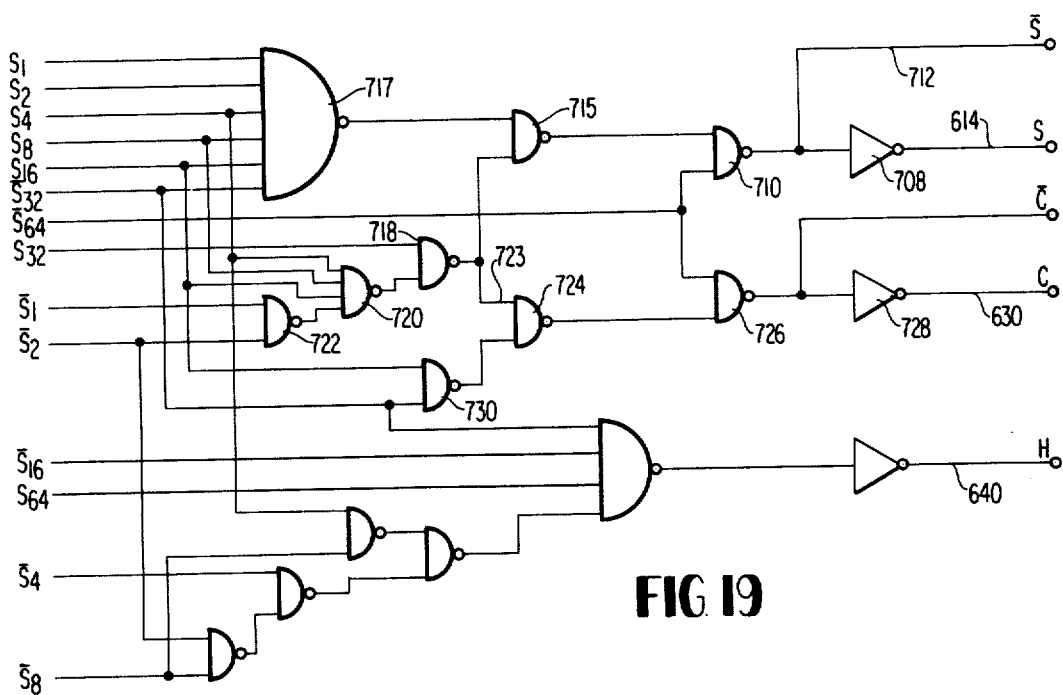

Referring now to FIG. 19, the S signal line 614 is connected to the output of an inverter 708 which inverter is coupled on its input to the output of a two input NAND 710. The NAND 710 is connected to its output to a line 712 for producing a $\bar{S}$ output.

Referring back briefly to FIG. 18, it will be noted that the lines 704 ($\bar{\Gamma}$) and 712 ($\bar{S}$) are connected as inputs to a two input NAND 714 having its output connected to the $\alpha$ signal line 616. Accordingly, the line 616 goes low whenever the output of the NAND 714 goes low which occurs whenever $\bar{\Gamma}$ or $\bar{S}$ is high indicating the presence of $\Gamma$ or S. An $\bar{\alpha}$ output can be obtained by inverting the output of the NAND 714 with an inverter 716 and a second inverter 716A will yield an $\alpha$ output.

Returning to FIG. 19, the S signal output gate 710 is connected directly to the $\bar{S}_{64}$ output of the counter and it is connected to the output of a two input NAND 715. The NAND 715 is connected to one of its inputs to the output of a 6 input NAND 717 where the said NAND is connected to receive the counter outputs $S_1$ through $S_{16}$ and $\bar{S}_{32}$. The gate 717 is effective to drive one input of the gate 715 high for an elapsed seconds value of 31 seconds and NOT 32 seconds. If at this time the $\bar{S}_{64}$ (decimal 64) output of the counter is low, both inputs to the gate 715 are low thus driving the line 614 low to generate the signal S on the line 614.

The gate 715 is connected to its other input to the output of a gate 718 having $S_{32}$ as one input and the output of a 4 input NAND 720 connected to its second input. The NAND 720 is connected on inputs to receive the counter outputs $S_4$ $S_8$ $S_{16}$ and it receives the output of a two input NAND 722 where the NAND 722 is connected to receive the values $\bar{S}_1$ $\bar{S}_2$ on its inputs. In operation whenever the output of the gate 718 goes high, an S signal is created on the line 614 through the operation of the gate 710 if the $\bar{S}_{64}$ output of the counter is simultaneously low. The gate 718 will go high on its output whenever $S_{32}$ is present, i.e., low, and the gate 720 has a low output. Gate 720 has a low output whenever $\bar{S}_1$ and $\bar{S}_2$ are simultaneously low or whenever any combination of $S_4$ $S_8$ $S_{16}$ provides a high.

The gate 718 is connected on its output to one input 723 of a two input NAND 724 where the NAND 724 is connected on its output to one input of a NAND 726. The gate 726 is connected to the counter output $\bar{S}_{64}$ on its other input, and on its output to the 16 through 60 seconds signal C range line 630 through an inverter 728. Accordingly, a high output signal from the gate 718 with a low output on the counters $\bar{S}_{64}$ output is effective to drive the line 630 low through operation of the gate 726.

The NAND 724 may also be driven low on its output by a NAND 730 connected to the other input of the NAND 724. The gate 730 is connected on its inputs to the counter outputs $\bar{S}_{32}$ and $S_{16}$.

Figure 20:
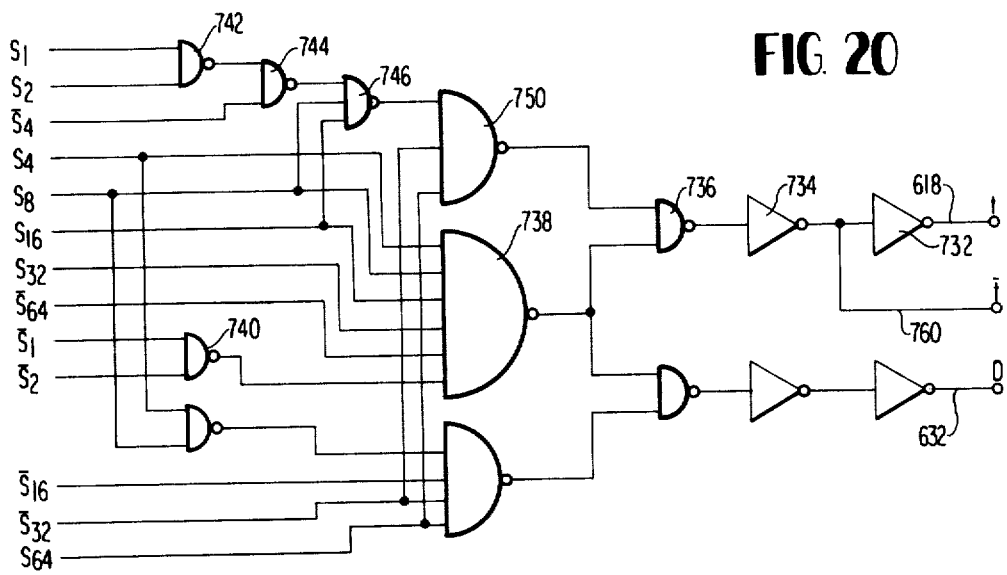
Figure 21:
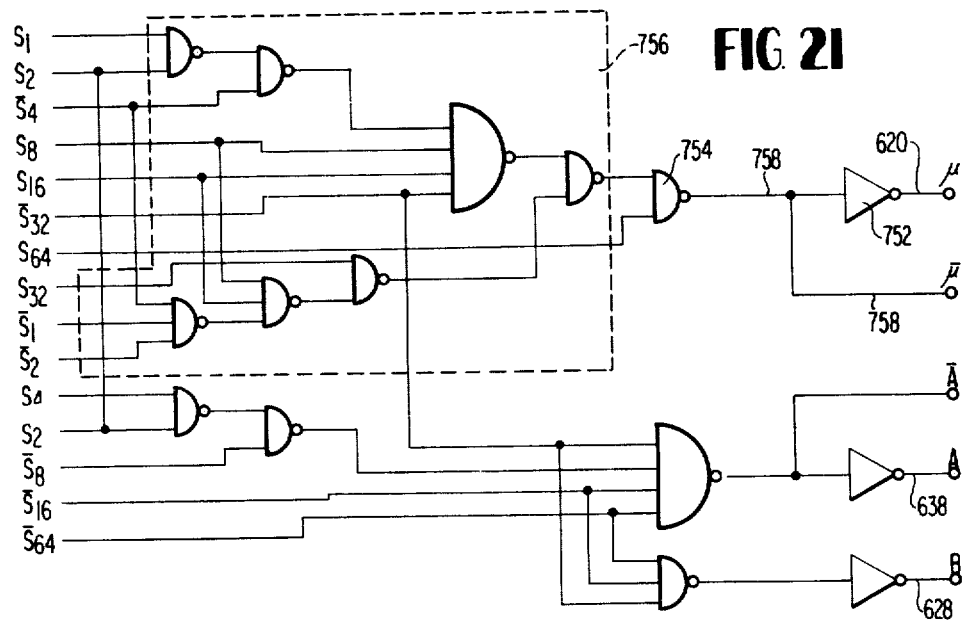

The $t$ and $u$ generators are shown in FIGS. 20 and 21, respectively. Referring to FIG. 20, the $t$ signal line 618 is shown connected through an inverter 732 and a second inverter 734 to the output of a two input NAND 736. The NAND 736 is connected to one input to receive the output of a 6 input NAND 738 where the NAND is responsive to the counter output values $S_4$ $S_8$ $S_{16}$ $S_{32}$ $\bar{S}_{64}$ and $(S_1 + S_2)$ to drive the line 618 low through the NAND 736 and the inverters 734 and 732. The $(S_1 + S_2)$ signal may be obtained by a gate 740 having the values $\bar{S}_1$ and $\bar{S}_2$ applied to its inputs and connected on its output to one input of the gate 738. The gate 736 is also pulsed by logic network designed to respond to the following expression of counter outputs:

$$\bar{S}_{32} \, S_{64} \, [\bar{S}_4 \, (\bar{S}_1 + \bar{S}_2) + \bar{S}_8 + \bar{S}_{16}] \qquad (1)$$

This response is obtained by connecting the outputs $S_1$ and $S_2$ as inputs to a NAND 742 and connecting the output of the said gate to an input of a gate 744. The gate 744 should be connected on a second input to receive the counter output $\bar{S}_4$, and the gate should be connected on its output to one input of a three input NAND 746. The NAND 746 should be connected on its other inputs to the counter outputs $S_8$ and $S_{16}$, and the output of the gate 746 constitutes an input to a second three input NAND gate 750. The gate 750 should be connected to receive the values $\bar{S}_{32}$ and $S_{64}$ on its other inputs, and the output of the gate 750 should be connected as the second input to the gate 736.

The $u$ signal generator shown in FIG. 21 is connected to the line 620 through an inverter 752 which inverter is connected to an output NAND 754 of the generator. The gate 754 is normally at a low level on its output and signals the line 620 low whenever both of its inputs go low. One input to the NAND 754 is provided by the $S_{64}$ output of the counter and the other input of the gate is connected to a network of NAND gates 756. The gates 756 are connected to drive the second input of the NAND 756 low if the following counter output conditions exist:

$$S_8 \, S_{16} \, \bar{S}_{32} \, (S_1 S_2 + S_4) + S_{32} \, (\bar{S}_8 + \bar{S}_{16} + \bar{S}_1 \bar{S}_2 \bar{S}_4) \qquad (2)$$

The $\bar{u}$ value may be obtained on a line 758 connected directly to the output of the gate 754, and the $\bar{t}$ output may be obtained on a line 760 (FIG. 20) connected directly to the output of the inverter 734. Referring to FIG. 18, the lines 758 and 760 may be connected as inputs to a two input NAND gate 762, the output of which constitutes the $\beta$ signal. The said signal may be obtained on the line 622 through a pair of serially connected inverter amplifiers.

The line 760 for the $\bar{t}$ signal may also be connected to an input of a two input NAND 764 receiving on its other input the signal $\bar{\alpha}$ obtained through an inverter from the output of the NAND 714. The gate 764 is used to generate a seconds range signal J on a line 766 where the range is defined as from 0 through 90 seconds.

The generators for producing the elapsed seconds range signals A through $\bar{I}$ and H are also shown in FIGS. 18 through 22. The circuitry for generating the C signal was described, and it is believed that with the explanations already given, it will be sufficient to merely give the logic expressions of seconds counter outputs used by the various generators for generating the A, B, D, F, and H signals.

The A signal generator is shown in FIG. 21 and it responds to the following counter output conditions:

$$A = \bar{S}_{16} \bar{S}_{32} \bar{S}_{64} \, (S_2 S_4 + S_8). \qquad (3)$$

The B signal generator is shown in FIG. 21 and it is responsive to the following conditions on the counter outputs:

$$B = \bar{S}_{16} \bar{S}_{32} \bar{S}_{64} \qquad (4)$$

It will be noticed that the A signal constitutes a portion of the B signal.

The D signal generator is shown in FIG. 20 as employing portions of the logic used to obtain the $t$ range signal. The D signal is obtained from the following counter conditions:

$$D = S_4 S_8 S_{16} S_{32} \overline{S}_{64} (S_1 + S_2) + \overline{S}_{16} \overline{S}_{32} S_{64}(\overline{S}_4 + \overline{S}_8) \quad (5)$$

Figure 22:
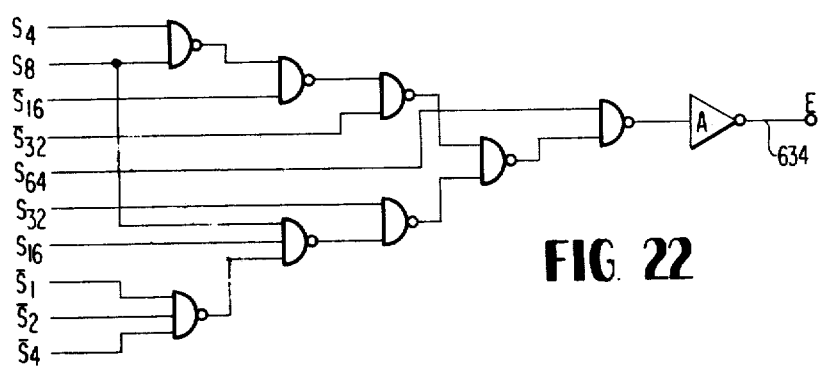

The E signal generator is shown in FIG. 22 and it provides a signal output for the following counter output conditions:

$$E = S_{64} [\overline{S}_{32} (S_4 S_8 + S_{16}) + S_{32} (\overline{S}_1 \overline{S}_2 \overline{S}_4 + \overline{S}_8 + \overline{S}_{16})]. \quad (6)$$

The F signal generator constitutes a single NAND gate 770 as shown in FIG. 18 connected to be responsive to the inverted outputs of the A and C range generators, or, i.e., $$F = A + C \quad (7)$$

Finally the H range generator is shown in FIG. 19 connected to signal the line 640 as a signal response in accordance with the following counter outputs:

$$H = \overline{S}_{16}\overline{S}_{32}S_{64} [\overline{S}_4 (S_2 + S_8) + S_4\overline{S}_8]. \quad (8)$$

The Error Checking and Correction Generators 624

As was stated above, the error checking and correction circuits 624 are designed in the preferred embodiment to compare any N signal on a line 604 with the range signals produced by the corrections function generator 606 to determine the correctness of the N signal and if it is incorrect to change its value by one unit. A few of the generators 624 are shown in FIGS. 23a and 23b of the drawings.

A first generator for producing the $T_1$ signal on a line 626 is typical of all odd value generators 624. The corrected $T_1$ signal line 626 is connected directly to the output of a NAND gate 780 having three inputs 782, 784 and 786. Each of the said inputs is connected directly to the output of a two input NAND gate, thus the input 782 is taken from a gate 788, the input 784 is taken from a gate 790, and the input 786 is taken from a gate 792. The first gate 788 is connected on one input to receive the $N_1$ signal from a line 604 and it is connected on a second input to receive the $\beta$ signal on line 622. It will be recalled that the raw signal value $N_1$ is odd and if it appears simultaneously with the $\beta$ signal, then the signal $N_1$ is assumed to be error free. In operation, the said lines 604 and 622 will go low together to drive the output of the gate 788 high. From this it will be seen that the gate 780 will go low to thereby generate the signal $T_1$ on the line 626.

The gate 790 is connected to the $N_0$ signal line 604 on one input and it is connected to the $t$ seconds range signal line 618 on its second input. Similarly, the gate 792 is connected to the $N_2$ signal line 604 on an input and it is connected to the i u range signal line 620 on its other input. From the discussion given above, relative to the gate 788, it will be seen that the gates 790 OR 792 are effective to correct the $N_0$ and $N_2$ signals to a $T_1$ signal on the line 626 if $$(t \text{ AND } N_0) \text{ OR } (u \text{ AND } N_2) \quad (9)$$

exist on the inputs to the gates 790 OR 792.

The general case for an odd value elapsed minute is therefore given by $$T_{ODD} = (\beta \text{ AND } N_{ODD}) \text{ OR } (t \text{ AND } N_{ODD-1}) \text{ OR } (u \text{ AND } N_{ODD+1}) \quad (10)$$

The $T_2$ error checking and correction circuit is typical of the even value generators except the special cases of the $T_0$ and $T_{28}$ circuits. As with the $T_1$ circuit, a three input NAND 794 is connected on its output to the normally high level $T_2$ signal line 626. The gate 794 is connected on one input to the output of a gate 796 and on a second input to the output of a gate 798 and on a third input to the output of a gate 800. The gate 796 is effective to NAND the $N_2$ signal on a line 604 with an $\alpha$ signal on the line 616; the gate 798 NANDs the $N_1$ signal with an $\Gamma$ signal on the line 612; and the gate 800 NANDs an $N_3$ signal with an S range signal on the line 614. Accordingly, the general expression for an even value T signal is as follows:

T even = (T even AND $\alpha$) OR (T even−1 and $\Gamma$) OR
T even + 1 AND S) (11)

where for the $T_2$ case T even = $T_2$; T even −1 = $T_1$ and T even + 1 = $T_3$. In both the general $T_{ODD}$ and T even signal cases only one raw N value will exist for any given card 38 such that only one T signal is generated.

As indicated above, the $T_0$ and $T_{28}$ signals constitute special cases.

The $T_0$ signal circuit will be taken first for the reason that it, as with the $T_1$ through $T_{27}$ signal circuits involves what is essentially an OR operation employing an output NAND gate 802 having three two input NAND gates 804, 806 and 808 connected to each of its three inputs. The first of the said input NAND gates has the signal $N_0$ applied to one input with the signal $\alpha$ on the line 616 applied to the other of its input. The second input NAND gate 806 has the signal $N_{59,60}$ and the correction range signal $\Gamma$ applied on the inputs, and the third input NAND gate 808 has the signals $N_1$ and $s$ applied on its inputs. It should therefore be apparent that the gates 804 and 808 are responsive and thus the $T_0$ signal line is responsive to the first and third expressions in formula 11 supra. The gate 806, however, is responsive to a variation of the second expression. It may be taken that in the case of an elapsed time of 60 seconds, anything greater than the first 30 seconds showing on the elapsed seconds reading would be read as an elapsed time of $N_0$. The particular function that is provided by the gate 806 occurs in the event that an elapsed time reading of 59 minutes is obtained simultaneously with an elapsed seconds reading in the $\Gamma$ signal range (0 − 30 seconds). In that event $N_{59,60}$ corresponds to $N_0$ minus 1 in the general case and the 59 minute reading may be taken as erroneous, with the 0 to 30 seconds indication given by the R function as being the correct reading. The gate 806 responds to such a situation to signal $T_0$.

The second special case is that involved in generating the $T_{28}$ signal. Referring to FIG. 23b, the logic circuit for generating $T_{28}$ includes an output NAND gate 810 connected on one input to the output of a two input NAND gate 812. As in all previously mentioned cases, the $T_{28}$ line 626 is high unless and until a signal is received indicating that the elapsed time in minutes corresponds to the particular line. In the present case, the gate 812 receives on one input the signal $N_{27}$ and on another input the $\Gamma$ range signal. The $N_{27}$ figure is generated in the usual course by the usual elapsed minutes time generator, and its signal line 604 is normally high.

This line will go low in the event that the $N_{27}$ generator provides an output indicating 27 elapsed minutes which reading, of course, corresponds to an odd minute. If, at this time, the Γ range signal generator sends its output low indicating that the elapsed seconds is from 0 to 30 seconds, i.e., in the range of an even minute, then the $N_{27}$ indication is erroneous as previously described with the other generators and the output of the gate 812 goes high. Under these circumstances, the output of the gate 810 will go low. The other input to the gate 810 is taken from the output of an inverter 814 which in turn is connected to the output of a three input NAND gate 816. The output of the NAND gate 816 is usually at a high level thus meaning that the input to the gate 810 is low which follows in the usual course for circuits being described.

The gate 816 receives on its inputs the outputs of two input NAND gates 818, 822, and the output of a NAND-INV. 820. The gate 818 is connected to receive on one of its two inputs the $N_{28}$ signal, and it is connected to its other input to receive the J range signal on the line 766. It will be recalled that the J signal is indicative of α OR T, i.e., a range of 0 – 90 seconds; see FIG. 18. Accordingly, with $N_{28}$ and J both normally high, the output of the gate 818 is low; however, in the event that an elapsed time of 28 minutes and a range of 0 through 90 seconds is simultaneously obtained on the inputs to gate 818, then the output of the gate goes high to drive the output of the gate 816 low. In such an event the output of the inverter 814 connecting the gates 816 and 810 will go high to drive the $T_{28}$ signal line low.

The $N_{29.58}$ signal line 666 is connected to an input of the gate 816 through the NAND inverter 820. Accordingly, a low going signal on the line 666 indicating an elapsed time value in the range 29 through 58 minutes is in and of itself effective to drive the output of the gate 816 low and thus signal the $T_{28}$ line. Finally, the gate 822 is connected to receive the $N_{59,60}$ signal on the line 654 and the inverted value of the Γ signal on the line 704 such that the output of the gate 822 will go high in the event of an elapsed time of 59 or 60 minutes and an indication that the elapsed seconds is not in the 0 to 30 second category for an even minute, i.e., the elapsed time is probably 59 minutes. This signal will also drive the $T_{28}$ signal line low.

Bin Gate Selection Circuits 644

Figure 24:
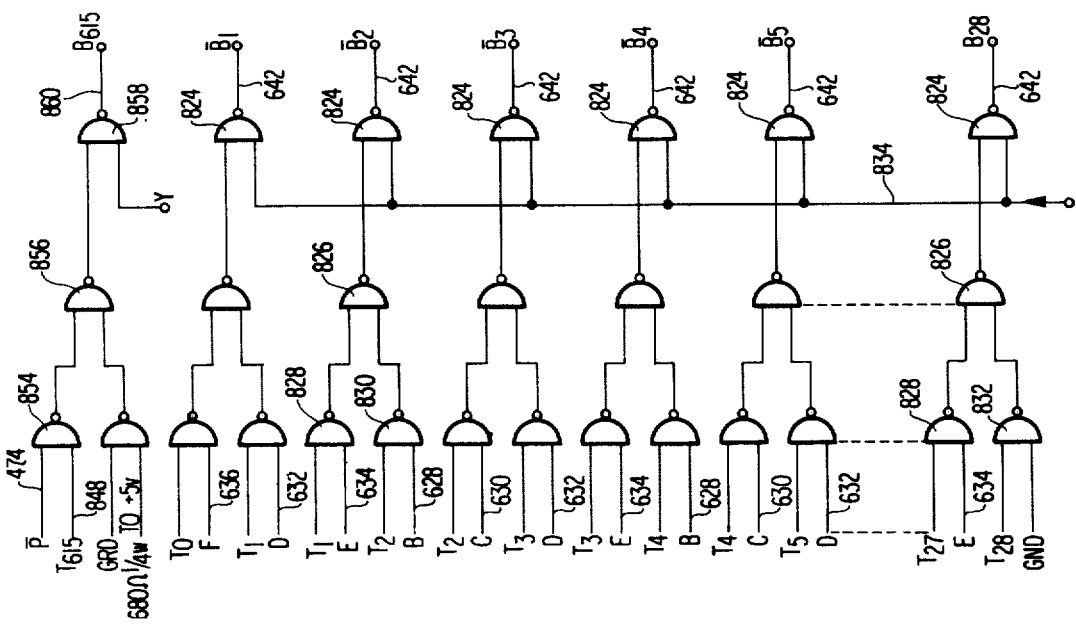

The bin gate selection signal generators are shown in representative form in FIG. 24. The typical circuits for generating the bin selection signals $\bar{B}_1$ through $\bar{B}_{28}$ include a two input NAND 824 connected on its output to a $\bar{B}$ signal line 642. Taking the $\bar{B}_2$ gate 824 as representative, the said gate is connected on one input to the output of a two input NAND 826. The NAND 826 is connected on one input to receive the output of a two input NAND 828 and it is connected on its other input to the output of a second two input NAND 830. The gate 828 is connected to receive the $T_1$ signal on an input and the elapsed seconds range signal E (76 – 120 seconds, i.e., 16 – 60 seconds for an odd value minute signal) on its other input. The gate 830 is connected on one input to receive the $T_2$ elapsed minutes signal, and it is connected on its other input to receive the elapsed seconds range signal B (0 – 15 seconds - even minute value). In the absence of signals on the inputs to the gates 828 and 830 their outputs are low such that the output of the gate 826 is high. Accordingly, the $\bar{B}_2$ signal line is normally low level. From this it will be seen that the output of the gate 826 will go low if either the output of the gate 828 goes high OR the output of the gate 830 goes high. The said outputs will go high if the data read by the scanning heads 74b and 74c shows an elapsed time of 1 minute 16 seconds through 2 minutes 15 seconds. Similar circuits are employed for generating the $\bar{B}_3$ through $\bar{B}_{27}$ drive signals. The $\bar{B}_1$ signal circuits are also similar except the values employed are $T_0$ and the F range signal 6 through 60 elapsed seconds OR $T_1$ and D. The $\bar{B}_{28}$ signal is generated for all elapsed time values in excess of 27 minutes, $(T_{27})$ and E (76 – 120 seconds, i.e., 16 – 60 seconds for an odd value minute). The said signal is obtained on the inputs of a NAND 828 connected to drive a NAND 826. The $T_{28}$ signal is employed to drive the other input of the said NAND 826 through an inverter 832. The $T_{28}$ signal is generated for all values in the range 28 minutes to 60 minutes.

The output gates 824 are all connected by their second inputs to a logic transfer (operate) signal line 834. The said line represents the output line of a logic transfer generator 836 shown in detail in FIG. 18. The said generator comprises a three input NAND 838 having its output connected through an inverter amplifier to the line 834. The gate is connected on two inputs to receive the pretime signal line 474 and to the logic operate signal line 258. It will be recalled that the line 258 is normally high level, thus the line 834 is also normally high as stated. The $\bar{P}$ signal line is normally at a low level and only goes high as previously described. Finally, the third input of the gate 838 may be connected through an inverter 840 to a $T_{615}$ signal line if it is deemed desirable to have a generator for generating a special T signal for cards having an elapsed seconds recording of 6 – 15 seconds. From the foregoing, it will be seen that the generator 836 normally cycles the line 834 low in response to pulses on the logic operate line 258, i.e., with the operation of the logic operate switch through the inhibit gate 210 of the function generator (FIG. 10). It will be recalled that this pulse is timed to occur at 375 milliseconds of clutch rotation and persists for 60 milliseconds. It will also be recalled that scanning occurs in the period 225 – 375 milliseconds. Accordingly, in operation a generator 826 (FIG. 24) will go low on its output at some time during the period 225 – 375 milliseconds and it will remain low until the counters and logic are reset by the logic cancel pulse occurring at 125 milliseconds in the next or subsequent revolution of the clutch. Thus a low going signal on the line 834, as the result of operation of the logic operate switch 152 is effective to drive the other input to the selected gate 824 low such that a $\bar{B}$ signal in the group $\bar{B}_1$ through $\bar{B}_{28}$ is generated on a line 642. The signal persists for 60 milliseconds, i.e., until the line 834 returns high. From the preceding it should also be apparent that a pretime signal $\bar{P}$ is effective to inhibit the transfer operation described, and similarly a $T_{615}$ signal if used is also effective to inhibit the transfer operation, i.e., the generation of a $\bar{B}$ signal in the described group.

$T_{615}$

In some circumstances the telephone operating companies prefer to segregate all cards having an elapsed seconds reading of 6 through 15 seconds for accounting purposes. In the preferred embodiment, the machine can be provided with circuits for distributing such cards to a special storage bin during a general sorting, punching operation. If this is desired, then a special cutout switch may also be provided to inhibit the $T_{615}$ circuits such that the specially sorted cards may thereafter be sorted according to elapsed minutes. It should be noted that provisions should be made to inhibit the punch during the special sort. A circuit 842 for providing the inhibit function is shown in FIG. 18 and it may comprise an inverter connected to an inhibit line 844 and connected on its other side to a high level supply line through a $T_{615}$ cutout switch located at the control panel for the machine.

A $T_{615}$ generator is shown in FIG. 23a and it comprises a two input NAND gate 846 connected on its output to a $T_{615}$ signal line 848. The gate 846 is connected on one input to the output of a NAND 850 and on its other input to the output of a NAND 852. Each of the gates 850 and 852 are connected on one input to the $T_{615}$ inhibit line 844 such that these inputs are low unless the cutout switch is operated. The gate 850 is connected on its other input to receive the elapsed seconds range signal A (6-15 seconds for even value minutes), and the gate 852 receives the range signal H (66-75 seconds or 6-15 for odd value minutes) on its other input. In the absence of A and H signals, the gates 850 and 852 have low level outputs and the gate 846 is high on its output. If either A or H is generated one of the gates 850 or 852 will go high (assuming the cutout switch is not operated) to thereby signal the line 848.

Referring to FIG. 24, the signal line 848 may be connnected to one input of a two input NAND 854 which gate may be connected on its other input to the pretime $\bar{P}$ signal line 474. The gate 854 may be connected on its output through a NAND-INV. 856 to one input of a bin selection NAND 858 where the NAND 858 is connected on its other input to the logic operate line 258. It will be recalled that when the $T_{615}$ generator is employed, its signal output 848 was connected through an inverter to the input of the transfer function generator 836 (FIG. 18). In operation, the $\bar{P}$ line 474 is low (absent a $\bar{P}$ signal) such that a low going $T_{615}$ signal drives the output of the NAND 854 high and the output of the NAND 856 low. The $T_{615}$ signal also causes the line 834 to remain high by inhibiting the operation of the transfer generator 836. Accordingly, the gates 824 are inhibited. The gate 858, however, will go low on its output to signal a $\bar{B}_{615}$ selection line 860 with the operation of the logic operate switch as previously explained and assuming operation of the gate 210 in FIG. 10.

Bin Gate Drive

Figure 25:
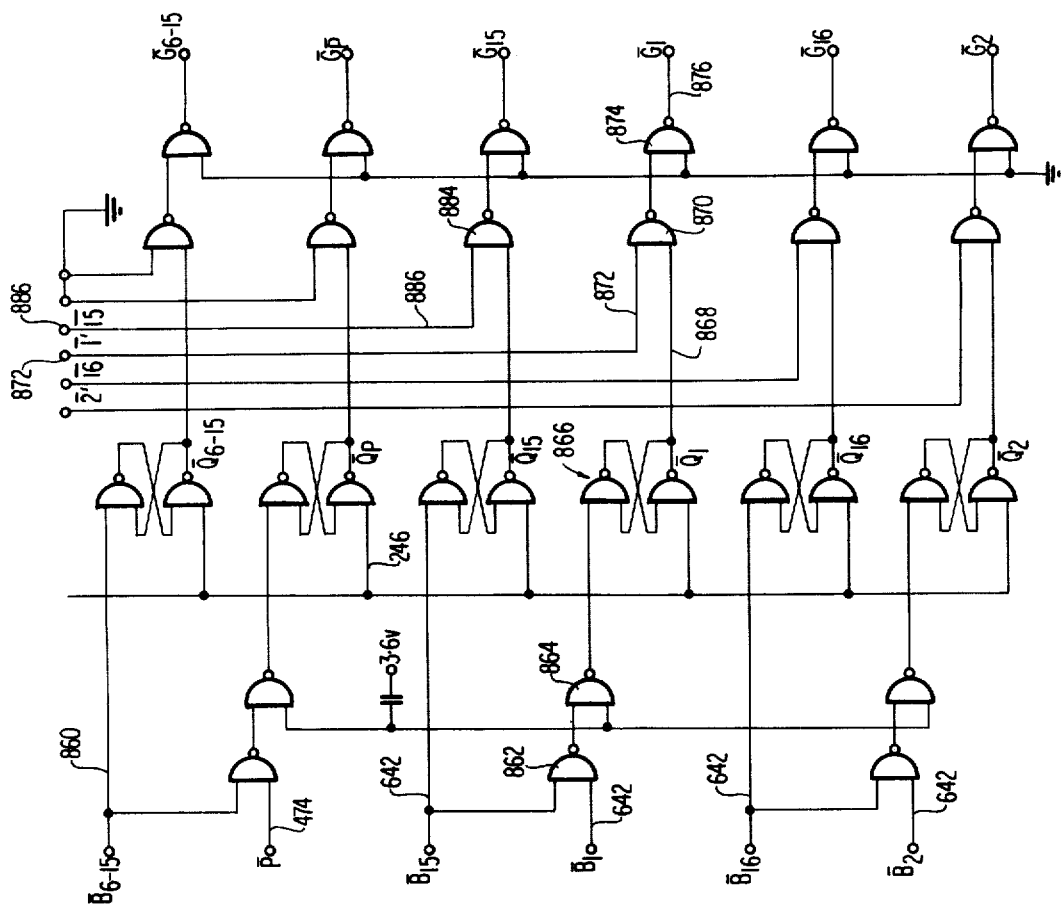
FIG. 25 is a schematic diagram of the bin gate drive circuit.

The bin gate drive circuits represented by the block 248 in FIG. 5 are shown in representative form in FIG. 25. The circuits shown in the figure represent bin gate solenoid signal drive circuits for three pairs of bin gates where the gates operate to deflect a card into either an upper row storage bin or a lower row storage bin. For the latter situation both of the gates of the pair have to be operated. The circuits for each pair are the same, thus a description for one pair should suffice for all 15 pairs. The bin gate 15 is associated with an upper row storage bin and bin 1 is associated with the bin located in the lower row and, in fact, beneath bin 15.

The $B_1$ signal line 642 is connected to an input of a NAND 862 which gate receives on its second input the $\bar{B}_{15}$ signal line 642. The NAND 862 is connected on its output through a NAND-INV. 864 to the set input of a NAND latch 866. The latch 866 is connected on its reset to the reset line 246 which line is normally at a low potential. When the latch is in its reset condition, its set output is high thus the reset output is low level. The latch 866 is connected by its reset output over a line 868 to one input of a two input NAND 870. The NAND 870 is connected by its second input to a $\bar{1}'$ signal line 872 connected to an output of the lead card distribute circuit 242 (FIG. 5). The NAND 872 is connected by its output through a NAND-INV. 874 to a gate solenoid drive line 876.

Figure 26:
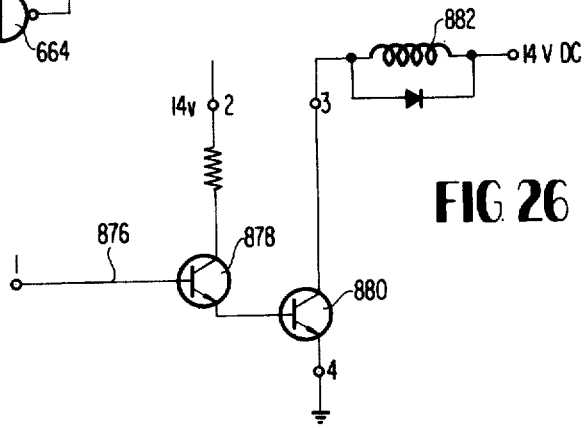
FIG. 26 is a schematic of a typical bin gate solenoid circuit.

Referring now to FIG. 26, a typical deflection gate solenoid circuit is shown connected to the drive line 876. The line connects to the base electrode of a current switch-transistor 878 which transistor is connected by its emitter electrode to the base electrode of a solenoid drive transistor 880. The said last named transistor is connected by its collector to a DC source through a gate 1 operating solenoid 882, and its emitter is grounded.

Referring again to FIG. 25, all the latches 866 will be reset by a pulse on the line 246 as the result of the operation of the logic operate switch; in this regard, it will be recalled that the line 246 receives the 10 milliseconds pulse generated at the output of the gate 220 (FIG. 10). If during the $\bar{B}_1$ signal, line is high after the expiration of the reset pulse (and it will be for 50 milliseconds if selected) then the NAND latch sets low as a result of a high output from the inverter 864. The reset output of the latch goes high through the usual flip-flop action of the latch to thereby drive the output of the gate 870 low and the line 876 high. With the line 876 high, the transistor 878 (FIG. 26) will switch on to thereby switch the transistor 880 on and energize the gate solenoid 882.

The solenoid 882 will remain energized until the latch 866 is reset, which event does not occur until the next operation of the switch 152, i.e., at a time of 375 milliseconds into the next clutch cycle. Thus the card, in the preferred embodiment, has about 390 milliseconds (from 435 mils in one cycle to 375 mils in the next cycle) to reach the deflection gate and be deposited thereby in its bin. This amount of time is more than ample for a 30 bin machine.

Referring again to FIG. 25, it will be seen that a $\bar{B}_{15}$ signal also effects operation of the gate 1 solenoid 882 by virtue of its connection to an input of the gate 862, i.e., it will set the latch 866 to send the line 868 high. The $\bar{B}_{15}$ signal is also applied directly to the set input of a second latch 866 which latch is connected by its reset output to an input of an inverter gate 884. The gate 884 is connected on its output through circuits precisely like that connected to the output of the gate 870 to drive a gate 15 operating solenoid.

All of the remaining gate operating solenoids are as described above, except that the $\bar{P}$ and $\bar{B}_{6-15}$ circuits do not include drives from the lead card distribute circuits. In the preferred embodiment the $\bar{P}$ and 1 through 14 bin storage locations are in the lower row and the 615 and 15-28 bin storage locations are in the upper row.

Lead Card Distribute

As was mentioned above, the machine is provided with lead card distribute circuits 242. It is the purpose of these circuits to distribute cards that are prepunched with elapsed time to each of bins 1 through 28 in the document sorting machine. The record receiver described above and with which the description of the operation of the preferred embodiment of the invention has been given, is a telephone toll card of the type in common use by the telephone operating companies in the United States. The largest system of such companies employs automatic accounting machinery of the type that responds to a punched record receiver. A batch punching machine employed by the telephone operating companies responds to a single card prepunched with elapsed time and it will automatically punch all cards handled thereafter with the same elapsed time as the prepunched card. The automatic batch punching machinery then responds to the next prepunched card to make an assumption that all cards between prepunched cards have the elapsed time of the prepunched card. The cards are perforated with the time of day as hereinafter described, in that the automatic accounting machinery requires such information to calculate toll rates.

Figure 27:
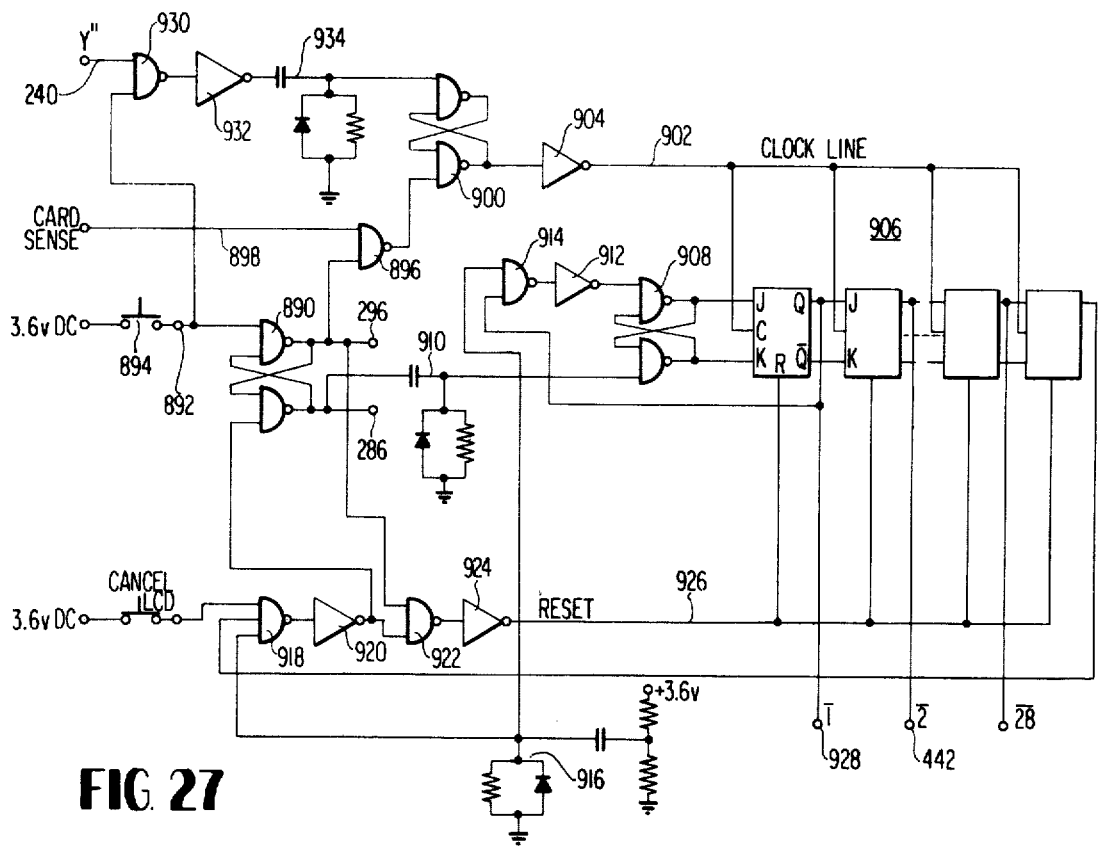

The lead card distribute logic is shown in FIGS. 27 and 28 of the drawings. Referring now to FIG. 27, the signal lines 286 and 296 of such logic previously described with respect to inputs of the function generator 158 are obtained from the reset and set outputs respectively of a latch 890. It will be recalled that when the machine is in its normal sorting mode of operation, the line 286 is at a low level such that it does not inhibit the gate 210 in the function generator 158, and the line 296 is at a high level. Accordingly, during a normal sorting operation the set output of the latch 890 is at a high level and the reset output is at a low level, assuming that the lead card distribute logic is in a reset condition. The set input of the latch 890 may be obtained at a terminal 892 which terminal is connected to one terminal of a push button switch 894 located at the control panel for the machine. The other terminal of the switch 894 is connected directly to a DC source of voltage such that when the switch is closed as by being pushed, the DC voltage is applied to the set input of the latch 890. When the switch is closed, the latch sets low to thereby send the line 296 low and through normal NANDing action the line 286 goes high to inhibit the gate 210 as previously described. The set output of the latch 890 is connected as one input to a NAND 896 where the NAND 896 is connected to receive on its other input a card sense signal applied over a line 898. A card sensing photocell light source combination may be located at the jam sensor location in the scanning station so as to sense a record receiver passing down the trackway just prior to being stopped by the card gate. In point of fact, the jam circuits may be employed for this purpose. The card sense line 898 is normally at a high level and the line goes low such that the output of the NAND gate 896 goes high with the passage of a card. The NAND 896 is connected on its output to the reset input of a latch 900 such that a pulse on the output of the gate 896 is effective to send the reset output of the latch low. A clock line 902 is connected to the reset output of the latch 900 through an inverter amplifier 904, such that every time the reset output of the latch goes low, the clock line 902 is pulsed. The line 902 may be connected to the clock inputs of the individual stages of a shift register 906 comprising 29 flipflop stages interconnected in a shift register configuration such that the first clock pulse applied on the line 902 is effective to send the Q output of the first shift register stage high with the said pulse being shifted through the stages with each succeeding pulse on the line 902.

As shown in FIG. 27, the stages may be interconnected with a Q output of the preceding stage applied to the J input of the succeeding stage, and with a $\overline{Q}$ output of the preceding stage applied to the K input of the succeeding stage. The J and K inputs of first stage may be initially set by the outputs of a NAND latch 908 with the set output of the latch being connected to the J input of the first stage of the shift register and the reset output of the latch being connected to the K input. The reset input of the latch 908 may be connected to the output of a differentiator 910 where the differentiator is connected on its input to the line 286.

The set input of the latch may be connected to the output of an inverter amplifier 912, where the inverter amplifier is connected to receive the output of a two input NAND gate 914. One of the inputs of the NAND gate 914 is connected to receive the Q output of the first stage of the shift register, and the other input of the NAND is connected to be pulsed by a power turn on pulse circuit 916. It will be seen from the foregoing that power turn-on will effect a pulse on an input of the gate 914 to thereby pulse the set input of the latch 908. This pulse is effective to send the set output of the latch low and, accordingly, put the J input of the first stage of the shift register at a low level.

The turn on circuit 916 is also connected as one input to a three input NAND 918. The NAND 918 is connected to drive an amplifier 920, and the amplifier is connected on its output to both the reset input of the latch 890 and to drive one input of a two input NAND 922. Accordingly, with power on, the gate 918 is pulsed such that a pulse is applied to the reset input of the latch 890 to thereby drive the reset output of the said latch low. As previously stated, the circuit 910 is connected to the reset output of the latch 890; however, when the said reset output goes low, no change occurs at the reset input to the latch 908, i.e., this input will remain low. Accordingly, with power turned on, both inputs to the reset portion of the latch 908 are low and its output high such that the K input to the first stage of the shift register is high. In summary then, the J input of the first stage is found at a low and the K input of the first stage is found at a high.

All other J and K inputs to each of the stages of the shift register may be put in the same state as the J and K inputs of the first stage by applying the turn-on pulse through an inverter 924 connected to receive the output of the NAND 922 and connected to a reset line 926. The reset line should be connected to the reset inputs of each stage in the shift register. The line is then pulsed at power turn-on to drive all Q outputs low and all $\overline{Q}$ outputs high.

In the event that the button 894 is now pressed, the reset output of the latch 890 will go up to send the line 286 high and this action will cause the differentiator 910 to generate a pulse on the reset input of the latch 908. Accordingly, this pulse operates to set the K input to the first stage of the shift register low. At this time, the output of the NAND gate 914 is high in that both inputs to the gate are low such that the output of the inverter 912 is low. Accordingly, with the reset output of the latch at a low and the output of the inverter 912 also at a low, the set output of the latch 908 goes high to send the J input to the first stage of the shift register high. The first pulse appearing on the clock line 902 after the occurrence of the events just stated will be sufficient to send the Q output of the first stage of the shift register high. This output is taken over a line 928 as the first output of the shift register. The Q output of the first stage is also coupled back to an input of the NAND 914 such that it is effective to drive the J input to the first stage low and the K input to the first stage high as the result of a pulse on the line 928. In addition, the Q output of the first stage constitutes the J input of the second stage, as previously stated, and the $\overline{Q}$ output of the first stage constitutes the K input to the second stage; these outputs are now J high and K low such that the next clock pulse on the line 902 is effective to reverse the states of both the first and second stages of the shift register. With the occurrence of the second clock pulse, the Q output of the said stage will go low. The said second clock pulse returns the Q and $\overline{Q}$ outputs of the first stage low and high respective states. A third pulse on the clock line will then be effective to shift the output of the shift register to the Q output of the third stage and simultaneously reset the outputs of the second stage. From the preceding, it is believed apparent that each clock pulse on the line 902 is effective to shift the output of the shift register one stage and, in view of the fact that 29 stages are employed in the shift register, 29 clock pulses will cause a circulation of the initial pulse completely through the shift register. The Q output of the twenty-ninth stage in the preferred embodiment is coupled back to an input of the gate 918 such that it is effective to reset the shift register, as described above.

The line 902 may be clocked through the timed setting and resetting of the latch 900. As shown, the NAND 896 responds to low going pulses on the card sense line 898 after the line 296 goes low as a result of an operation of the push button 894. Accordingly, a low going card sense pulse is effective to drive the output of the gate 896 high to thereby create a pulse on the line 902 through the rest output of the latch 900 and the inverter 904. This event occurs when the card is at or near the input to the scanning station, i.e., near the beginning of a clutch cycle. As indicated above, the shift register is pulsed and its outputs cannot change state until another clock pulse is generated on the line 902. The clock line 902 may be restored as the result of a reset signal applied on the line 240 by the gate 220 in the function generator (FIG. 10). The line 240 is normally at a high level and goes low with the operation of the logic operate switch 152. The line 240 is connected to the input of a NAND 930 which is connected on its other input to the set input of the latch 890. Thus, after the circuitry has been placed in the lead card distribute mode, this input is normally open. In the absence of a signal on the line 240 the output of the NAND 930 is at a low level and this output is inverted by an inverter amplifier 932 and applied to the input of a differentiator 934. The output of the differentiator is connected to the set input of the latch 900. From what has been said then, it will be seen that the said input to the latch 900 remains low, and the set output is low so long as the reset output of the latch is high.

In operation then, when the latch is reset by a card sense pulse, the set output of the latch 900 goes high and remains high until such time as the set input is pulsed. It will be recalled that when the reset output of the latch goes low, the clock line 902 goes high. A logic pulse on the line 240 sends the output of the NAND 930 high and the output of the inverter 932 low. With the termination of the signal on the line 240, the output of the NAND gate 930 will return low and the output of the inverter amplifier 932 high such that a pulse is generated by the differentiator 934 at the set input of the latch 900. The flip-flop 900 accordingly reverses state to bring the clock line 902 down.

Referring now to FIG. 28, the output line 928 of the first shift register stage is coupled as an input to a NAND gate 936 where the said NAND also receives as an input the output $\overline{15}$ of the fifteenth stage of the shift register. Both inputs are normally low and the NAND is high on its output. The output of the NAND 936 is connected through an inverter amplifier 938 to the $\overline{1}'$ signal line 872 and the $\overline{15}$ output of the shift register is the output line 886. It will be recalled that the lines 872 and 886 constitute inputs to the gates 870 and 884, respectively, in the bin gate drive circuits, FIG. 25. From this discussion, it will be seen that if either the first stage or fifteenth stages of the shift register provides output signals the gate 936 will go low on its output to signal line 872 and energize the gate 1 solenoid 882. The fifteenth stage of the shift register also produces an output signal on the line 886 such that it also operates the gate 15 solenoid. Circuits such as the one discussed above with respect to the first and fifteenth stages of the shift register are employed for the second and sixteenth stages, the third and seventeenth stages, etc., such that outputs on the sixteenth through twenty-eighth stages of the shift register are effective to operate the respective gates 2–14, as well as their own gates.

A.M.-P.M. Circuitry

As indicated above, the time of day recording appearing on the record receiver or data card is sensed by the A.M.-P.M. scanner head 74a such that the head produces a radiant energy output signal which depends upon the angular separation of the hours timing mark and of the minutes timing mark appearing in the recording. The said signal is detected as explained above to produce a control pulse on the line 434 (FIGS. 5 and 11a), that is spaced relative to a start pulse on the line 438 as a function of the angular separation of the midnight calibration line on the 24 hour dial and the hours indicator, and to produce a control pulse on the line 436 that is spaced relative to the start pulse as a function of the angular separation of the 12 noon calibration line on the 24 hour dial and the minutes indicator. The A.M.-P.M. logic circuits responsive to such pulses and to transponder pulses on the line 450 are shown in FIGS. 29 through 37 of the drawings. For the purpose of the following explanation, it will be assumed that all logic described is found in its reset condition.

Figure 29:
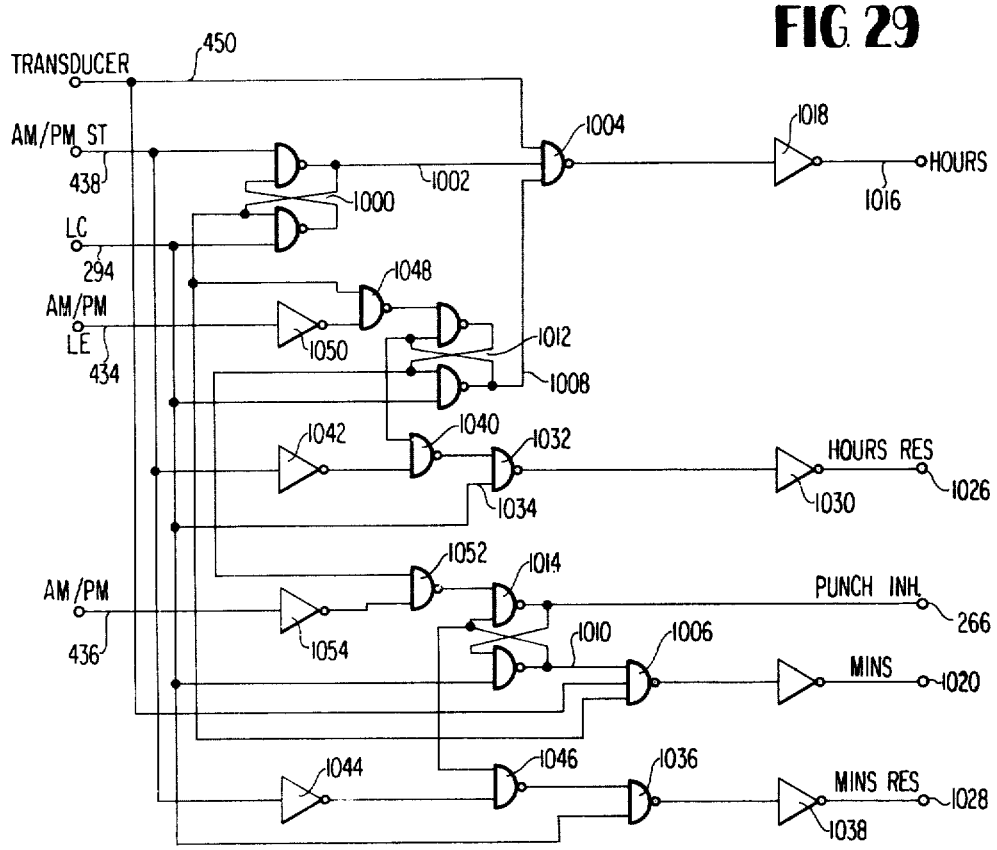
FIG. 29 is a schematic diagram of the AM-PM counter gate circuits.

Referring now to FIG. 29 of the drawings, the A.M.-P.M. start pulse is applied by the line 438 to the set input of a latch 1000. In view of the fact that the pulse is positive going, and in view of the fact that negative logic is employed, a set output 1002 of the latch will go low upon receipt of the start pulse. The output 1002 of the latch is connected as one input to a NAND gate 1004 and it is connected directly to an input of a second NAND gate 1006. Each of the NAND gates 1004 and 1006 are connected on second respective inputs to receive transducer pulses applied to the line 450. Finally, each of the gates 1004 and 1006 receive third inputs 1008 and 1010 constituting the reset outputs of a pair of respective latches 1012 and 1014. In view of the assumption above made that all logic is found in its reset condition, the output 1008 and 1010 are lows such that all inputs to the NAND gate 1004 and 1006 respond to transducer pulses applied on the line 450 as a result of the receipt of a start pulse on the line 438. The gate 1004 is connected to an hours counter output terminal 1016 through an inverter 1018 such that the terminal goes high in response to transducer pulses applied on the line 450. Similarly, with the outputs 1002 and 1010 of the latches 1000 and 1014 respectively low, the gate 1006 will respond to transponder pulses through the gate 18 to apply the pulses at a minutes counter terminal 1020. From the foregoing, it will be seen that the terminals 1016 and 1020 are made to respond to transponder pulses applied to the line 450 as a result of the application of a start pulse to the set input of the latch 1000.

Figure 30:
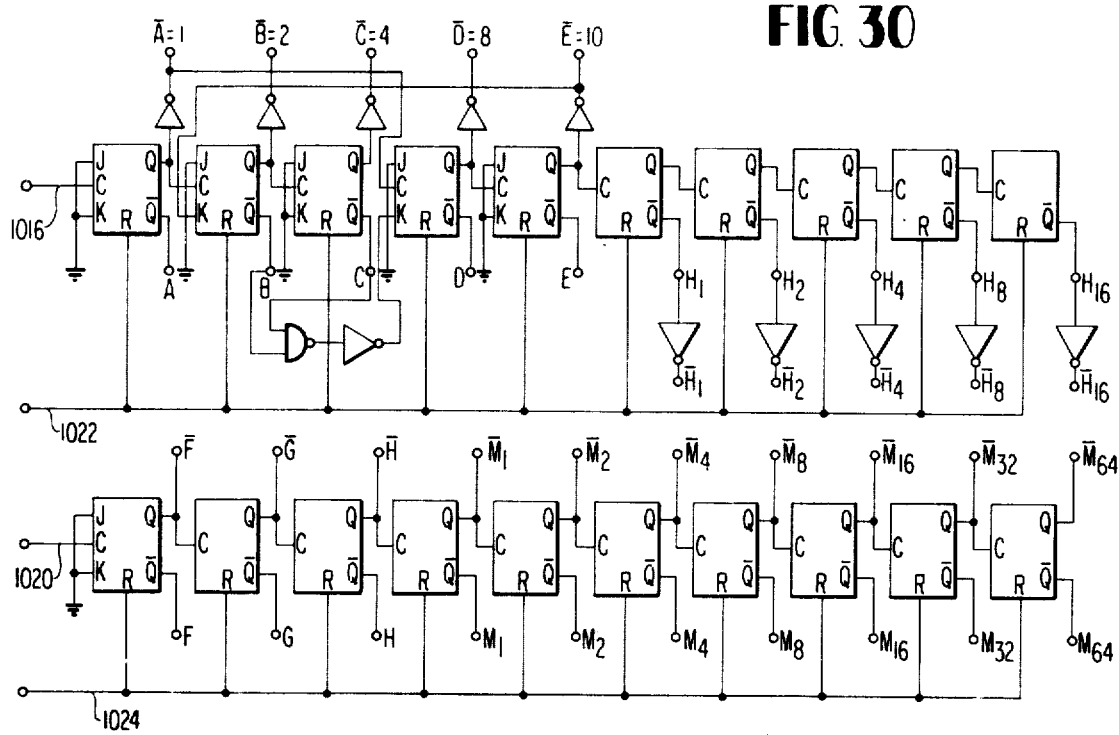
FIG. 30 is a schematic diagram of the AM-PM counter circuits.

Referring now to FIG. 30 of the drawings, the terminal 1016 connects to the clock input of the first stage of an hours up counter comprising interconnected flip-flops of the JK type. The first five flip-flops are preferably connected to provide a module 20 divider where the outputs are respectively binaries 1, 2, 4, 8 and 10. The remaining five stages are interconnected such that they operate as a straight binary up counter, i.e., the Q output of the sixth stage is connected to clock the seventh stage, the Q output of the seventh is connected to clock the eighth stage, etc. This type of circuitry is provided for the reason that in the preferred embodiment of the invention, the transducer generates 480 pulses per revolution and for the reason that a twenty-four hour clock dial is employed in the time of day recording such that each complete hours division on the clock dial is represented by 20 transducer pulses. For this reason, it is desired to send the output of the sixth binary stage in the counter up in response to the twentieth pulse inputted on the terminal 1016 of the gating network. Accordingly, the outputs of the sixth through tenth stages are connected to provide a BCD representation of the hours of day recording appearing in the A.M.-P.M. recording on the record receiver and for this reason the said outputs constitute $H_1$, $H_2$, $H_4$, $H_8$ and $H_{16}$. For reasons that will appear hereinafter the hours terminal thus defined are connected through inverters such that the NOT values may be obtained as counter outputs.

The module 20 divider outputs are also utilized for any BCD number appearing on the said outputs which constitutes a remainder value that may be used for correctional purposes. As in the elapsed minutes and elapsed seconds case, correction is desired for the reason that mechanical and other errors may have been introduced into the device employed to produce the time of day recording. The outputs obtained from the divider represent remainder values for 0 through 19 remainder pulses as is evident from the fact that the twentieth pulse is capable of sending the $H_1$ of the counter up. For reasons that will be made evident below, the only remainder values that are considered in the preferred embodiment are those produced by from 0 to 4 clock pulses and those produced by 16 through 19 clock pulses.

In the normal case, the $\overline{Q}$ outputs of all counter stages are high, that is, they are found high when the counter and divider are reset to 0. This, in turn, means that the Q outputs are found low when the entire counter and divider is in the reset condition. For use with the negative logic employed in this invention all Q and all $\overline{Q}$ outputs are inverted such that a Q output goes low for a signal and a $\overline{Q}$ output goes high.

The minutes counter is shown in the lower half of FIG. 30 connected to be pulsed on its first stage by the terminal 1020. The said counter employs two counter boards, each containing five JK flip-flops connected up in serial fashion so as to produce outputs from the fourth through ninth stages with the first three and last stage outputs being ignored for all but test purposes. The minutes counter is connected up such that the Q output of a stage is utilized to clock the input of the next succeeding stage, and the $M_1$ through $M_{32}$ outputs are taken from the $\overline{Q}$ outputs of the respective counter stages and the $\overline{M}_1$ through $\overline{M}_{32}$ outputs are taken from the Q outputs of the respective counter stages.

Each of the hours and minutes counters are also connected to receive reset pulses for the purpose of zeroing the counters over a respective hours reset line 1022 and a minutes reset line 1024. The lines 1022 and 1024 are respectively connected to hours reset and minutes reset terminals 1026 and 1028 in FIG. 29 of the drawings.

The terminals 1026 and 1028 are normally at low voltage levels such that the reset lines are also normally at such levels. The logic employed for the purpose of resetting the hours and minutes counters may be generally the same; however, there is a difference in function which will be hereinafter explained. The terminal 1026 for the hours reset line is connected through an inverter 1030 to the output of a NAND gate 1032 and under the conditions imposed, the output of the gate 1032 is normally at a high level, meaning that its inputs are at low levels. The gate 1032 is connected from an input 1034 to receive logic cancel pulses applied on the line 294 as previously explained. Accordingly, it will be seen that a logic cancel pulse on the terminal 1034 is effective to drive the output of the gate 1032 low and thereby pulse the hours reset terminal 1026 and hence the counter reset line 1022.

Similarly, the minutes reset terminal 1028 is connected to the output of a two input NAND gate 1036 through an inverter 1038. The gate 1036, like the gate 1032, also receives the logic cancel pulses such that the presence of a logic cancel signal is effective in itself to reset both the hours and minutes counters.

The gate 1032 is connected on its ohter input to the output of a two input NAND gate 1040. In view of the fact that the output of the gate 1032 must normally be at a high level, then the normal non-resetting condition imposed on the gate 1040 is that its output be at a low level. The gate 1040 is connected on one input through an inverter 1042 to the A.M.-P.M. start line 438 which, as will be recalled from the discussion above, is normally at a low level and goes high in the presence of a start pulse. Accordingly, the inverter output is sufficient under normal circumstances to inhibit the output of the gate 1040 such that the said output remains low. This inhibit will continue until such time as a start pulse is received at the inverter input, thus driving the output of the inverter low. If, at this time, the other input to the gate 1040 is also low, the inverter output will go high to drive the output of the gate 1032 low and, hence, pulse the hours reset terminal 1026 to reset the hours counter. A similar reset circuitry is connected to the gate 1036 on its second input as the result of the A.M.-P.M. start line being connected through an inverter 1044 to one input of a NAND gate 1046. The output of the NAND gate 1046 is normally low as with the case of the NAND gate 1040 and the operation to pulse the terminal 1028 is precisely like that explained above regarding the A.M.-P.M. start pulse and its pulsing of the terminal 1026.

Both of the gates 1040 and 1046 are connected on their other inputs to receive the reset outputs of the latches 1012 and 1014, respectively. From what has been said previously, it will be seen that if the reset output of the latch 1012 is high, this factor will be sufficient to inhibit the output of the gate 1040 from going high and, accordingly, inhibit the application of a reset pulse to the hours counter by a start pulse until a logic cancel pulse is received. Similarly, if the reset output 1010 of the latch 1014 is high, the operation is to prevent a reset pulse on the minutes reset terminal 1028 until such time as a logic cancel pulse is received.

As is noted above, the reset output 1008 of the latch 1012 is connected as one input to the gate 1004 and under the assumption made at the start of this description is normally found in a low condition. Accordingly, the set output was reset high. The latch 1012 is connected on its set input to the output of a two input NAND gate 1048. The gate is connected on one of its inputs to receive the set output of the latch 1000 which, as will be recalled, is in a high condition until such time as in an A.M.-P.M. start pulse is received. In such condition, this input to the NAND 1048 is sufficient to maintain the set input to the latch 1012 low until such time as a start pulse sets the latch 1000. When the latch 1000 is set, its output 1002 goes low, thus driving the associated input of the gate 1048 low. The gate is connected on its other input through an inverter to the control pulse line 434. It will be recalled that this line is pulsed as the result of detection of a radiant energy pulse by the detector 412: Accordingly, the line 434 is low until such time as the collector of the A.M.-P.M. Darlington goes high to thereby drive the output of an inverter 1050 low to send one input to the NAND 1048 low. From what has been said, then, it should be apparent that the output of the NAND gate 1048 can go high only in the event that the terminal 1002 of the latch 1000 is set low as the result of an A.M.-P.M. start pulse supplied on the line 438 and if a control pulse is thereafter received on the line 434. Under these conditions, a control pulse on the line 434 operates to set the latch 1012. When the latch 1012 sets as a result of the receipt of the signals mentioned above, its set output goes low, and this output is connected as one input to the reset NAND of the latch 1012 and, as previously explained, the other input for the reset NAND is connected to the normally low logic cancel line 294. Accordingly, when the latch 1012 is set, both inputs to the reset NAND are low (assuming the absence of a logic cancel signal), thus resulting in the reset output 1008 going high. Since as previously explained, the reset output 1008 is connected as one of the inputs to the NAND 1004, it is effective to inhibit the NAND when it is at a high level. From the description thus far, it should be apparent that a start pulse on line 438 is sufficient to open the NAND 1004 so as to pass transducer pulses to the hours counter over the terminal 1016 and a pulse on the line 434 is effective to inhibit the NAND such that transducer pulses cannot thereafter be passed to the hours counter.

As stated previously, the NAND 1014 set output is also at a high level and the reset output 1010 is at a low condition as the result of the latch having been reset by a logic cancel pulse. The set input of the latch 1014 is connected to the output of a NAND gate 1052, which output is normally at a low level. The gate 1052 is connected to one input through an inverter 1054 to the second control pulse line 436. The line 436, like the line 434, is normally at a low level and the output of the inverter 1054 is normally at a high level to inhibit the gate 1052 or, that is, maintain its output at a low level. The gate 1052 is connected on its other input to receive the set output of the latch 1012. It will be recalled that the set output of the latch 1012 is normally at a high level until it is set low as the result of the first control pulse appearing on the line 434.

Accordingly, so long as the latch 1012 is maintained in its reset condition, i.e., until such time as a first control pulse is received, the set output of the latch 1012 maintains the output of the NAND 1052 at a low level. It should, therefore, be apparent that the latch 1014 cannot be set until such time as the collector of the A.M.-P.M. Darlington (FIG. 11a) first makes a transition from a low to high indicating the receipt or start of a pulse on the Darlington's base electrode (line 434 is pulsed) and until such time thereafter as the collector makes a second transition from high to low (line 436 is pulsed) indicating the termination of the pulse on the Darlington's base. The application of pulses in sequence, therefore, to the lines 434 and 436 constitutes a verification of the receipt of a valid pulse on the base of the Darlington and both pulses must occur to send the output of the NAND 1052 high to thereby set latch 1014. As in the case of the latch 1012, the thus described transition of the set output of the latch 1014 is effective to send the reset output high to thereby inhibit the NAND 1006. Accordingly, as in the case of the NAND 1004, a start pulse on the line 438 is effective to commence the passage of transducer pulses to the minutes counter. The gate 1006, unlike the NAND 1004, cannot thereafter be inhibited until such time as pulses are received on both the lines 434 and 436. In point of fact, the pulse on the terminal 436 occurs later in time than the pulse on the line 434. The differential existing between the occurrence of a start pulse and the occurrence of a pulse on the line 436 is an analogue of the angle taken between the twelve noon calibration line on the 24 clock face and the minute's indicator appearing on the time of day recording. Accordingly, the number of pulses inputted to the counter are such that the counter generates a BCD analogue of the minutes recording. Similarly, the hours counter provides a BCD analogue on its outputs of the hours recording.

It should be noted at this time that the angle created between the 12 noon calibration line and the mark indicating minutes on the time of day recording may be less than the angle taken between the 12 midnight line and the mark indicating the hour of the day on the same recording. In such an event, the line 436 will not be pulsed during the first rotation of the A.M.-P.M. scanner head. This follows for the reason that the ON photocell in the scanner head does not see the hours mark until after the OFF photocell in the said head has been scanned past the minutes indicator which in turn means that in the first scan, the scanner generator will be turned ON but will not be turned OFF. Accordingly, the gate 1006 will pass 480 pulses from the transducer to the minutes counter thus storing an invalid count in the said counter. On the other hand, the hours counter would have obtained its proper count and would have been turned off as the result of a pulse appearing on the line 434. It will be recalled that, with respect to the discussion of the minutes counter reset circuitry the gate 1046 is connected to the reset output 1010 of the latch 1014 which output is low under these circumstances. Accordingly, the next start pulse on the line 438 will be effective to drive the output of the inverter 1044 low such that the output of the gate 1046 goes up to pulse the minutes counter reset terminal 1028. The minutes counter is thereby reset over the line 1024. Thus, at this point, the transducer will start the count over again in the minutes counter. As stated above, the scanner head signal generator is still on for the reason that it was not turned off and, in this second scan, it will be turned off as the result of the OFF photocell scanning past the minutes indicator in the time of day recording. Thus under the special circumstances just described, it will be seen that the hours counter obtains its proper count during the first rotation of the scanner head and that the minutes counter thereafter obtains its count during the second rotation of the scanner head. In the reverse case, i.e., the case where the angle created between the 12 noon and minutes indicator is greater than the angle created between the 12 midnight and hours indicator, no problem of the type just described exists, for the reason that the scanner signal generator comes on before the OFF cell is scanned past the minutes indicator.

It should also be mentioned that it is necessary for the scanner head to make three complete rotations or scans of the data recorded on the record receiver. This requirement follows for the reason that the angular relationship of the scanner head may be at any rotational location at the moment the card comes under the head to be read thereby. The circuitry described above operates just as effectively under these conditions as under the conditions described.

Finally, it will be noticed in FIG. 29 that the set output of the latch 1014 is connected to the punch inhibit line 266. It will be recalled that the line 266 constitutes an inhibit input to the gate 210 of the function generator. Accordingly, the inhibit function cannot be removed absent signals on the lines 434 and 436, and in the preferred embodiment a card for which such signals are not received is not punched and it is sent to a reject bin.

Figure 31B:
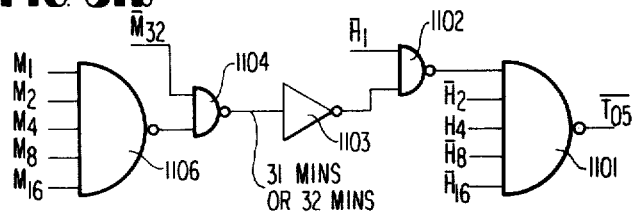
FIGS. 31a and 31b show Hours Ti generators.
Figure 31A:
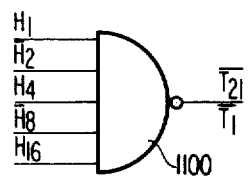

As in the elapsed minutes and elapsed seconds case, the outputs of the hours counter are logically combined for the purpose of producing raw hours timing signals. Referring to FIG. 31a, it will be noticed that a timing signal $\overline{T}$ is produced at the output of a five input NAND gate 1100. In the preferred embodiment 24 such gates are employed for the purpose of producing the signals $\overline{T}_0$ through $\overline{T}_{24}$ where only one such signal is generated for any given time of day recording. As stated heretofore, a representation of a NOT signal means that the signal is present when the NOT terminal goes high. Accordingly, the conditions stated in the preceding formula are obtained by combining the outputs of the hours counter as inputs to the various time generators. For example, the $T_0$ timing generator 1100 has the hours counter outputs $H_1 \overline{H}_2 \overline{H}_4 \overline{H}_8 \overline{H}_{16}$ on its inputs. This means that when all said H inputs are low, the output of the $\overline{T}_0$ gate 1100 will go high to indicate that the hours counter reading is 0 hours. Similarly, $B_0 \overline{T}_1$ is produced by combining $H_1 \overline{H}_2 \overline{H}_4 \overline{H}_8 H_{16}$ on the inputs to the $\overline{T}_1$ gate 1100. All inputs to this generator will go low in the event that the $H_1$ counter goes low at such time as the $\overline{H}_2$ through $\overline{H}_{16}$ outputs of the counter are also low. As one final example, the $\overline{T}_{21}$ output is produced by the NANDing of the values $H_1 \overline{H}_2 H_4 \overline{H}_8 H_{16}$.

The 24 timing generators described above are sufficient to produce an hours output timing signal for any hours division on a 24 hour clock. Obviously, 24 hour generators are not required if the clock employed is a 12 hour clock or if it is changed for some other reason. Further, the 24 outputs are sufficient in the event that the record receiver employed or read by the scanner head is a telephone toll card used to record the elapsed time for an interstate telephone call. In certain of the states, for example, South Carolina, the toll charges of the telephone companies change at other time divisions than even hour divisions of the 24 hour clock if the call is an intrastate call. In the situation mentioned, one such break comes at 4:30 A.M., and for toll purposes, the period 4:31 A.M. to 5:00 A.M. is considered to be 5:00 A.M. The timing generators described above would not produce a $\overline{T}_5$ signal output in the event that the actual time of the day was in the period 4:31 through 4:59 A.M. Referring now to FIG. 31b, the $\overline{T}_5$ generator comprises a five input NAND gate 1101 having the hours values $\overline{H}_2 H_4 \overline{H}_8 \overline{H}_{16}$ applied as four of the inputs. The basic requirement for producing a positive signal at the output of this generator is that either the other input to the gate 1101 be $H_1$ or that it be $\overline{H}_1$ AND 31 through 59 elapsed minutes. Accordingly, the fifth input to the gate 1100 comprises the output of a two input NAND gate 1102 where the gate 1102 received as one input the $\overline{H}_1$ output of the hours counter. The gate 1102 will go low on its output in the event that $\overline{H}_1$ goes high meaning that $H_1$ is present so the first of the two conditions described heretofore are met by the circuit. The other input of the gate 1102 is connected through an inverter 1103 to the output of a second two input NAND gate 1104 where the gate 1104 received on one of its inputs the $\overline{M}_{32}$ output of the minutes counter. This output of the minutes counter will be high for all elapsed minutes values of 32 through 59 minutes. Accordingly, if the $\overline{M}_{32}$ output of the elapsed minutes counter is high, then the output of the gate 1104 is low to send the output of the inverter 1103 high and thus render the output of the gate 1102 low. The remaining input to the gate 1104 comprises the output of a five input NAND gate 1106 receiving the outputs $M_1$ through $M_{16}$ of the minutes counter. When all of these inputs are simultaneously low indicating a total BCD value of 31, the output of the gate 1106 goes high to thereby drive the output of the gate 1104 low such that the output of the gate 1102 goes low. From the preceding discussion, it should be apparent that the $\overline{T}_5$ signal is generated in the event of 31 minutes or 32 through 59 minutes or $H_1$ occurring simultaneously with $\overline{H}_2$, $H_4$, $\overline{H}_8$, $\overline{H}_{16}$.

In the usual case the above described generation of a $\overline{T}_{05}$ signal does not interfere from the toll standpoint with charges made for interstate calls in view of the fact that the break or change in tolls for interstate calls occurs generally at 7:00 A.M. in the morning.

The timing signals generated or produced by the timing generators could be utilized for the purpose of driving punch solenoids such that the record receiver is punched with the hour of the day information obtained from the time of day recording. Alternatively, the signals might be combined so as to produce A.M. or P.M. signal outputs to distinguish between the situations from 0 to 12 noon and from 12 noon to 12 midnight, and in which case, the output signals of the T generators could be reduced through OR gates such that the $\overline{T}_{06}$ and $\overline{T}_{18}$ (6:00 A.M. and 6:00 P.M.) signals are utilized to drive the same punch solenoid. In the preferred embodiment of this invention, the latter choice has been made, but the raw signals outputted from the T generators are not utilized to directly energize a punch solenoid. As in the case of the elapsed time situation described above relative to the control of the sorting machine, it is also possible for error to occur in the time of day recording. The error is not as gross for the reason that the units of time employed are of greater duration than the situation presented for the elapsed time logic. Specifically, with normal clock accuracy, it can be assumed that if the elapsed minutes are in excess of 12 minutes past the hour, then the hour hand would be indicating the proper hour. Further, the changes in toll rates occur at less frequent intervals than they do in the elapsed time situation. In the elapsed time situation, a charge is usally made for the first 3 minutes of a call and then changes with every additional minute of the call in excess of 3 minutes. On the other hand, toll rates may change as few as two times during a 24 hour period. For example, the change in toll rates for person-to-person calls within the continental United States may occur at 7:00 A.M. and 5:00 P.M.

Accordingly, for the preferred embodiment of the invention, it was determined that sufficient accuracy could be provided if the first 12 minutes of any hour and if the last 12 minutes of any hour are compared with the residual counts appearing at the $\overline{A}$ through $\overline{D}$ and E outputs of the modulo 20 divider for the hours counter. The operating assumption employed is that if the residuals appearing in the modulo 20 divider provide a BCD representation of the numbers 16 through 19 (48 through 59 minutes) and if the actual minutes reading is from 0 to 12 minutes, then the hour reading is low by a binary 1. On the other hand, if the outputs of the modulo 20 divider indicate 0 through 12 minutes, while the actual minutes counter output indicates 48 through 59 minutes, then the hours counter outputs are high by a value of binary 1.

Figure 32:
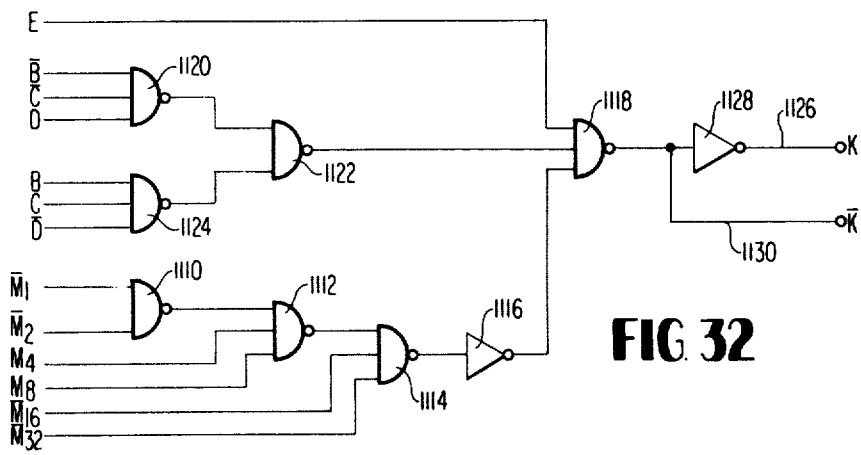
FIG. 32 shows a K signal generator.

Referring now to FIG. 32 of the drawings, the logic circuit for obtaining an output signal indicating a comparison of the type first described is shown. This circuit is employed for the purpose of generating an add correctional signal K that may be combined with a $\overline{T}_i$ signal produced by a timing generator from data obtained from a card to increase the $\overline{T}_i$ signal to $\overline{T}_{i+1}$. For purposes of this description, the signal generated by the circuit of FIG. 32 will be defined as the K signal and it is present if K is low.

The minutes counter outputs are combined in a first series of NAND gates where the $\overline{M}_1$ and $\overline{M}_2$ outputs comprise the inputs of a gate 1110, and the output of the gate constitutes one of three inputs to a NAND gate 1112. The other two inputs to the gate 1112 are the $M_4$ and $M_8$ counter outputs. The gate 1112 is connected on its output as one input to a third NAND gate 1114 which gate is connected on two other inputs to the $\overline{M}_{16}$ and $\overline{M}_{32}$ outputs of the minutes counter. The gate 1114 is coupled on its output through an inverter 1116 to one of three inputs of a fourth NAND gate 1118. Accordingly, the described input to the 1118 is responsive to the logical expression.

$$\overline{M}_{32}.\overline{M}_{16}.(\overline{M}_8 + \overline{M}_4 + \overline{M}_1.\overline{M}_2) \qquad (12)$$

The gate 1118 receives on a second input the E output of the modulo 20 divider of the hours counter, and it receives on its third input the resultant expression obtained from a three NAND gate logic arrangement. A first NAND gate 1120 is provided on its inputs with the modulo 20 divider outputs $\overline{B}$, $\overline{C}$, and D, and the gate 1120 is connected on its output as one input to a two input NAND gate 1122. The gate 1122 is connected on its other input to the output of a gate 1124 where the gate 1124 is connected on its inputs to the B, C and $\overline{D}$ outputs of the modulo 20 divider. The gate 1122 is connected on its output to the third input of the gate 1118. The gate 1118 is connected to a K signal line 1126 through an inverter 1128 and from the foregoing description it will be apparent that:

$$K = E.(B.C.\overline{D} + \overline{B}.\overline{C}.D).\overline{M}_{32}\overline{M}_{16}(\overline{M}_8 + \overline{M}_4 + \overline{M}_1\,\overline{M}_2) \qquad (13)$$

A $\overline{K}$ signal may be obtained on a line 1130 taken directly from the output of the gate 1118. From what has been said, it will be seen that the circuit functions to send the line 1126 low whenever all inputs to the gate 1118 go low together. The output of the gate 1114 can only go high if $M_{16}$ and $M_{32}$ are not present and the output of the gate 1112 is low. The gate 1112 is low on its output if $M_4$ or $M_8$ or both are not present or if $M_1$ and $M_2$ are not present, i.e., 1112 goes high on its output whenever any one or more of its inputs are high. Similarly, to obtain K, the E output of the divider must be present with B and C and $\overline{D}$, i.e., 10, 2, 4 and 1 or T and $\overline{8}$ or, E must be present with D (10 and 8) and 1 or $\overline{1}$. Such a combination of circumstances is indicative of the fact that the hours residuals are indicating that the minutes value obtained by utilizing the position of the hours indicator relative to the 24 hour dial indicate an hour plus 48–59 minutes while at the same time the output of the minutes counter indicate a minutes value of 0 to 12 minutes. As stated before, the accuracy of the indication obtained from the lowest order units of time employed in the recording is assumed to be correct. Accordingly, the K signal is generated by the circuit of FIG. 32 to indicate that the $\overline{T}_i$ signal actually generated is erroneous and, in fact, the next higher order timing signal generator should be providing the output $\overline{T}_{i+1}$.

Figure 33:
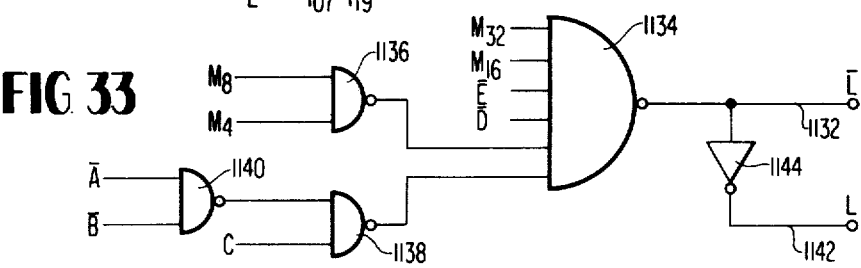
FIG. 33 shows an L signal generator.

The other situation requiring correction employs a circuit that provides an output signal L when the $\overline{T}_i$ signal generator output is one value high and it should be one value lower, e.g., if $\overline{T}_i = \overline{T}_5$ and the signal L is present, then the correct $\overline{T}_i$ signal is $\overline{T}_4$. A circuit for producing the signal L is shown in FIG. 33 of the drawings. As shown there, a series of four NAND gates are connected to produce $\overline{L}$ on an output line 1132. The line 1132 is connected directly to the output of a six input NAND gate 1134 where the gate receives the minutes counter outputs $M_{32}$ and $M_{16}$ and it receives the modulo 20 divider outputs $\overline{E}$ and $\overline{D}$ on four of its inputs. The other two inputs of the gate 1134 are connected respectively to the outputs of a pair of two input gates 1136 and 1138. The gate 1136 is connected to receive the values $M_8$ and $M_4$ on its two inputs. The gate 1138 is connected to receive the C output of the modulo 20 divider on one input, and it is connected to receive the output of a gate 1140 on its other input. The gate 1140 is connected on its inputs to the $\overline{A}$ and $\overline{B}$ outputs of the divider. The L signal is obtained on a signal line 1142 from the output of an inverter amplifier 1144 connected on its input to the output of the gate 1134. From the foregoing, it will be seen that the L signal generator is responsive to the following conditions on the outputs of the minutes counter and the hours divider:

$\overline{E}, \overline{D}, (\overline{C} + \overline{A}\ \overline{B}), M_{32}, M_{16}, (\overline{M}_8 + \overline{M}_4)$
$L = \overline{E}.\overline{D}.\ (\overline{C} + \overline{A}\ \overline{B}).M_{32}.M_{16}.(\overline{M}_8 + \overline{M}_4)$ (14)

Figure 34:
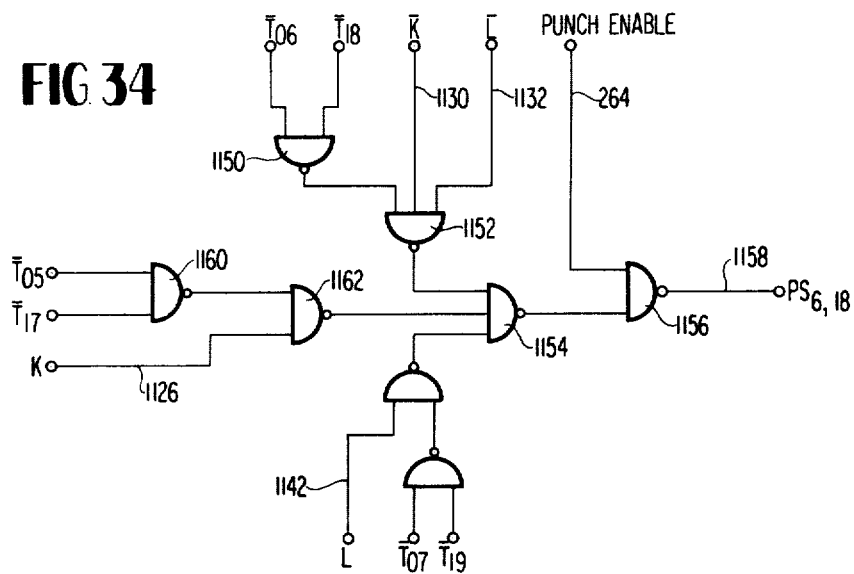
FIG. 34 shows a typical punch solenoid selector signal generator.

The signals thus produced by the K and L correction signal generators are logically compared with selected $\overline{T}_i$ signals in twelve punch solenoid logic selector circuits. Twelve selector circuits are employed in the preferred embodiment of this invention to generate for any given data on a card 38 one of twelve signals $C_1$ through $C_{12}$ which signal is employed as hereinafter described to selectively operate any one of twelve punch solenoids. A typical punch solenoid selector circuit is shown in FIG. 34 of the drawings. As is the usual case, negative logic is employed to make in practical effect what is an OR/AND decision and if the decision is made to output a signal that is capable of driving a solenoid which in turn operates a punch to perforate the record receiver in the particular location associated with the punch to represent the time of day in hours. With the exception of two special generators for the cases of 11 or 23 hours and zero or 24 hours and for the case the circuit shown in FIG. 34 performs the following general operation:

$\overline{C}_i = 11 [\overline{rd}(\overline{T}_i + \overline{T}_{i+12}) + r(\overline{T}_{i-1} + \overline{T}_{i+11}) + d(\overline{T}_{i+1} + \overline{T}_{i+13})]$
$\overline{PS}_i = Q[K.\overline{L}(\overline{T}_i + \overline{T}_{i+12}) + K(\overline{T}_{i-1} + \overline{T}_{i+11}) + L(\overline{T}_{i+1} + \overline{T}_{i+13})]$ (15)

where $\overline{PS}_i$ is a punch selector signal, Q is an enable signal obtained on the line 264 as an output of the gate 210 (FIG. 10) of the function generator 158, and K and L are the previously described correction signals. In the circuit shown in FIG. 34, $\overline{T}_i = \overline{T}_{06}$ (6 A.M.), $\overline{T}_{i+12} = \overline{T}_{18}$ (6 P.M.), $\overline{T}_{i-1} = \overline{T}_{05}$ (5 A.M.), $\overline{T}_{i+11} = \overline{T}_{17}$ (5 P.M.), $\overline{T}_{i+1} = \overline{T}_{07}$ (7 A.M.), $\overline{T}_{i+13} = \overline{T}_{19}$ (7 P.M.), and the $\overline{PS}_i$ signal produced by the circuit is selective of the 6 o'clock punch, i.e., it is $\overline{PS}_{6,18}$.

Referring now to FIG. 34, it will be seen that the first parenthetical expression enclosed within the brackets of equation 15 is obtained in the specific case by applying the signals $\overline{T}_{06}$ and $\overline{T}_{18}$ as inputs to a NAND gate 1150 where the output of the said gate is connected as an input to a second NAND gate 1152. The gate 1152 is connected on two other inputs to the $\overline{K}$ and $\overline{L}$ signal lines 1130 and 1132. Accordingly, in operation, if either of the signals $\overline{T}_{06}$ or $\overline{T}_{18}$ goes high indicating that the $T_{06}$ or $T_{18}$ generator has been activated, then the output of the gate 1150 will go low. If at this time the $\overline{K}$ and $\overline{L}$ inputs to the gate 1152 are also low indicating that the data obtained from the record receiver does not require correction, then the output of the gate 1152 will go high. The gate 1152 is connected on its output as one of three inputs to a NAND 1154. Accordingly, when the output of the gate 1152 goes high, the output of the NAND gate 1154 must go low. The gate 1154 is connected on its output to one of two inputs of a gate 1156 where the gate 1156 receives on its other input the Q signal generated by the gate 210 of the function generator 158.

It will be recalled in the discussion above relative to the gating networks for gating transducer pulses into the hours and minutes counters respectively, a punch inhibit signal was generated on the line 266. It will be recalled further that the line 266 is connected directly to the set output of the NAND latch 1014, FIG. 29, and that this output could not go low until such time as both control pulses had been received from the A.M.-P.M. differentiators over the respective lines 434 and 436. In the preferred embodiment of the invention the line 266 is NANDed by the gate 210 in the function generator with the logic operate signal and the other described signals to generate the Q signal in timed sequence with the card sorting rate of the machine such that the gate 1156 goes high on its output with the operation of the switch 152. If it should be desired to separate the punch circuitry and operate the punch as an independent system separate from the sorting machine, then the line 266 may be connected directly as the Q signal to the gate 1156.

In either the preferred case or the direct tie case, whenever the gate 1152 goes high on its output, it thereby drives the output of the gate 1154 low. On the occurrence of the Q input, the NAND 1156 will go high on its output to provide a signal $\overline{PS}_{6,18}$ on an output line 1158 for the 6 o'clock solenoid.

From the foregoing, it will be seen that if either the $\overline{K}$ or $\overline{L}$ inputs to the gate 1152 had gone high, then the output of the gate would be low such that it could not provide a drive signal to the input of the gate 1154. Such a condition obtains as the result of the comparison in the K and L function generators discussed above. If the K generator is the one providing a high level output on the line 1130, then the decision was that the time signal generated by the $T_i$ generator was low by 1 hour's value of 1. Referring again to FIG. 34, the assumption will be that the $\overline{T}_5$ generator is providing a high output signal under these circumstances. The $\overline{T}_{05}$ output signal is NANDed with a $\overline{T}_{17}$ output signal in a gate 1160 such that the result on the output of the gate 1160 is $T_{05}$ or $T_{17}$. The gate 1160 is coupled on its output as an input to a gate 1162 which receives on a second input the K signal on the line 1126. From what has been said, it will be seen that if K is present simultaneously with $T_{05}$ or $T_{17}$, then both inputs to the gate 1162 are low such that its output goes high. The gate 1162 is coupled on its output as a second input to the gate 1154. Under the circumstances described, a high on the output of the gate 1162 is effective to send the output of the gate 1154 low, and the output of the gate 1156 will go high with a Q signal to thereby drive the punch selector signal line 1158 with a $\overline{PS}_{6,18}$ signal.

Circuits similar to that described with respect to K signal are employed with the outputs of the $\overline{T}_{07}$ and $\overline{T}_{19}$ generators to send a third input of the gate 1154 high in the event of an L signal on the line 1142. As shown, the signals $\overline{T}_{07}$ and $\overline{T}_{19}$ are NANDed with the L signal to provide the third input to the gate 1154 to generate the $\overline{PS}_{6,18}$ signal on the line 1158.

A special situation occurs for three timing generators, $\overline{T}_{00}, \overline{T}_{12}$ and $\overline{T}_{24}$ which provide 12 o'clock outputs, i.e., noon or midnight with $\overline{T}_{00}$ and $\overline{T}_{24}$ both being valid midnight signals. The reason that such signals might be produced should be obvious, i.e., the $T_{00}$ signal will be generated as a natural result of finding the hour of the day mark indicator located at some point between the 12 midnight calibration line and the 1 A.M. calibration line. On the other hand, a $\overline{T}_{24}$ signal can result from finding the time of day indicator in very close proximity to the 12 midnight calibration line. Referring again to FIG. 34, the situation can be taken care of in the first special case where the time of day is either midnight or noon by NANDing the three signals $\overline{T}_{00}$, $\overline{T}_{12}$, and $\overline{T}_{24}$ with the values $\overline{K}$ and $\overline{L}$ or, that is, replace the gate 1150 with a three input NAND gate. The correctional circumstances involving these three signals then occur for the $\overline{T}_1$ and $\overline{T}_{13}$ generators and for the $\overline{T}_{11}$ and $\overline{T}_{23}$ PM generators. In the former case, the values $\overline{T}_{00}$, $\overline{T}_{12}$ and $\overline{T}_{24}$ are NANDed with the K or, that is, replace the gate 1160 with a three input NAND gate for the $\overline{PS}_{1,13}$ generator. Finally, in the $\overline{PS}_{11,23}$ generator case, the values $\overline{T}_{00}$, $\overline{T}_{12}$ and $\overline{T}_{24}$ should be NANDed with L.

Figure 35:
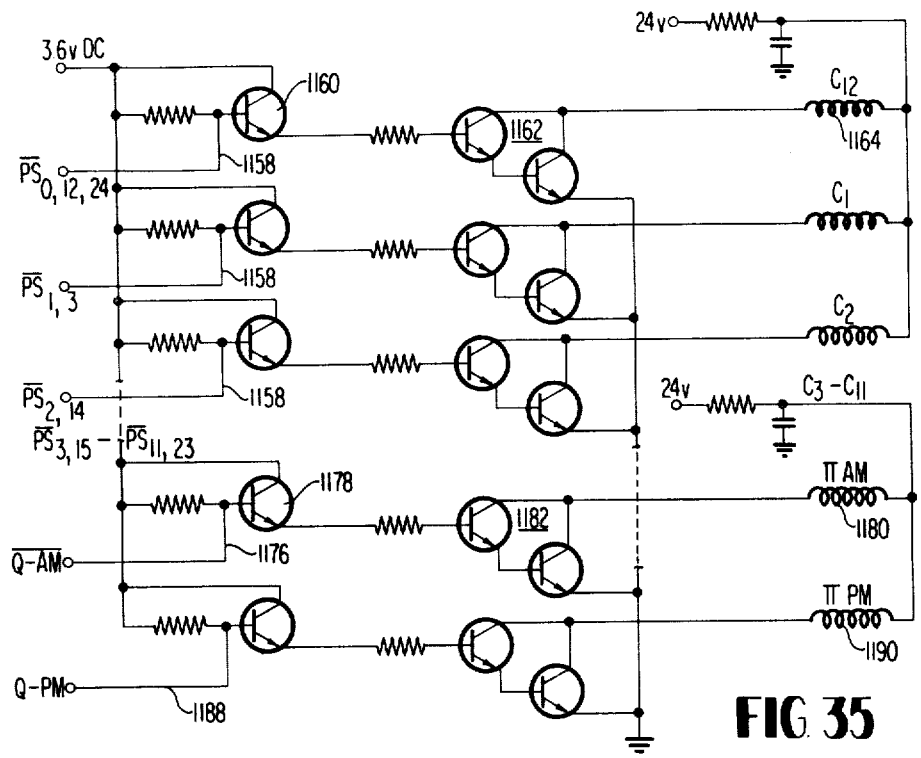
FIG. 35 is a schematic diagram of the punch solenoids and drivers (reduced to show 3 of 12 hours punches)

Referring to FIG. 35, each of the solenoid selector circuits described above is utilized to drive a transistor driving circuit having a punch solenoid connected in the output where the transistor circuits operate as a current gate. Each of the lines 1158 is connected so as to drive the base of an input transistor 1160 to send the transistor into current saturation with a $\overline{PS}$ signal. The emitter electrode of the transistor 1160 is resistor connected to the input base electrode of a Darlington amplifier 1162 having its output emitter connected to ground. A punch solenoid 1164 is connected between the collector of the Darlington and a timing circuit (not shown) where the timing circuit is connected on its input to a DC source, e.g., 24 VDC. When the Darlington is driven into current saturation, a completed pulse path between the source and ground is thereby pulse energized to drive the selected punch solenoid. Thus, in the case described above, if either the $\overline{T}_{06}$ or $\overline{T}_{18}$ timing generators outputs a signal simultaneously with $\overline{K}$ and $\overline{L}$ low, then an input is obtained for the 6 o'clock punch solenoid 1164 such that the punching device for this solenoid is operated to perforate the record receiver at the appropriate place in the hours time of day column. In the preferred embodiment, the punches are spring retracted during the period subsequent to operation and before energization of the card gate solenoid.

As was indicated above, because of the nature of the record receiver, it is necessary to distinguish whether the time punched is A.M. or P.M. Accordingly, logic circuitry is employed for making the decision as to whether the hour generator providing the output signal $\overline{T}_i$ was either a generator in a group constituting the A.M. time generators or a generator in a second group constituting the P.M. time generators. The A.M. situation may be expressed as follows:

AM = $T_{01} + T_{02} + \ldots + T_{09} + T_{10} + (T_{11} \cdot \overline{K}) + (L \cdot T_{12}) + (K \cdot T_{23}) + \overline{L} (T_{00} + T_{24})$ (16)

Figure 36:
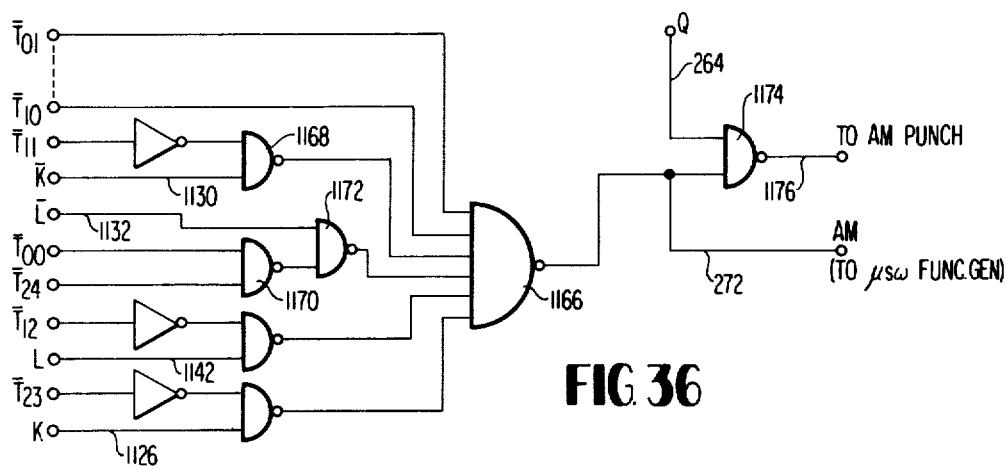
FIG. 36 is a block diagram of the AM signal generator.

A circuit for generating the A.M. signal is shown in FIG. 36 of the drawings. The A.M. is obtained on a line 272 constituting an output for the generator. The line 272 is connected directly to the output of a 14 input NAND gate 1166. In actual practice, of course, a great number of NAND gates may be employed with the appropriate inverters for the purpose of yielding a practical NAND gate 1166. The gate receives on 10 of its inputs the signals $\overline{T}_{01}$ through $\overline{T}_{10}$ to provide the first portion of the A.M. expression given above. The other expressions are obtained as inputs to the gate 1166 by employing the appropriate logic. For example, the $T_{11}$ . $\overline{K}$ result may be obtained by inverting the output of the $T_{11}$ generator and applying such inverted output to one input of a NAND gate 1168 where the $\overline{K}$ output of the correction function generator is applied as the other input to the gate 1168. The output of the gate 1168 then constitutes one of the 14 inputs to the gate 1166. In operation, an output signal $\overline{T}_{11}$ is utilized for the purpose of driving one input to the gate 1168 low, and if at the same time, the $\overline{K}$ output of the correction generator is also low (indicating that correction is not necessary), then the output of the gate 1168 goes high. In the practical embodiment of the A.M. generator shown in FIG. 36 of the drawings, it will be noticed that if any input to the gate 1166 goes high, the line 272 goes low to provide an indication that the data recorded on the time of day recording on the record receiver is A.M. The gates utilized to produce the $T_{12}$ . L and the $T_{23}$K inputs to 1166 are of the same type as that utilized for the $T_{11}\overline{K}$ signal. It will also be noticed that the $\overline{L}$ $(T_{00} + T_{24})$ expression requires two NAND gates 1170 and 1172 where the OR portion of the expression is obtained as the result of NANDing $\overline{T}_{00}$ and $\overline{T}_{24}$ to thereby provide an input to the gate 1172. This gate operates to send an input to the gate 1166 high in the event that the time of day appearing on the record receiver is either 00 or 2400 hours and the L signal generator is not providing an output.

In the actual embodiment of the invention that has been constructed and tested, the line 272 provides an input to the function generator 158 as previously described. The gate 1166 is connected as one input to a two input NAND gate 1174, where the NAND receives the punch enable signal Q on its other input. The gate 1168 is connected by a line 1176 on its output to the base of a transistor 1178 (FIG. 35) such that if the output of the gate 1174 goes high, then an A.M. punch solenoid 1180 is pulse energized by a Darlington driver 1182. The transistor driver circuitry utilized to enable solenoid 1180 is precisely of the type discussed above for operating an hour of the day punch solenoid.

Figure 37:
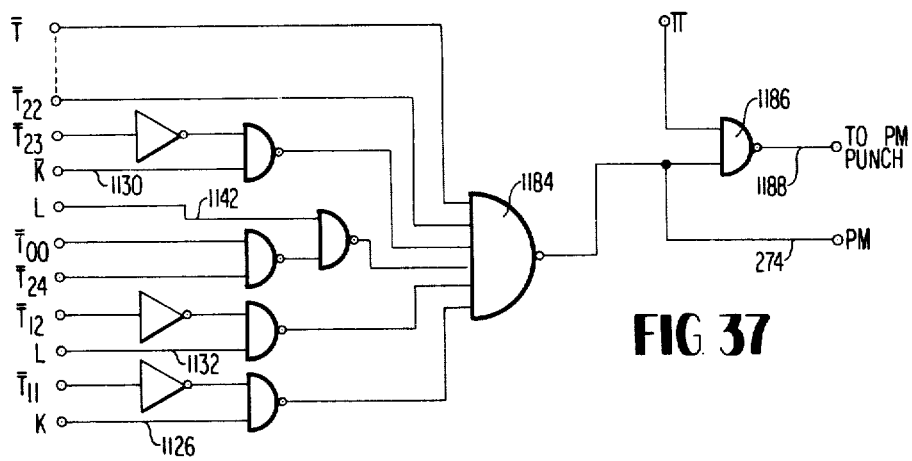
FIG. 37 is a block diagram of the PM signal generator.

Referring now to FIG. 37 of the drawings, a P.M. signal may be obtained on the line 274 in much the same manner that the A.M. signal was obtained on the line 272. As in the A.M. situation, a gate 1184 has 14 inputs applied to it such that its output goes low to provide a signal on the line 274 in the event that the following conditions are met:

PM = $T_{13} + T_{14} + \ldots + T_{21} + T_{22} + (\overline{K} \cdot T_{23}) + (K \cdot T_{11}) + (\overline{L} \cdot T_{12}) + L \cdot (T_{00} + T_{24})$ (17)

As in the A.M. case, the line 274 is connected as an input to the function generator 158. Similarly, the output of the gate 1184 is applied to one input of a gate 1186 where the other input of the gate 1186 receives the punch enable signal Q from the function generator. The gate 1186 is connected on an output line 1188 to drive a transistor switching circuit so as to energize a P.M. solenoid 1190 (FIG. 35 of the drawings) in the event of the simultaneous receipt of the punch enable and P.M. signals on the inputs to the gate 1166.

As referred to above, the punch enable signal Q, received from the generator 158, is produced by taking the punch inhibit output from the A.M. counter gates and using that signal to prevent punch enablement until such time as the line 266 goes low. If it is desired to separate the punch from the sorting machine and, referring to FIGS. 36 and 37 of the drawings, it will be noticed that if both of the A.M. and P.M. generators are providing output signals on the lines 272 and 274 simultaneously, then it may be assumed that error appears some place in the system. Under such circumstances; of course, none of the punch solenoids should be energized, because the error then would be carried over into the perforation made on the record receiver. To prevent this error, the lines 272 and 274 are combined in the EXCLUSIVE OR gate of the function generator 158 to provide an output signal in the event of A.M. or P.M. but not both A.M. and P.M. This result could also be applied as one input to a NAND gate with the line 266 applied as a second input to generate a $\overline{Q}$ signal for a separate punch.

Bin Full Deactivation of Document Feeding

Figure 38:
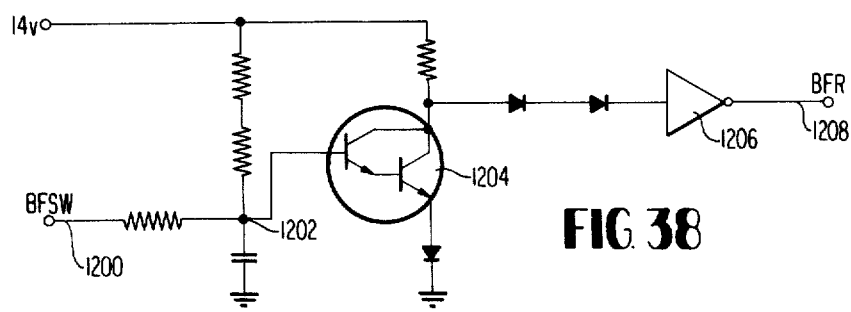
FIG. 38 is a schematic diagram of the bin full signal generator.

Each of the document storage bins in the machine is provided with a mechanical sensor positioned so as to sense the fact of a full bin, i.e., a bin that has received its maximum capacity of cards as previously described. All of the bin full sensors in each level of the machine are mechanically coupled together to activate a single normally closed switch and two such switches are connected in series. If either is opened as the result of sensing a bin full condition a DC path to ground is opened. Referring to FIG. 38, the normally closed circuit from the two switches is applied to a terminal 1200 which terminal is connected through a resistor to a junction 1202 and the junction is connected to a base electrode of a Darlington amplifier 1204. The junction is also connected through a pair of resistors to a positive DC source and through a capacitor to ground. Accordingly, with both switches closed, current flows through the resistors and out of the terminal 1200 to ground, thus establishing a very small positive potential at the base of the Darlington. The collector of the Darlington 1204 is connected through an inverter amplifier 1206 to an output line 1208. Thus, in the event that a complete circuit is had through the two microswitches, the collector of the Darlington 1204 is effectively at the DC source level such that the terminal 1208 is at effective ground. In the event that either one of the microswitches is opened as the result of a sensor being operated by a sufficient number of documents to fill a bin, the terminal 1200 is floated above ground and the capacitor connected to the junction 1202 charges to the DC source. At some point in its charging cycle, the capacitor will effectively drive the amplifier 1204 into saturation so as to thereby drive the output line 1208 to a high level voltage.

The line 1208 is connected to the base electrode of a switching transistor 1210, FIG. 7, such that a positive potential on the line is effective to cause the transistor to conduct. The bin full relay 134 is connected between the collector of the switching transistor and the source line 114 such that conduction of the switching transistor is sufficient to energize the relay. The relay's contacts 132 located in the holding circuit 122 for the feed solenoid 120 open to thereby de-energize the feed relay and terminate the feeding of documents to the sorting machine. The machine's bins may now be emptied by an operator to restore the bin full switches to their previous closed condition so as to de-energize the relay 134. As has been previously explained, the fact of de-energization of the relay 134 is not sufficient to re-energize the feed solenoid 120 and the operator will have to operate the feed start push button 118 at the control panel to cause the machine to again automatically sort the record receivers.

We claim:

1. An error checking and correction circuit for use with document control apparatus, the apparatus being responsive to at least two human readable recordings of time carried by a document to effect an operation on the document, one of the recordings being of values of greater significance than the other recording and the range of the recording of values of lesser significance includes at least all such values as are encompassed by at least one complete unit value of the most significant values, the circuit comprising:

first time signal generator means responsive at least in part to a digital signal which is representative of the recording having greatest value significance applied to inputs of the said means to generate a time signal unique to such value;

second time signal generator means responsive at least in part to a digital signal which is representative of the recording having lesser value significance to generate at least a first or second error checking and correction signal; and comparator means responsive to said time signal and to said error checking and correction signal to provide a circuit output.

2. An error checking and correction circuit according to claim 1 wherein the range of the recording of values of lesser significance includes at least all such values as are encompassed by at least two complete unit values of the most significant values, and wherein the second time signal generator means includes:

first circuit means responsive to an electrical representation of a recording in the first half of the range of lesser significant values to generate the first error checking and correction signal as a first set of signals, and second circuit means responsive to an electrical representation of a recording in the last half of the range of lesser significant values to generate the second error checking and correction signal as a second set of signals.

3. An error checking and comparison circuit according to claim 2 wherein the comparator means includes:

first circuit logic means responsive to a time signal for an even value and to said first set of error checking and correction signals to provide the time signal as an uncorrected circuit output or responsive to a time signal for an odd value and said first set of error checking and correction signals to provide a corrected circuit output; and second circuit means responsive to a time signal for an odd value and to said second set of error checking and correction signals to provide the time signal as an uncorrected circuit output, and responsive to a time signal for an even value and to said second set of error checking and correction signals to provide a corrected circuit output.

4. An error checking and correction circuit for use with control apparatus for an automatic document sorting machine, the apparatus being responsive to at least two recordings of elapsed time carried by a document to effect automatic sorting of the document, one of the two said recordings being of values of greater significance than the other, and the range of the recording in values of lesser significance including at least all such values as are encompassed by at least two units of the most significant value, the error checking and correction circuit comprising:

elapsed time signal generator means responsive to an electrical representation of the recording having greatest value significance for generating an elapsed time signal unique for such value;

second elapsed time signal generator means responsive to an electrical representation of the recording having lesser value significance to generate a first set of error checking and correction signals if said recording is in the first half of its range and to generate a second set of error checking and correction signals if the recording is in the second half of its range; and comparator means responsive exclusively to the elapsed time signal and the first set of error checking and correction signals to provide the elapsed time signal as a circuit output when the said signal represents an even value and to provide a corrected circuit output signal when the elapsed time signal represents an odd value, OR exclusively to the elapsed time signal and the second set of error checking and correction signals to provide the elapsed time signal as a circuit output when the said signal represents an odd value and to provide a corrected circuit output signal when the elapsed time signal represents an even value.

5. An error checking and correction system according to claim 4 wherein the second elapsed time signal generator means comprises:

first and second logic circuit means responsive to electrical representations of recordings in the first and second quarters of the range to provide one of the signals of the first set of signals, and a third logic circuit means responsive to outputs of said first or second logic circuit means to provide the other of the signals in said first set of signals; and fourth and fifth logic circuit means responsive to electrical representations of recordings in the third and fourth quarters of the range to provide one of the signals of the second set of signals, and a sixth logic circuit means responsive to outputs of said fourth or fifth logic circuit means to provide the other of said signals in the second set of signals.

6. An error checking and correction circuit for use with control apparatus for an automatic document marking machine, the apparatus being responsive to at least two recordings of time carried by a document to effect an automatic marking of the document in machine readable form at coded locations on the document, one of the two said recordings being of time units of greater significance, than the other, and the other recording including a range of units encompassing one complete unit of the units of greater significance; the error checking and correction circuit including:

time signal generator means responsive at least to an electrical representation for any recording in units of greatest significance to generate a time signal unique to the unit value represented by the recording;

second time signal generator means effective to output at least a first signal representing no error and responsive to the simultaneous presence of an electrical representation of the recording having lesser value significance and an electrical representation obtained from the recording of greater significance and representing a fraction of the unit value of such recording to generate at least one error signal; and comparator means responsive to the simultaneous presence of the time signal and said first signal to provide said time signal as first exclusive output of the circuit, the said comparator means being responsive to said time signal and to said error signal to provide a second output of the circuit, the second output representing a value different from the time signal and being exclusive of said first exclusive output.

7. An error checking and correction circuit according to claim 6 wherein the second time signal generator means includes:

at least first and second time signal generators each normally being effective to output individual first signals of the type characterized; and, each said time signal generator being responsive to electrical representations representing recordings in predetermined and different portions of the range for the lesser values, and responsive to electrical representations obtained from the recordings of greater significance and representing different ranges of fractions of the unit values of such recordings such that each said time signal generator is effective to provide an error signal.

8. An error checking and correction circuit according to claim 7 wherein said comparator means includes:

EXCLUSIVE OR output means connected to respond to the simultaneous presence of a time signal and the first signals from said first and second time generators to effect an output from said EXCLUSIVE OR means representative of said time signals;

second logic circuit means connected to be simultaneously responsive to a time signal of different value than that applied to the first circuit means with an error signal output of said first generator to effect an output from said EXCLUSIVE OR means; and, third logic circuit means connected to be simultaneously responsive to a third time signal representing a value different from that applied to said first and second logic circuits with an error signal from said second time generator to effect an output from said EXCLUSIVE OR means, the output of said EXCLUSIVE OR means in each case being a circuit output indicative of the unit value of time represented by the time signal applied to the first logic circuit means.

9. An error checking and correction circuit according to claim 7 wherein the time signal generator means includes circuit means responsive on a first input to an electrical representation for a recording of a unit of greatest significance simultaneously with the presence on a second input of an electrical representation representing a recording within a range of values of lesser significance to generate on an output a time signal unique to a unit value different from the value represented by the electrical representation on the first input to the circuit.

* * * * *